(12) United States Patent
Sang

(10) Patent No.: US 10,311,810 B2
(45) Date of Patent: Jun. 4, 2019

(54) LIQUID CRYSTAL DISPLAY DEVICE

(71) Applicant: LG Display Co., Ltd., Seoul (KR)

(72) Inventor: Wookyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 15/606,999

(22) Filed: May 26, 2017

(65) Prior Publication Data

US 2017/0345382 A1    Nov. 30, 2017

(30) Foreign Application Priority Data

May 31, 2016   (KR) .................. 10-2016-0067776

(51) Int. Cl.
  *G09G 3/36*   (2006.01)
  *G02F 1/13*   (2006.01)
  *G09G 3/34*   (2006.01)
  *G02F 1/163*  (2006.01)

(52) U.S. Cl.
  CPC ............ *G09G 3/3607* (2013.01); *G02F 1/13* (2013.01); *G09G 3/3406* (2013.01); *G09G 3/3413* (2013.01); *G09G 3/364* (2013.01); *G09G 3/3614* (2013.01); *G09G 3/3648* (2013.01); *G09G 3/3659* (2013.01); *G09G 3/3677* (2013.01); *G09G 3/3688* (2013.01); *G02F 2001/1635* (2013.01); *G09G 2300/0426* (2013.01); *G09G 2300/0452* (2013.01);
  (Continued)

(58) Field of Classification Search
  None
  See application file for complete search history.

(56) References Cited

U.S. PATENT DOCUMENTS

| 2011/0156992 A1* | 6/2011 | Moon ................. G09G 3/3607 345/84 |
| 2015/0379947 A1 | 12/2015 | Sang et al. |
| 2016/0155400 A1* | 6/2016 | Namkung ........... G09G 3/3614 345/205 |

FOREIGN PATENT DOCUMENTS

| CN | 103185996 A | 7/2013 |
| EP | 2 953 127 A2 | 12/2015 |
| EP | 2 998 955 A2 | 3/2016 |

OTHER PUBLICATIONS

European Search Report (extended), dated Nov. 2, 2017 for the European patent application No. 17173433.8.
(Continued)

*Primary Examiner* — Duane N Taylor, Jr.
(74) *Attorney, Agent, or Firm* — Polsinelli PC

(57) ABSTRACT

A liquid crystal display device includes a plurality of data lines; a plurality of gate lines and a pixel array including a plurality of subpixels formed of first-color to fourth-color subpixels. The plurality of subpixels has a first arrangement or a second arrangement. The first arrangement is an arrangement in which in each row of the pixel array two of the first-color to fourth-color subpixels is interleaved. The second arrangement is a different arrangement than the first arrangement in which in each row of the pixel array two of the first-color to fourth-color subpixels are interleaved. A data driver is configured to drive the pixel array according to a first driving method when the pixel array has the first arrangement and drive the pixel array according to at least one second driving method that is different from the first driving method when the pixel array has the second arrangement.

25 Claims, 67 Drawing Sheets

(52) U.S. Cl.
CPC ............... *G09G 2310/0213* (2013.01); *G09G 2310/0218* (2013.01); *G09G 2320/0646* (2013.01)

(56) References Cited

OTHER PUBLICATIONS

European Search Report (partial), dated Jul. 21, 2017 for the European patent application No. 17173433.8.

\* cited by examiner

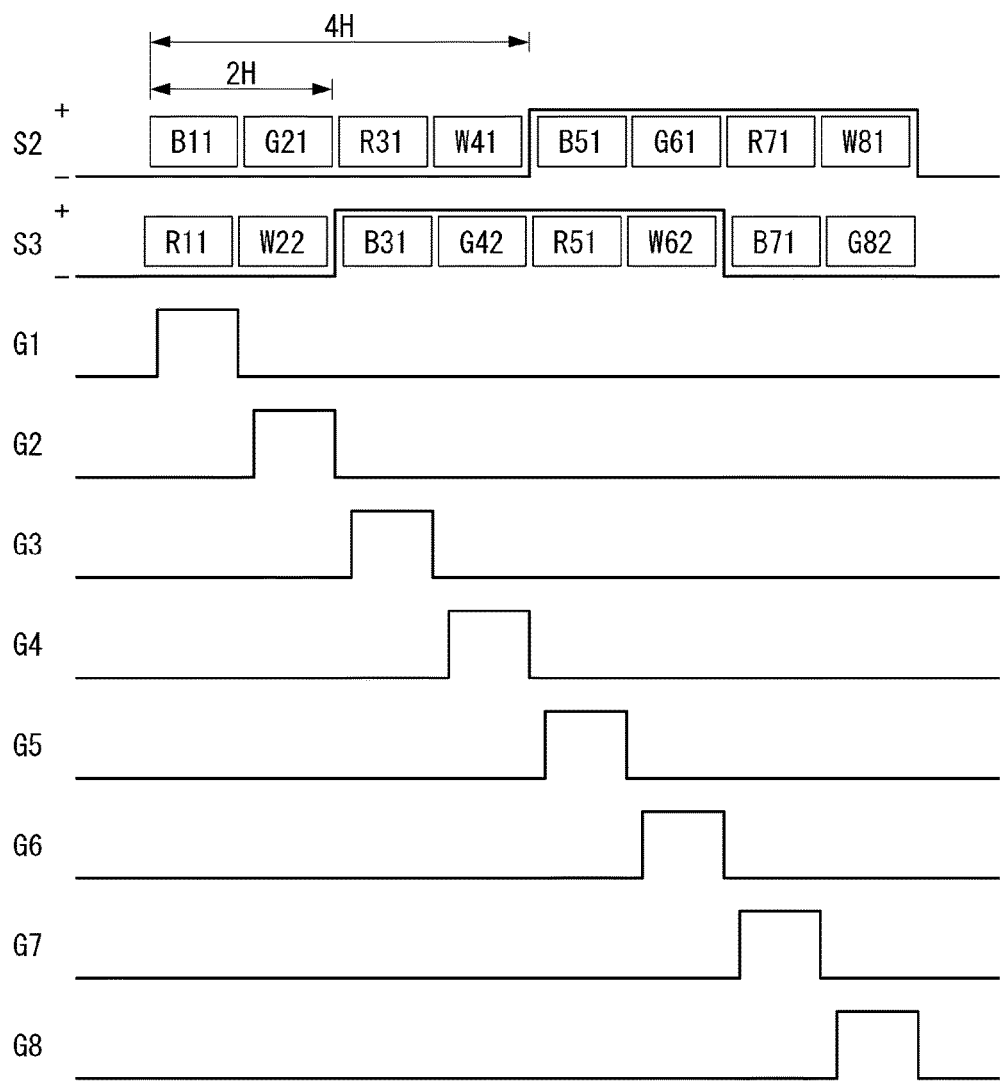

FIG. 5A

|    | S1 | S2 | S3 | S4 | S5 |
|----|----|----|----|----|----|
| G1 | B(−) | R(−) | B(+) | R(+) | |
| G2 | W(+) | G(−) | W(−) | G(+) | |
| G3 | R(−) | B(+) | R(+) | B(−) | |
| G4 | G(−) | W(−) | G(+) | W(+) | |
| G5 | B(+) | R(+) | B(−) | R(−) | |
| G6 | W(−) | G(+) | W(+) | G(−) | |
| G7 | R(+) | B(−) | R(−) | B(+) | |
| G8 | G(+) | W(+) | G(−) | W(−) | |

W : White
R : Red
G : Green
B : Blue

⟨White⟩

⟨Blue⟩

<Cyan>

<Magenta>

<White>

<Red>

<Green>

<Blue>

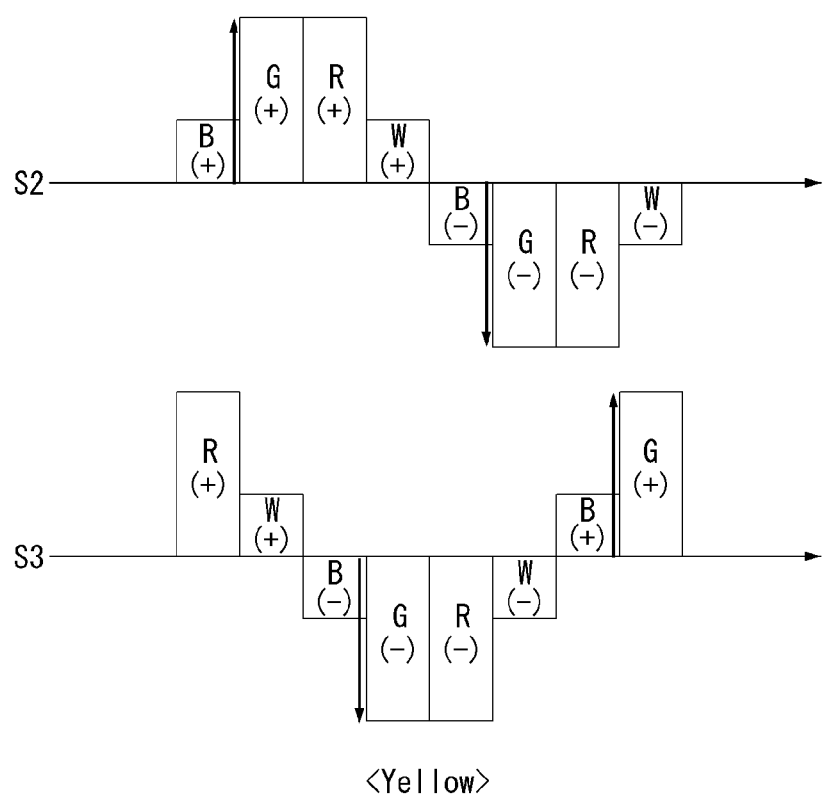

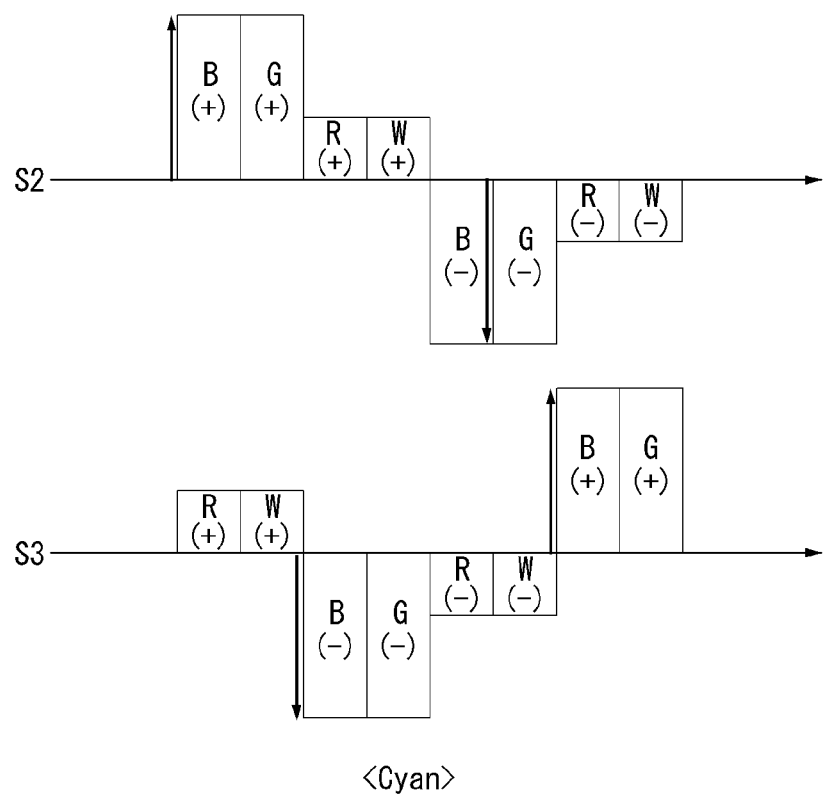

<Magenta>

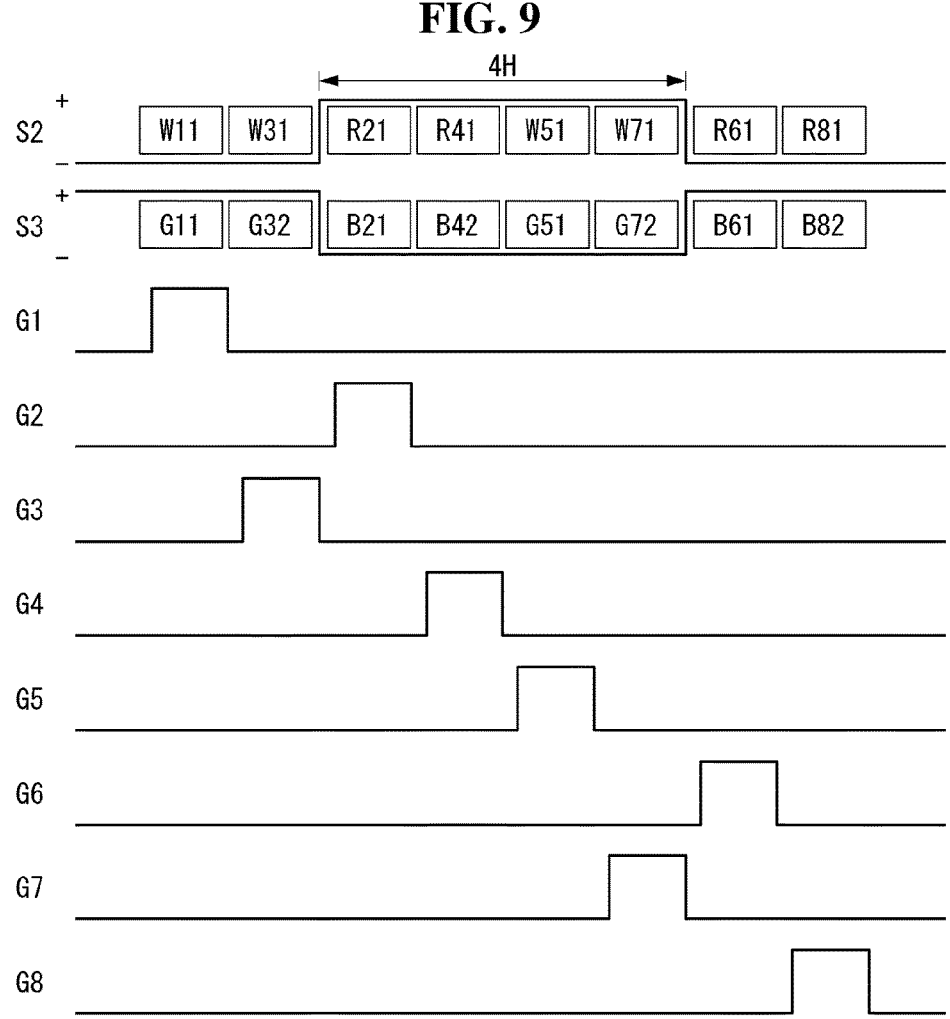

<White>

FIG. 10B

<Red>

<Green>

<Blue>

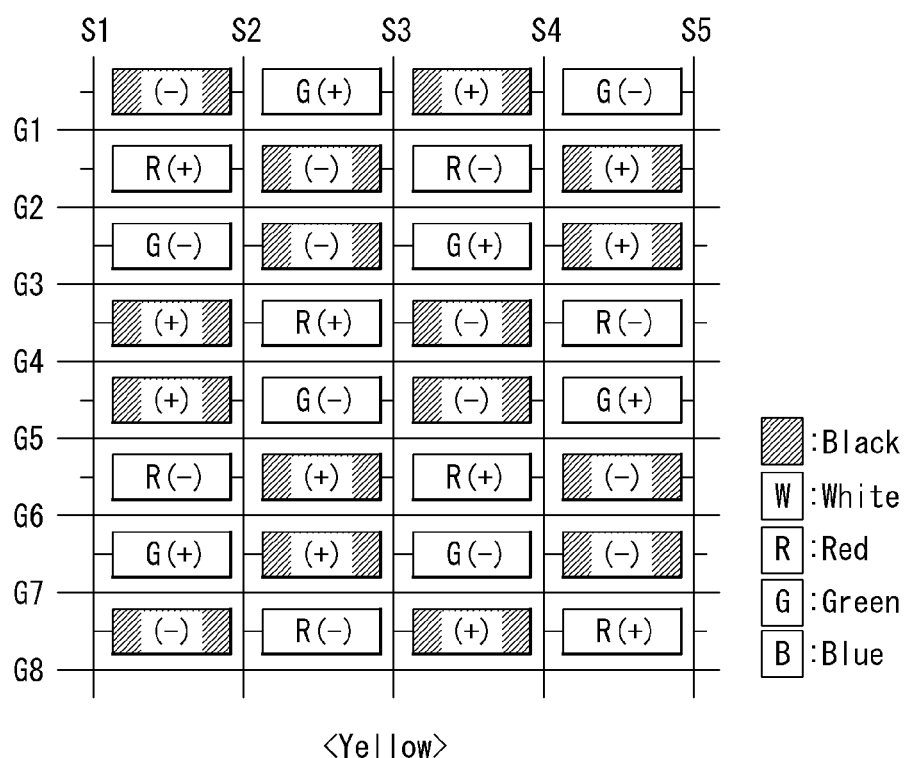

<Cyan>

<Magenta>

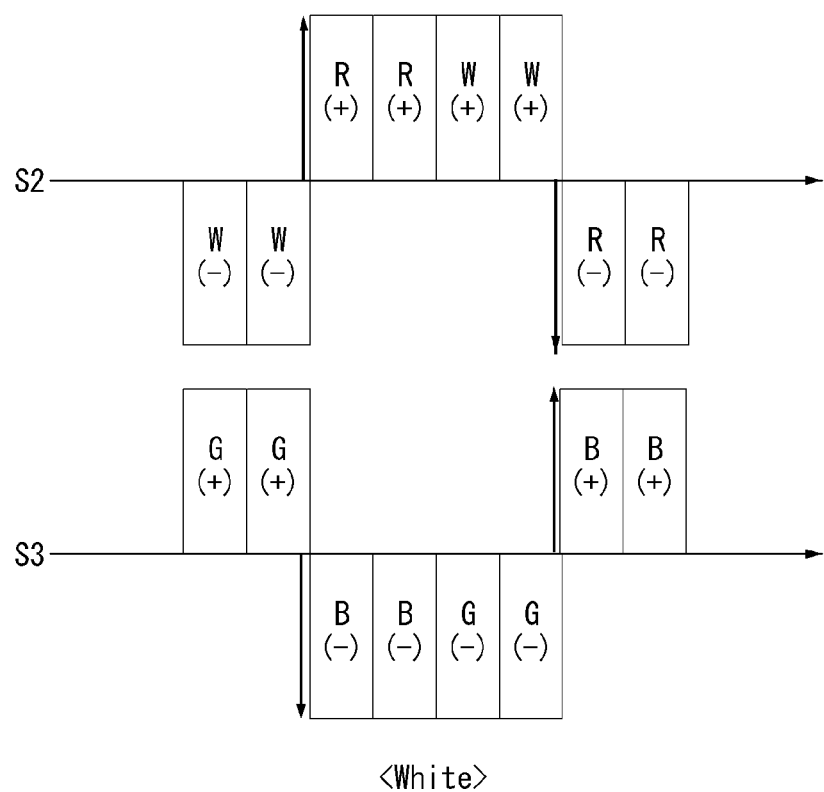

FIG. 11B
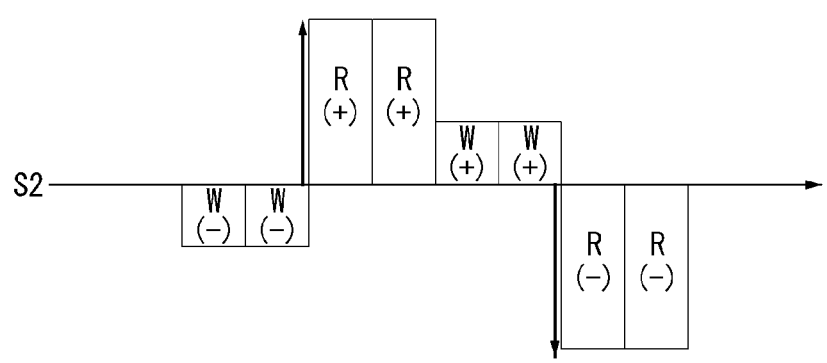
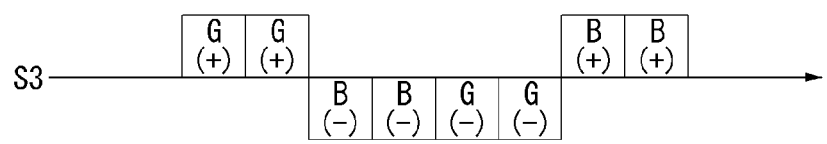
<Red>

<Green>

<Blue>

<Yellow>

<Cyan>

<Magenta>

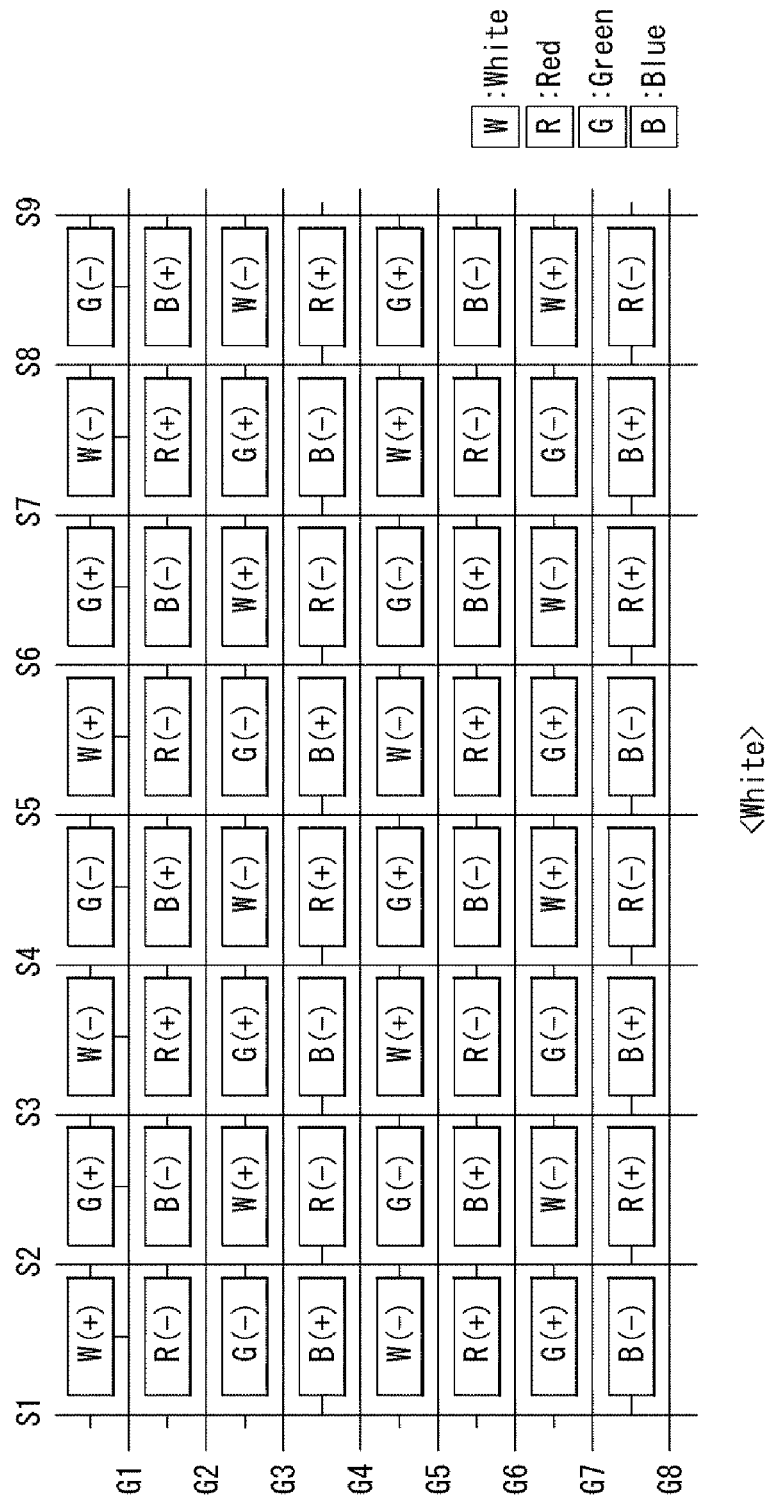

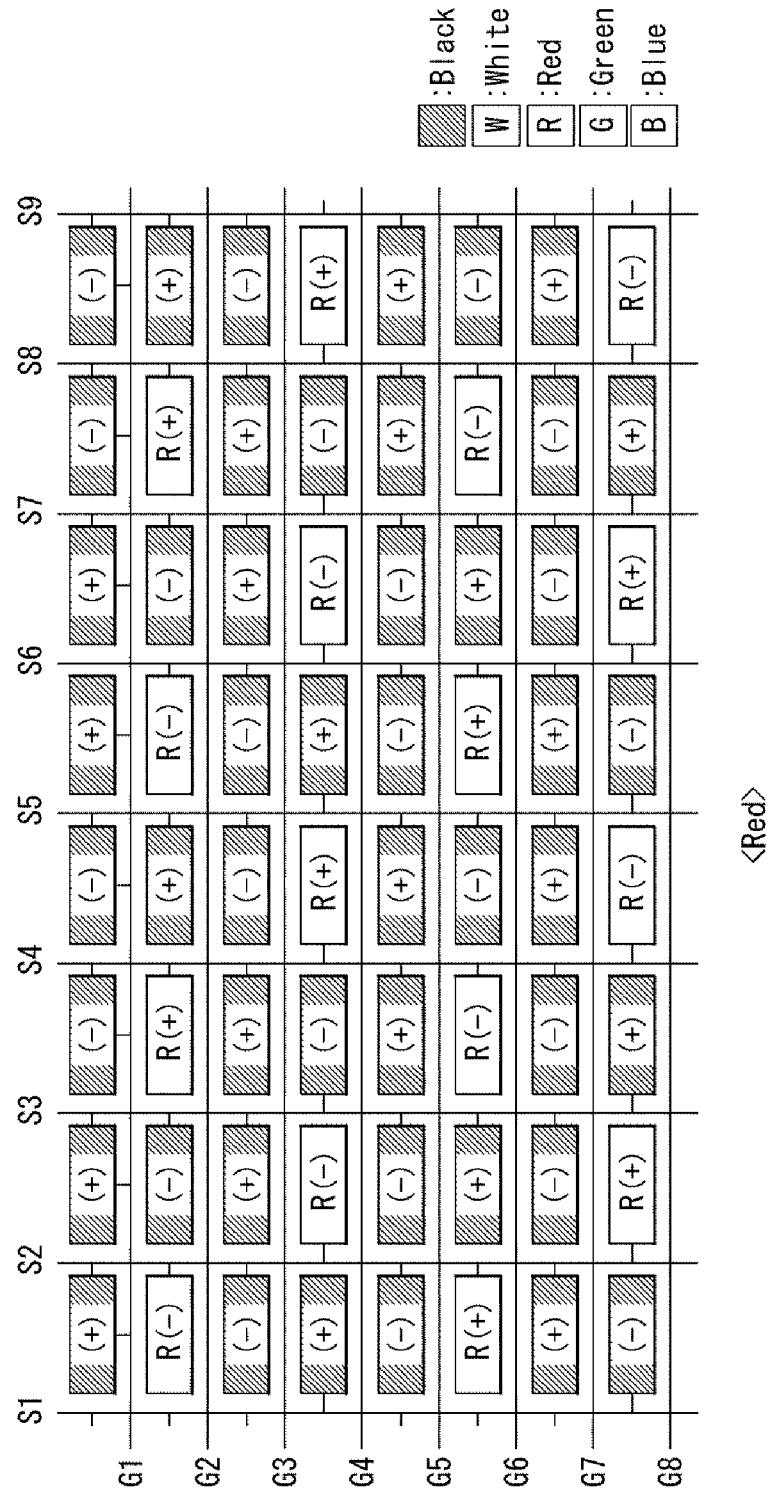

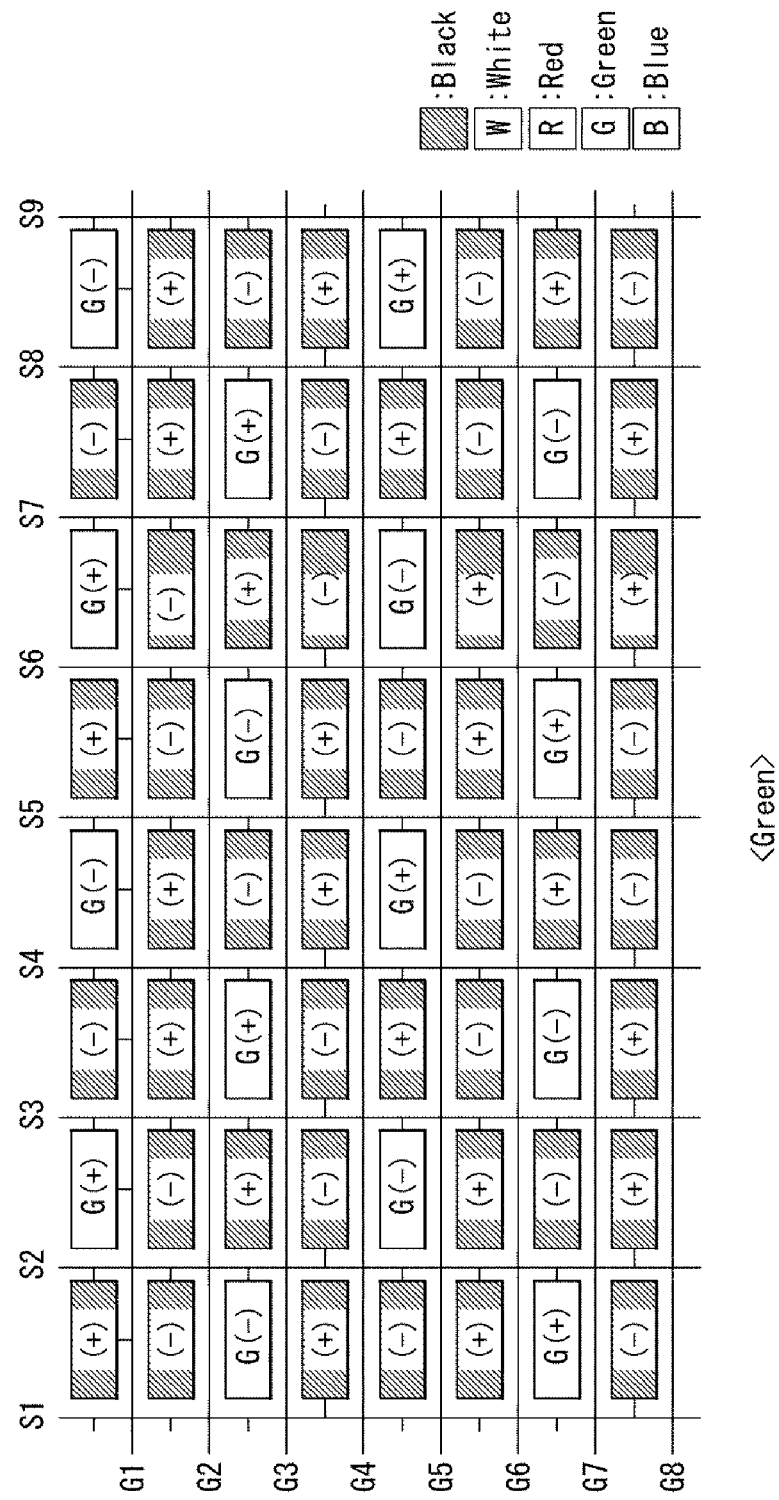

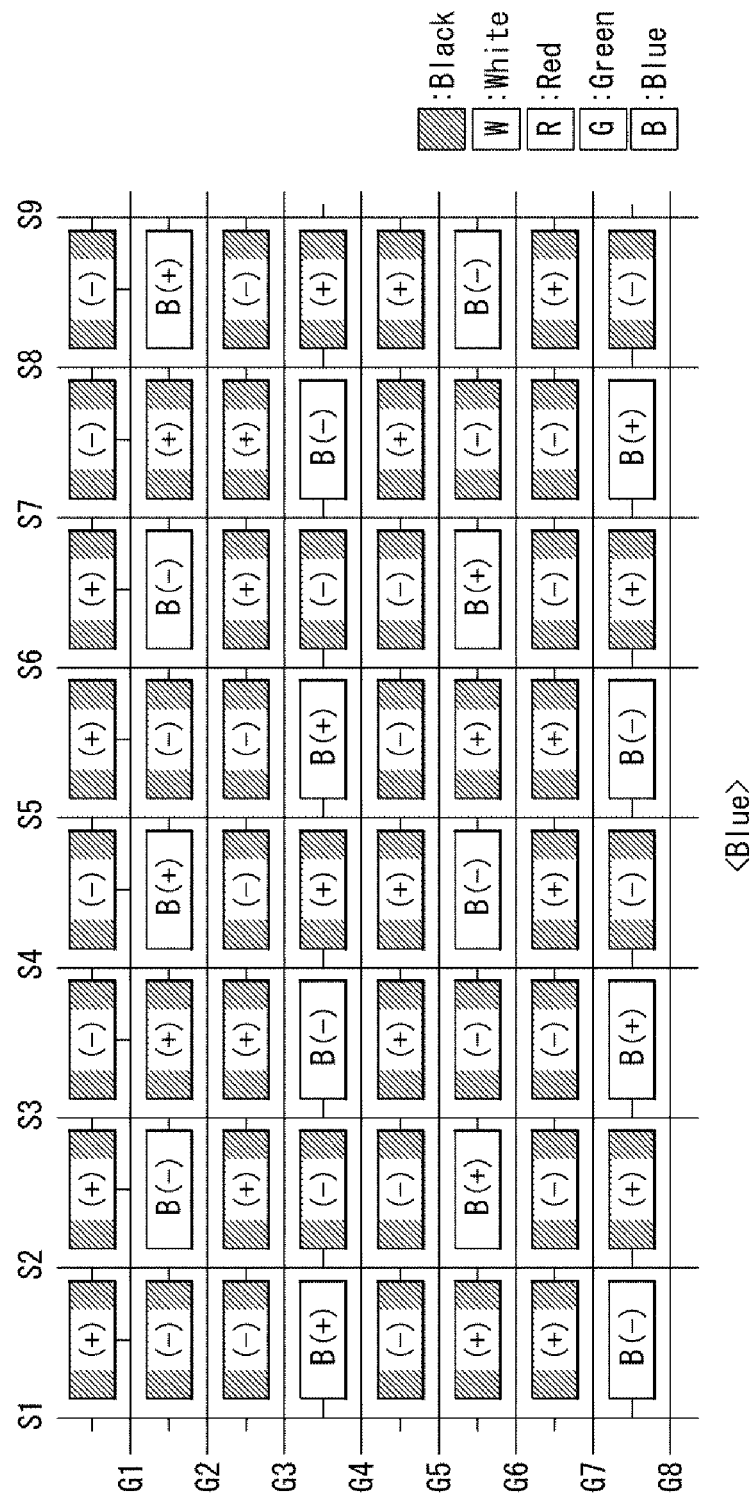

<Yellow>

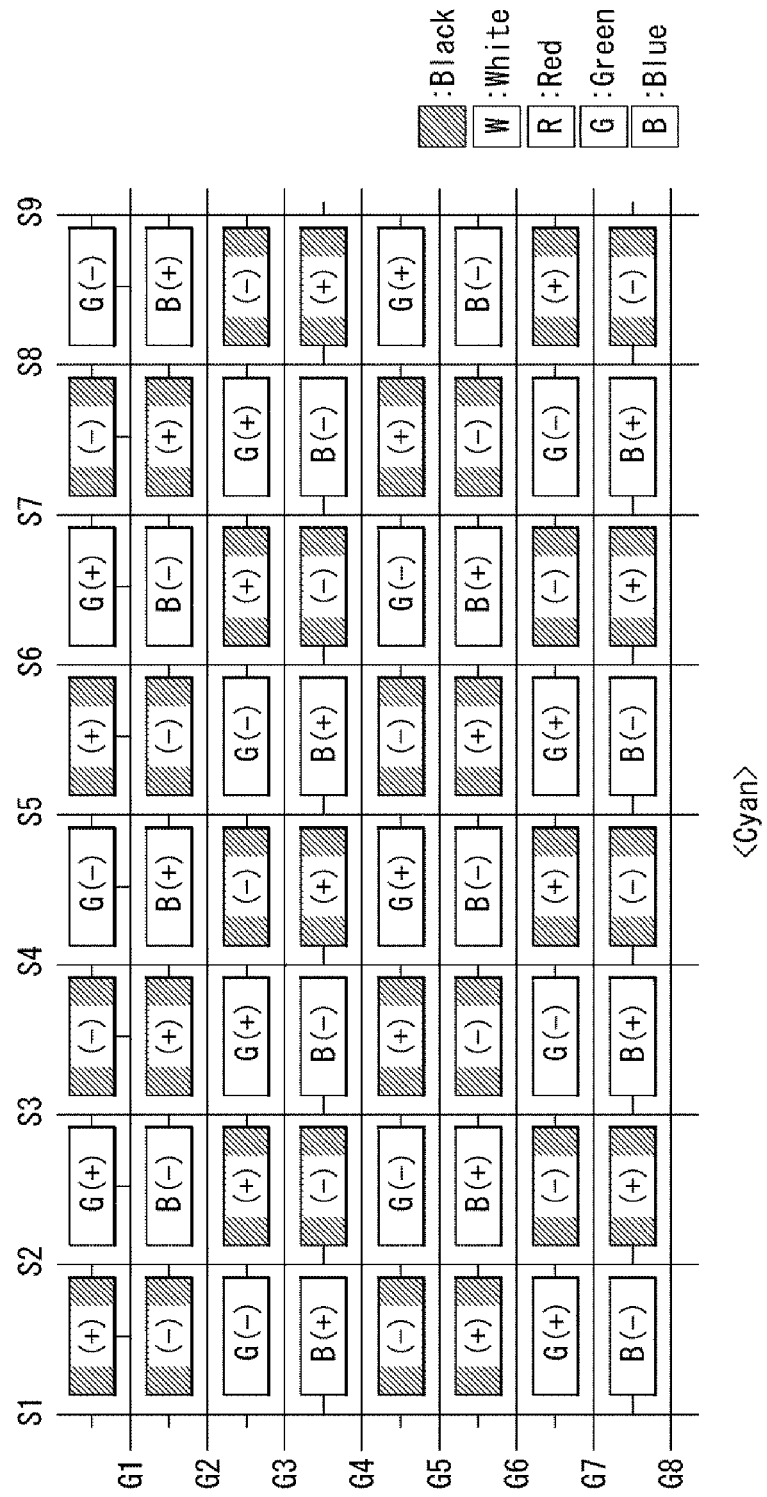

<Magenta>

\<White\>

FIG. 16B
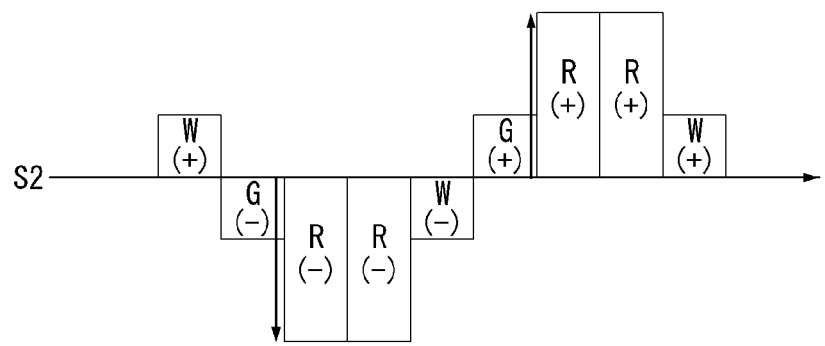
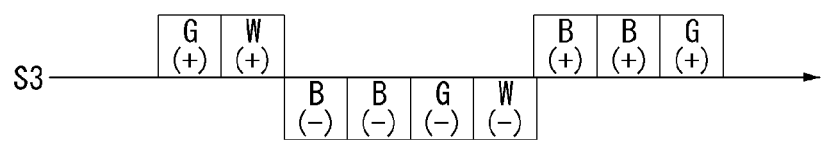
<Red>

<Green>

<Blue>

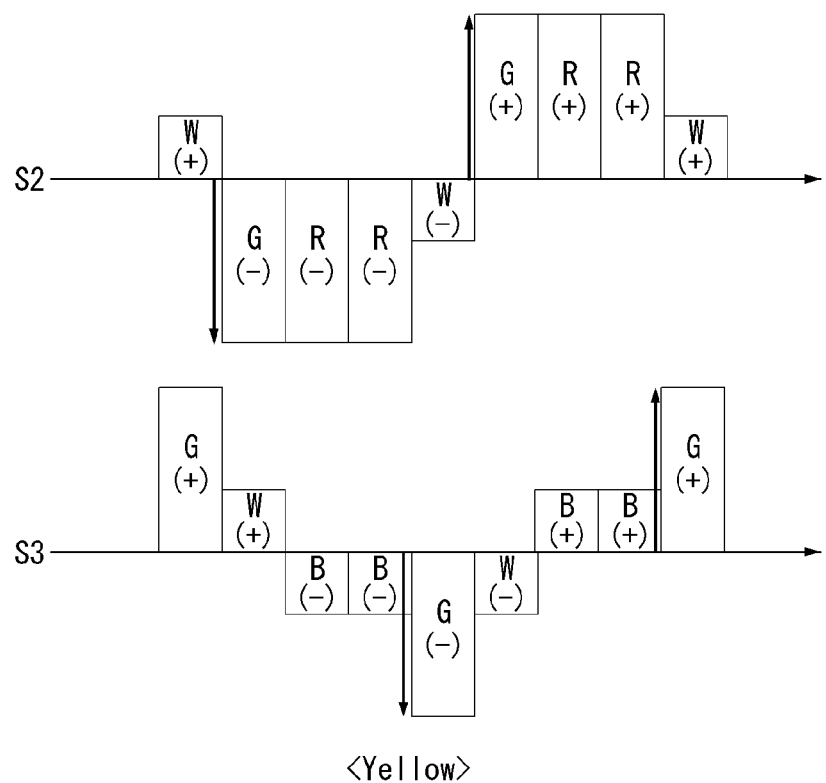

<Cyan>

FIG. 20A

|    | S1 | S2 | S3 | S4 | S5 |
|----|----|----|----|----|----|
| G1 | B(−) | R(−) | B(+) | R(+) | |
| G2 | W(+) | G(−) | W(−) | G(+) | |
| G3 | R(−) | B(+) | R(+) | B(−) | |
| G4 | G(−) | W(−) | G(+) | W(+) | |
| G5 | B(+) | R(+) | B(−) | R(−) | |
| G6 | W(−) | G(+) | W(+) | G(−) | |
| G7 | R(+) | B(−) | R(−) | B(+) | |
| G8 | G(+) | W(+) | G(−) | W(−) | |

W : White
R : Red
G : Green
B : Blue

<White>

<Green>

⟨Yellow⟩

<Cyan>

<White>

<Red>

FIG. 21C
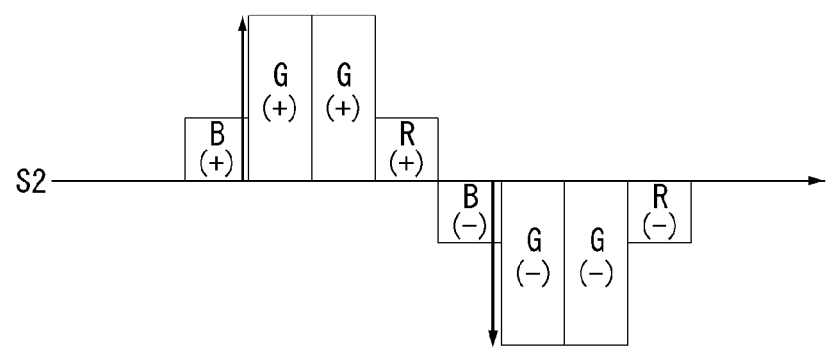
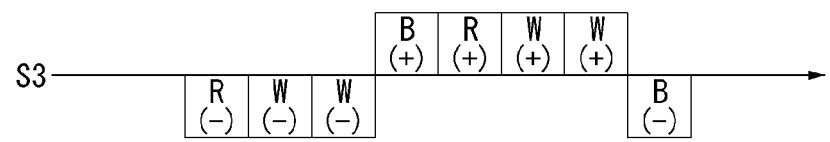
<Green>

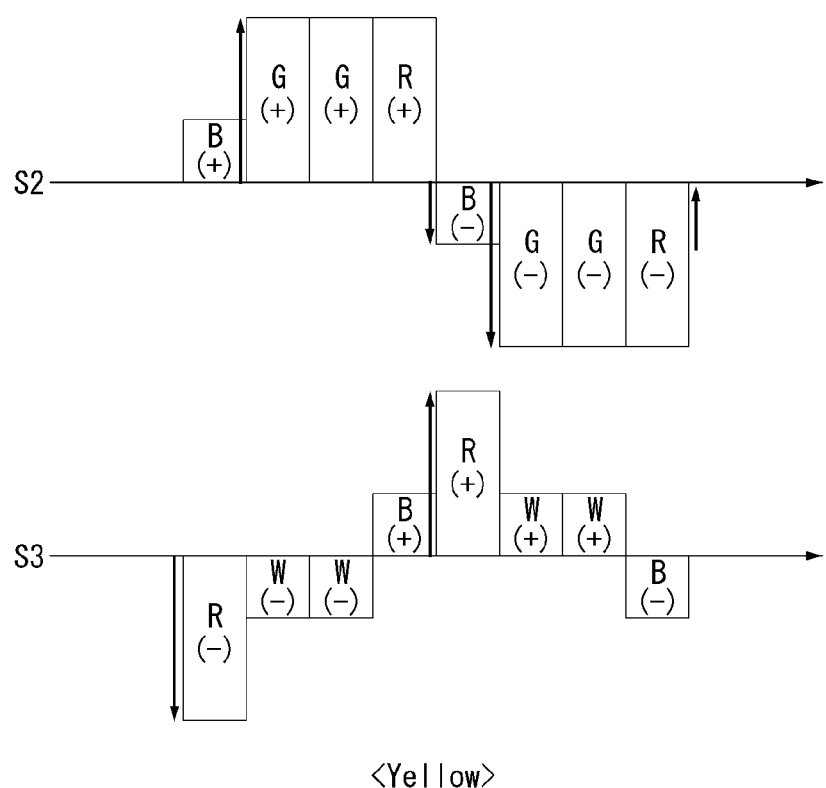

<Cyan>

<Magenta>

LIQUID CRYSTAL DISPLAY DEVICE

CROSS REFERENCE TO RELATED APPLICATION

This application claims the benefit of Korean Patent Application No. 10-2016-0067776 filed on May 31, 2016, the entire contents of which is incorporated herein by reference for all purposes as if fully set forth herein.

BACKGROUND

1. Field of the Disclosure

The present disclosure relates to a display device including red (R) subpixels, green (G) subpixels, blue (B) subpixels, and white (W) subpixels.

2. Discussion of the Background

A liquid crystal display displays an image by controlling an electric field applied to liquid crystal molecules according to a data voltage. Driven by the development of processing technology and driving technology, active-matrix liquid-crystal displays have dropped in price and improved in performance, and thus are one of the most widely used displays across almost all display applications, from small mobile devices to large televisions.

A liquid crystal display has a liquid crystal display panel, a backlight unit for illuminating the liquid crystal display panel, a source drive integrated circuit (hereinafter, "IC") for supplying data voltages to data lines of the liquid crystal display panel, a gate drive IC for supplying gate pulses (or scan pulses) to gate lines (or scan lines) of the liquid crystal display panel, a control circuit for controlling the ICs, and a light source drive circuit for driving the light source of the backlight unit.

A liquid crystal display including red (R) subpixels, green (G) subpixels, blue (B) subpixels, and white (W) subpixels is now being developed. Hereinafter, such a display device will be referred to as an "RGBW-type display device". The W subpixels can lower the brightness of the backlight unit by increasing the brightness of individual pixels, thus resulting in lower power consumption in liquid crystal displays.

TRD (Triple Rate Driving) is known as a technology that triples the data driving frequency of a pixel array, in order to reduce the number of source drive ICs (integrated circuits) in a liquid crystal display.

In a liquid crystal display with a typical pixel structure, RGB data voltages are supplied to one pixel's subpixels through three data lines during one horizontal period. In contrast, in the TRD technology, RGB data voltages are sequentially supplied to RGB subpixels though one data line. For example, an R data voltage is supplied to a red subpixel during a ⅓ horizontal period. Subsequently, a G data voltage is supplied to a green subpixel during a ⅓ horizontal period, and a B data voltage is then supplied to a blue subpixel during a ⅓ horizontal period. Thus, the TRD technology enables reduction in the number of data lines to ⅓, as compared to the typical pixel structure.

The TRD technology has the following problems when used in RGBW-type display devices.

First of all, data voltages supplied to subpixels of the same color connected to the same gate line may be dominated to one polarity. Due to this, a common voltage, which is a reference voltage for liquid crystals, may be shifted to the dominant polarity, thus causing horizontal crosstalk.

Secondly, if the polarity of a data voltage is reversed by column inversion to reduce heat generated from the source drive ICs, polarity banding phenomenon may occur. Polarity banding phenomenon means that neighboring subpixels are charged with data voltages of the same polarity. Polarity banding phenomenon causes uneven brightness. If there is polarity banding phenomenon, especially in neighboring subpixels of the same color, it leads to unevenness in brightness and color reproduction.

Thirdly, the source drive ICs generate more heat since more data voltage transitions occur with a specific color.

SUMMARY

Accordingly, the present disclosure is directed to a liquid crystal display device which can reduce heat generation from source drive ICs and improve picture quality, in order to drive a display panel including subpixels of four colors.

In one aspect of the present disclosure, a liquid crystal display device includes a plurality of data lines; a plurality of gate lines intersecting the plurality of data lines; a plurality of subpixels including first-color subpixels, second-color subpixels, third-color subpixels, and fourth-color subpixels; a data driver configured to reverse a polarity of data voltages for charging subpixels on a cycle and supply the data voltages to the plurality of data lines; and a gate driver configured to supply gate pulses to the plurality of gate lines in synchronization with the data voltages. In a pixel array formed of the plurality of subpixels, the first-color subpixels are arranged at positions where (4i+1)th row lines and odd-numbered column lines intersect, the second-color subpixels are arranged at positions where the (4i+1)th row lines and even-numbered column lines intersect, the third-color subpixels are arranged at positions where (4i+2)th row lines and the odd-numbered column lines intersect, the fourth-color subpixels are arranged at positions where the (4i+2)th row lines and the even-numbered column lines intersect, the second-color subpixels are arranged at positions where (4i+3)th row lines and the odd-numbered column lines intersect, the first-color subpixels are arranged at positions where the (4i+3)th row lines and the even-numbered column lines intersect, the fourth-color subpixels are arranged at positions where (4i+4)th row lines and the odd-numbered column lines intersect, and the third-color subpixels are arranged at positions where the (4i+4)th row lines and the even-numbered column lines intersect, wherein i is an integer greater than or equal to zero.

In another aspect of the present disclosure, the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the left of the third-color and the fourth-color subpixels to pixel electrodes of the third-color and the fourth-color subpixels, the first-color and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and the fourth-color subpixels arranged on the (4i+4)th low lines comprise TFTs configured to supply data voltages from the corresponding ones of the plurality of data lines to the left of the third-color and the fourth-color subpixels to the pixel electrodes of the third-color and the fourth color subpixels.

In another aspect of the present disclosure, the data driver is configured to supply the plurality of data lines with the data voltages whose polarity is reversed on the cycle of every 4 horizontal periods, the gate driver is configured to sequentially supply the gate pulses to the plurality of gate lines in order from a first gate line to a fourth gate line of the plurality of gate lines, the polarity of the data voltages supplied to the plurality of data lines is reversed on data voltages of the first-color subpixels, and there is a difference of 2 horizontal periods between the reversal of the polarity of the data voltages supplied to odd-numbered ones of the plurality of data lines and the reversal of the polarity of the data voltages supplied to even-numbered ones of the plurality of data lines.

In another aspect of the present disclosure, first color of the first-color subpixels is blue, second color of the second-color subpixels is red, third color of the third-color subpixels is white, and fourth color of the fourth-color subpixels is green.

In another aspect of the present disclosure, the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth-color subpixels, the first-color and the second-color subpixels arranged on the (4i+3)th low lines comprise TFTs configured to supply data voltages from corresponding ones of the plurality of data lines to the left of the first-color and the second-color subpixels to the pixel electrodes of the first-color and the second-color subpixels, and the third-color and the fourth-color subpixels arranged on the (4i+4)th low lines comprise TFTs configured to supply data voltages from corresponding ones of the plurality of data lines to the left of the third-color and the fourth-color subpixels to the pixel electrodes of the third-color and the fourth color subpixels.

In another aspect of the present disclosure, the data driver is configured to supply the plurality of data lines with data voltages whose polarity is reversed on a cycle of every 4 horizontal periods, and simultaneously reverse the polarity of the data voltages supplied to odd-numbered ones of the plurality of data lines and the polarity of the data voltages supplied to even-numbered ones of the plurality of data lines, the polarity of the data voltages supplied to the odd-numbered ones of the plurality of data lines is reversed on data voltages of the fourth-color subpixels, and the polarity of the data voltages supplied to the even-numbered ones of the plurality of data lines is reversed on data voltages of the third-color subpixels, the gate driver is configured to output the gate pulses in order from a first gate pulse to a fourth gate pulse, and among link lines connecting output channels of the gate driver and the plurality of gate lines, ones of the link lines connecting the output channels of the second and the third gate pulses and a second and a third gate lines of the plurality of gate lines intersect so that the third gate pulse is applied to the second gate line after the second gate pulse is applied to the third gate line.

In another aspect of the present disclosure, the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth color subpixels, the first-color and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and the fourth-color subpixels arranged on the (4i+4)th low lines comprise TFTs configured to supply data voltages from corresponding ones of the plurality of data lines to the left of the third-color and the fourth-color subpixels to the pixel electrodes of the third-color and the fourth-color subpixels.

In another aspect of the present disclosure, the data driver is configured to supply the plurality of data lines with data voltages whose polarity is reversed on the cycle of every 4 horizontal periods, the polarity of the data voltages that is supplied to odd-numbered ones of the plurality of data lines is reversed on data voltages of the fourth-color sub-pixels, and the polarity of the data voltages supplied to even-numbered ones of the plurality of data lines is reversed on data voltages of the second-color subpixels, fourth data voltage after reversal of the polarity of a data voltage supplied to each data line is a data voltage of the fourth-color subpixels, there is a difference of 1 horizontal period between the reversal of the polarity of the data voltages supplied to the odd-numbered ones of the plurality of data lines and the reversal of the polarity of data voltages supplied to the even-numbered ones of the plurality of data lines, the gate driver is configured to output the gate pulses in order from a first gate pulse to a fourth gate pulse, and among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

In another aspect of the present disclosure, the first-color and the second-color subpixels arranged on the (4i+1)th low lines comprise TFTs (thin-film transistors) configured supply data voltages from corresponding ones of the plurality of data lines to the left of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth-color subpixels, the first color- and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and fourth-color subpixels arranged on the (4i+4)th low lines comprise TFTs configured to supply data voltages from corresponding ones of the plurality of data lines to the right of the third-color and the fourth subpixels to the pixel electrodes of the third-color and the fourth-color subpixels.

In another aspect of the present disclosure, the data driver is configured to supply the plurality of data lines with data voltages whose polarity is reversed on the cycle of every 4 horizontal periods, the polarity of the data voltages supplied to the plurality of data lines is reversed on data voltages of the fourth-color subpixels, there is a difference of 1 horizontal period between the reversal in polarity of data voltages supplied to odd-numbered ones of the plurality data lines and the reversal in polarity of data voltages supplied to even-numbered ones of the plurality of data lines, the gate driver is configured to output the gate pulses in order from a first gate pulse to a fourth gate pulse, among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

In another aspect of the present disclosure, first color of first-color subpixels is white, second color of the second-color subpixels is green, third color of the third-color subpixels is red, and fourth color of the fourth-color subpixels is blue.

In one aspect of the present disclosure, a liquid crystal display device includes a display panel formed of a plurality subpixels; a data driver configured to supply of data voltages to the plurality of subpixels and reverse a polarity of the data voltages according to a cycle; and wherein the plurality of subpixels are arranged such that: first-color subpixels are arranged at positions where (4i+1)th row lines and odd-numbered column lines intersect and at positions where the (4i+3)th row lines and the even-numbered column lines intersect, second-color subpixels are arranged at positions where the (4i+1)th row lines and even-numbered column lines intersect and at positions where (4i+3)th row lines and the odd-numbered column lines intersect, third-color subpixels are arranged at positions where (4i+2) th row lines and the odd-numbered column lines intersect and at positions where the (4i+4)th row lines and the even-numbered column lines intersect, fourth-color subpixels are arranged at positions where the (4i+2)th row lines and the even-numbered column lines intersect and fourth-color subpixels are arranged at positions where (4i+4)th row lines and the odd-numbered column lines intersect, and i is an integer greater than or equal to zero.

In another aspect of the present disclosure, the liquid crystal display further includes a plurality of data lines; a plurality of gate lines intersecting the plurality of data lines; and a gate driver configured to supply gate pulses to the plurality of gate lines in synchronization with the data voltages.

In another aspect of the present disclosure, the data driver is configured to supply the plurality of data lines with the data voltages whose polarity is reversed on the cycle of every 4 horizontal periods, the gate driver is configured to sequentially supply the gate pulses to the plurality of gate lines in order from a first gate line to a fourth gate line of the plurality of gate lines, the polarity of the data voltages supplied to the plurality of data lines is reversed on data voltages of the first-color subpixels, and the reversal of the polarity of the data voltages supplied to odd-numbered ones of the plurality of data lines and the reversal of the polarity of the data voltages supplied to even-numbered ones of the plurality of data lines differ by 2 horizontal periods.

In another aspect of the present disclosure, the first-color subpixels display the blue color, the second-color subpixels display the red color, the third-color subpixels display the white color, and the fourth-color subpixels display the green color.

In another aspect of the present disclosure, the data driver is configured to, supply the plurality of data lines with data voltages whose polarity is reversed on a cycle of every 4 horizontal periods, and simultaneously reverse the polarity of the data voltages supplied to odd-numbered ones of the plurality of data lines and the polarity of the data voltages supplied to even-numbered ones of the plurality of data lines, the polarity of the data voltages supplied to the odd-numbered ones of the plurality of data lines is reversed on data voltages of the fourth-color subpixels, the polarity of the data voltages supplied to the even-numbered ones of the plurality of data lines is reversed on data voltages of the third-color subpixels, the gate driver is configured to output the gate pulses in order from a first gate pulse to a fourth gate pulse, and among link lines connecting output channels of the gate driver and the plurality of gate lines, ones of the link lines connecting the output channels of the second and third gate pulses and a second and a third gate lines of the plurality of gate lines intersect so that the third gate pulse is applied to the second gate line after the second gate pulse is applied to the third gate line.

In another aspect of the present disclosure, the data driver is configured to supply the plurality of data lines with data voltages whose polarity is reversed on the cycle of every 4 horizontal periods, the polarity of the data voltages that is supplied to odd-numbered ones of the plurality of data lines is reversed on data voltages of the fourth-color sub-pixels, the polarity of the data voltages supplied to even-numbered ones of the plurality of data lines is reversed on data voltages of the second-color subpixels, fourth data voltage after reversal of the polarity of a data voltage supplied to each data line is a data voltage of the fourth-color subpixels, the reversal of the polarity of the data voltages supplied to the odd-numbered ones of the plurality of data lines and the reversal of the polarity of data voltages supplied to the even-numbered ones of the plurality of data lines differ by 1 horizontal period, the gate driver is configured to output the gate pulses in order from a first gate pulse to a fourth gate pulse, and among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

In another aspect of the present disclosure, the data driver is configured to supply the plurality of data lines with data voltages whose polarity is reversed on the cycle of every 4 horizontal periods, the polarity of the data voltages supplied to the plurality of data lines is reversed on data voltages of the fourth-color subpixels, the reversal in polarity of data voltages supplied to odd-numbered ones of the plurality data lines and the reversal in polarity of data voltages supplied to even-numbered ones of the plurality of data lines differ by 1 horizontal period, the gate driver is configured to output the gate pulses in order from a first gate pulse to a fourth gate pulse, among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

In another aspect of the present disclosure, the first-color subpixels displays the white color, the second-color subpixels displays the green color, the third-color subpixels displays the red color, and the fourth-color subpixels displays the blue color.

In another aspect of the present disclosure, two or more of the plurality of subpixels form one of a plurality of pixels of the display panel such that each of the plurality of pixels is formed of two of the plurality of subpixels having two different colors, three of the plurality of subpixels having three different colors, or four of the plurality of subpixels having four different colors.

In one aspect of the present disclosure, a liquid crystal display device includes a plurality of data lines; a plurality of gate lines intersecting the plurality of data lines and a pixel array including a plurality of subpixels formed of first-color subpixels, second-color subpixels, third-color subpixels, and fourth-color subpixels, the plurality of subpixels having one of a first arrangement and a second arrangement, the first arrangement being an arrangement in which in each row of the pixel array two of the first-color to fourth-color subpixels are interleaved, the second arrangement being a different arrangement than the first arrangement in which in each row of the pixel array two of the first-color to fourth-color subpixels are interleaved. The liquid crystal display device further includes a data driver configured to drive the pixel array according to a first driving method when the pixel array has the first arrangement and drive the pixel array according to at least one second driving method that is different from the first driving method when the pixel array has the second arrangement. The liquid crystal display device also includes a gate driver configured to supply gate pulses to the plurality of gate lines in synchronization with data voltages supplied by the data driver.

In another aspect of the present disclosure, the data driver is configured to drive the pixel array according to the first driving method by periodically supplying a data voltage having one of a first polarity or a second polarity to one of a plurality of groups of four subpixels of the pixel array connected to an odd-numbered column of the plurality of data lines, each subpixel in each of the plurality of groups of four subpixels corresponding to a different one of the first-color to fourth-color subpixels. After supplying the data voltage to one of the groups of four subpixels, reversing the polarity of the data voltage between the first polarity and the second polarity, and repeating the supplying after the reversing of the polarity of the data voltage. The supplying and the reversing steps are performed periodically with respect to groups of four subpixels of the pixel array connected to an even-numbered column of the plurality of data lines, and there is a difference of 2 horizontal periods between the reversal of the polarity of the data voltages for pixels connected to the odd-numbered column of the plurality of data lines and pixels connected to the even-numbered column of the plurality of data lines.

In another aspect of the present disclosure, the data driver is configured to drive the pixel array according to the at least one second driving method by periodically supplying a data voltage having one of a first polarity or a second polarity to one of a first plurality of groups of four subpixels of the pixel array connected to an odd-numbered column of the plurality of data lines, first and second subpixels in each of the first plurality of groups of four subpixels corresponding to the first-color subpixels, third and fourth subpixels in each of the first plurality of groups of four subpixels corresponding to the second-color subpixels. After supplying the data voltage to one of the first plurality of groups of four subpixels, reversing the polarity of the data voltage between the first polarity and the second polarity, and repeating the supplying with respect to a next one of the first plurality of groups of four subpixels, after the reversing of the polarity of the data voltage. The data driver is further configured to drive the pixel array according to the at least one second driving method by periodically supplying the data voltage to one of a second plurality of groups of four subpixels of the pixel array connected to an even-numbered column of the plurality of data lines, first and second subpixels in each of the second plurality of groups of four subpixels corresponding to the third-color subpixels, third and fourth subpixels in each of the second plurality of groups of four subpixels corresponding to the fourth-color subpixels, polarity of the data voltage supplied to each of the second plurality of groups of four subpixels being opposite of the polarity of the data voltage being supplied to each of the first plurality of groups of four subpixels. After supplying the data voltage to one of the second plurality of groups of four subpixels, reversing the polarity of the data voltage between the first polarity and the second polarity, and repeating the supplying with respect to a next one of the second plurality of groups of four subpixels, after the reversing of the polarity of the data voltage. The reversals of the polarity of the data voltages for pixels connected to the odd-numbered column of the plurality of data lines and pixels connected to the even-numbered column of the plurality of data lines are performed simultaneously.

In another aspect of the present disclosure, the data driver is configured to drive the pixel array according to the at least one second driving method by periodically supplying a data voltage having one of a first polarity or a second polarity to one of a first plurality of groups of four subpixels of the pixel array connected to an odd-numbered column of the plurality of data lines, first and second subpixels in each of the first plurality of groups of four subpixels corresponding to the first-color subpixels, third subpixel in each of the first plurality of groups of four subpixels corresponding to the second-color subpixels, fourth subpixel in each of the first plurality of groups of four subpixels corresponding to the third-color subpixels. After supplying the data voltage to one of the first plurality of groups of four subpixels, reversing the polarity of the data voltage between the first polarity and the second polarity and repeating the supplying with respect to a next one of the first plurality of groups of four subpixels, after the reversing of the polarity of the data voltage. The data driver is further configured to drive the pixel array according to the at least one second driving method by periodically supplying the data voltage to one of a second plurality of groups of four subpixels of the pixel array connected to an even-numbered column of the plurality of data lines, first subpixel in each of the second plurality of groups of four subpixels corresponding to the second-color subpixels, second and third subpixels in each of the second plurality of groups of four subpixels corresponding to the fourth-color subpixels, fourth subpixel in each of the first plurality of groups of four subpixels corresponding to the third-color subpixels. After supplying the data voltage to one of the second plurality of groups of four subpixels, reversing the polarity of the data voltage between the first polarity and the second polarity, and repeating the supplying with respect to a next one of the second plurality of groups of four subpixels, after the reversing of the polarity of the data voltage. There is a difference of 1 horizontal periods between the reversal of the polarity of the data voltages for pixels connected to the odd-numbered column of the plurality of data lines and pixels connected to the even-numbered column of the plurality of data lines.

In another aspect of the present disclosure, the data driver is configured to drive the pixel array according to the at least one second driving method by periodically supplying a data voltage having one of a first polarity or a second polarity to one of a first plurality of groups of four subpixels of the pixel array connected to an odd-numbered column of the plurality of data lines, first subpixel in each of the first plurality of groups of four subpixels corresponding to the first-color subpixels, second subpixel in each of the first plurality of groups of four subpixels corresponding to the second-color subpixels, third and fourth subpixels in each of the first plurality of groups of four subpixels corresponding to the third-color subpixels. After supplying the data voltage to one of the first plurality of groups of four subpixels, reversing the polarity of the data voltage between the first polarity and the second polarity and repeating the supplying with respect to a next one of the first plurality of groups of four subpixels, after the reversing of the polarity of the data voltage. The data driver is further configured to drive the pixel array according to the at least one second driving method by periodically supplying the data voltage to one of a second plurality of groups of four subpixels of the pixel array connected to an even-numbered column of the plurality of data lines, first subpixel in each of the second plurality of groups of four subpixels corresponding to the first-color subpixels, second and third subpixels in each of the second plurality of groups of four subpixels corresponding to the fourth-color subpixels, fourth subpixel in each of the first plurality of groups of four subpixels corresponding to the second-color subpixels. After supplying the data voltage to one of the second plurality of groups of four subpixels, reversing the polarity of the data voltage between the first polarity and the second polarity, and repeating the supplying with respect to a next one of the second plurality of groups of four subpixels, after the reversing of the polarity of the data voltage. There is a difference of 1 horizontal period between the reversal of the polarity of the data voltages for pixels connected to the odd-numbered column of the plurality of data lines and pixels connected to the even-numbered column of the plurality of data lines.

BRIEF DESCRIPTION OF THE DRAWINGS

The accompanying drawings, which are included to provide a further understanding of the present disclosure and are incorporated in and constitute a part of this specification, illustrate examples of the present disclosure and together with the description serve to explain the principles of the present disclosure. In the drawings:

FIG. 1 is a block diagram of a liquid crystal display device according to an aspect of the present disclosure on;

FIG. 4 is a waveform diagram showing output signals from source drive ICs and a gate driver for driving the pixel array of FIGS. 2 and 3 according to an aspect of the present disclosure;

FIGS. 5A to 5G are views showing which subpixels are lit up and their polarity, when white, red, green, blue, yellow, cyan, and magenta patterns are displayed on the pixel array according to an aspect of the present disclosure;

FIGS. 6A to 6G are views showing data voltages when the colors of FIGS. 5A to 5G are displayed on the pixel array according to an aspect of the present disclosure;

FIG. 9 is a waveform diagram showing output signals from source drive ICs and a gate driver for driving the pixel array of FIGS. 7 and 8 according to an aspect of the present disclosure;

FIGS. 10A to 10G are views showing which subpixels are lit up and their polarity, when white, red, green, blue, yellow, cyan, and magenta patterns are displayed on the pixel array according to an aspect of the present disclosure;

FIGS. 11A to 11G are views showing data voltages when the colors of FIGS. 10A to 10G are displayed on the pixel array according to an aspect of the present disclosure;

FIGS. 15A to 15G are views showing which subpixels are lit up and their polarity, when white, red, green, blue, yellow, cyan, and magenta patterns are displayed on the pixel array according to an aspect of the present disclosure;

FIGS. 16A to 16G are views showing data voltages when the colors of FIGS. 15A to 15G are displayed on the pixel array according to an aspect of the present disclosure;

FIGS. 20A to 20G are views showing which subpixels are lit up and their polarity, when white, red, green, blue, yellow, cyan, and magenta patterns are displayed on the pixel array according to an aspect of the present disclosure; and FIGS. 21A to 21G are views showing data voltages when the colors of FIGS. 20A to 20G are displayed on the pixel array according to an aspect of the present disclosure.

DETAILED DESCRIPTION

Figure 1:
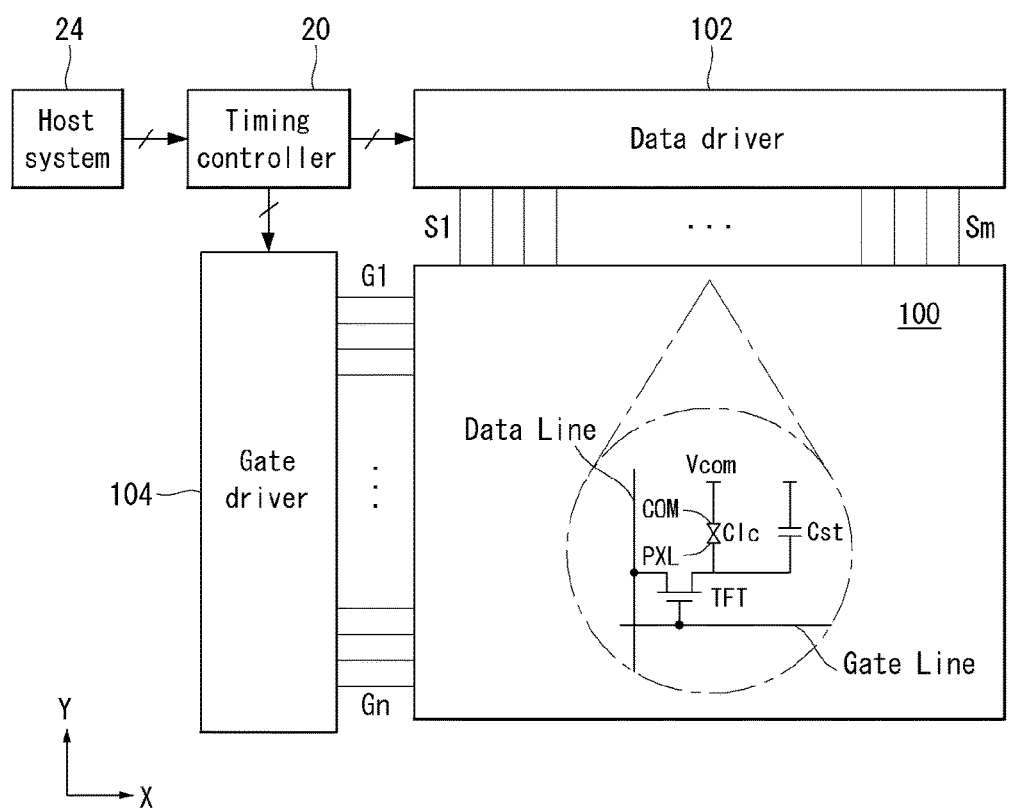

Hereinafter, the present disclosure will be described in detail with reference to the attached drawings. Throughout the specification, like reference numerals denote substantially like components. While specific implementations are discussed, it should be understood that this is done for illustration purposes only. A person skilled in the relevant art will recognize that other components and configurations may be used without parting from the spirit and scope of the disclosure.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative example mutually exclusive of other examples. Moreover, various features are described which may be exhibited by some examples and not by others.

Similarly, various requirements are described which may be requirements for some examples but not other examples.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Further, in describing components of the present disclosure, terms such as first, second, A, B, (a), (b), etc. can be used. These terms are used only to differentiate the components from other components. For example, a first element could be termed a second element, and similarly, a second element could be termed a first element, without departing from the scope of this disclosure. As used herein, the term "and/or," includes any and all combinations of one or more of the associated listed items.

Therefore, the nature, order, sequence, etc. of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring example examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

Referring to FIG. 1, a liquid crystal display device according to the present disclosure has a display panel 100 with a pixel array and a display panel drive circuit for writing data for an input image to the display panel 100. A backlight unit for evenly illuminating the display panel 100 may be disposed under the display panel 100.

In order to reduce the number of source drive ICs, this display device supplies red data (hereinafter, "R data"), green data (hereinafter, "G data"), blue data (hereinafter, "B data), and white data (hereinafter, "W data") to pixels through one data line.

The display panel 100 includes an upper substrate and a lower substrate that face each other with a liquid crystal layer in between. A pixel array on the display panel 100 includes pixels that are arranged in a matrix formed by the intersections of data lines S1 to Sm and gate lines G1 to Gn, where m and n are positive integers that may or may not have the same value.

Each pixel can include subpixels of two colors, three colors, or four colors, among an R subpixel for R data to be written to it, a G subpixel for G data to be written to it, a B subpixel for B data to be written to it, and a W subpixel for W data to be written to it. In a case where one pixel includes subpixels of four colors, each pixel includes RGBW subpixels. In a case where one pixel includes subpixels of three colors, a first pixel can include WRG subpixels and a second pixel neighboring the first pixel can include BWR subpixels. In this case, a preset subpixel rendering algorithm can be used to distribute a data value for the color each pixel lacks among one or more surrounding pixels to compensate for the color. Each subpixel is longer along the row line X than along the column line Y and has a TFT.

An arrangement of colors in the pixel array are as shown in FIGS. 2 and 3, FIGS. 7 and 8, FIGS. 12 and 13, and FIGS. 17 and 18. In this pixel array, first-color subpixels and second-color subpixels are alternately arranged on the (4i+1)th row lines L1 and L5 (i is an integer equal to or greater than zero). The first-color subpixels are arranged at positions where the (4i+1)th row lines L1 and L5 and the odd-numbered column lines C1 and C3 intersect. The second-color subpixels are arranged at positions where the (4i+1)th row lines L1 and L5 and the even-numbered column lines C2 and C4 intersect.

Third-color subpixels and fourth-color subpixels are alternately arranged on the (4i+2)th row lines L2 and L6. The third-color subpixels are arranged at positions where the (4i+2)th row lines L2 and L6 and the odd-numbered column lines C1 and C3 intersect. The fourth-color subpixels are arranged at positions where the (4i+2)th row lines L2 and L6 and the even-numbered column lines C2 and C4 intersect.

Second-color subpixels and first-color subpixels are alternately arranged on the (4i+3)th row lines L3 and L7. The second-color subpixels are arranged at positions where the (4i+3)th row lines L3 and L7 and the odd-numbered column lines C1 and C3 intersect. The first-color subpixels are arranged at positions where the (4i+3)th row lines L3 and L7 and the even-numbered column lines C2 and C4 intersect.

Fourth-color subpixels and third-color subpixels are alternately arranged on the (4i+4)th row lines L4 and L8. The fourth-color subpixels are arranged at positions where the (4i+4)th row lines L4 and L8 and the odd-numbered column lines C1 and C3 intersect. The third-color subpixels are arranged at positions where the (4i+4)th row lines L4 and L8 and the even-numbered column lines C2 and C4 intersect.

The structure and driving method of the pixel array will be described in detail in conjunction with FIGS. 2 to 21G.

The lower substrate of the display panel 100 includes data lines S1 to Sm, gate lines G1 to Gn, TFTs (Thin-Film Transistors), pixel electrodes PXL connected to the TFTs, and storage capacitors Cst connected to the pixel electrodes PXL. Each pixel displays an image of video data by adjusting the amount of light transmission by using liquid crystal molecules, which are driven by a voltage difference between the pixel electrode PXL charged with a data voltage through the TFT and a common electrode COM to which a common voltage Vcom is applied.

A black matrix and a color filter array including color filters are formed on the upper substrate of the display panel 100. The common electrode COM may be formed on the upper substrate in the case of vertical electric field-driven type, such as TN (Twisted Nematic) mode and VA (Vertical Alignment) mode, and may be formed on the lower substrate, along with the pixel electrodes, in the case of horizontal electric field-driven type, such as IPS (In-Plane Switching) mode and FFS (Fringe Field Switching) mode. Polarizers are attached to the upper and lower substrates of the display panel 100, respectively, and alignment films for setting a pre-tilt angle of liquid crystals are formed on them.

The liquid crystal display device of this disclosure can be implemented in any form, including a transmissive liquid crystal display, a semi-transmissive liquid crystal display, and a reflective liquid crystal display. The transmissive liquid crystal display and the semi-transmissive liquid crystal display require a backlight unit. The backlight unit can be implemented as a direct-type backlight unit or an edge-type backlight unit.

The display panel drive circuit writes data for an input image to the pixels. The display panel drive circuit includes a data driver 102, a gate driver 104, a timing controller 20, etc.

The data driver 102 includes at least one source drive IC. Data output channels of the source drive ICs are connected to the data lines S1 to Sm of the pixel array. The source drive ICs receive data for an input image from the timing controller 20. Digital video data transmitted to the source drive ICs includes R data, G data, B data, and W data. The source drive ICs convert the data to positive/negative gamma compensation voltages under the control of the timing controller 20 and output positive/negative data voltages. The source drive ICs reverse the polarity of data voltages on a desired (and/or alternatively, predetermined) cycle under the control of the timing controller 20 and output the data voltages to the data lines S1 to Sm. The cycle is 4 horizontal periods in the following examples, but the present disclosure is not limited to this.

The source drive ICs reverse the polarity of data voltages supplied through one data line, once for every 4 dots, in response to a polarity control signal POL from the timing controller 20. Here, a dot refers to a subpixel. The source drive ICs keep the same polarity for data voltages of four colors sequentially supplied through one data line, then reverse their polarity by 4-dot inversion, and then output data voltages of reversed polarity. Thus, the polarity reversal cycle for data voltages output from the source drive ICs is long, which leads to less data voltage transitions and lower power consumption. Consequently, the power consumption and heat generation of the source drive ICs can be reduced.

An R data voltage, a G data voltage, a B data voltage, and a W data voltage are supplied to RGBW subpixels through one data line. Accordingly, the liquid crystal display device of the present disclosure can reduce the number of data lines and the number of source drive ICs compared to the conventional schemes while maintaining the same resolution on the display panel.

Because of the correlation between the polarity reversal cycle of the source drive ICs and the pixel array structure, neighboring subpixels of the same color along the row line direction (x) and the column line direction (y) have opposite polarity. Since neighboring subpixels of the same color have opposite polarity, there is no polarity banding phenomenon between neighboring subpixels of the same color. Moreover, for subpixels of the same color, the sum of subpixels with positive polarity (+) is equal to the sum of subpixels with negative polarity (−). Thus, the sum of subpixels with positive polarity (+) and the sum of subpixels with negative polarity (−) may cancel each other out when added together, thereby attaining the balance of polarity without dominant polarity. As a result, the display device of this disclosure has no noise such as vertical lines since there is no polarity banding phenomenon in which neighboring subpixels of the same color have the same polarity, and no common voltage shift occurs because of the balance of polarity, thereby reproducing an input image with a picture quality that is crosstalk-free.

The gate driver 104 sequentially supplies gate pulses to the gate lines G1 to Gn under the control of the timing controller 20. The gate pulses output from the gate driver 104 are synchronized with positive/negative video data voltages with which the pixels are charged. To reduce the IC cost, the gate driver 104 may be formed directly on the lower substrate of the display panel 100, along with the pixel array, in the manufacturing process.

Output channels of the gate driver 104 and the gate lines G1 to Gn of the pixel array are connected one to one through link lines. In the following examples, the output sequence of gate pulses may be different on some gate lines. In this case, some of the link lines that connect the output channels of the gate driver 104 to the gate lines may intersect so that gate pulses are supplied to the pixel array in a non-sequential manner, without changing the output channels of the gate driver 104. Thus, although the gate driver 104 outputs gate pulses sequentially, starting from the first output channel, the gate pulses may be applied non-sequentially to the gate lines 14 of the pixel array.

In one example, timing controller 20 converts an input image's RGB data received from a host system 24 to RGBW data and transmits it to the data driver 102. A mini LVDS (low-voltage differential signaling) interface or an EPI (embedded panel interface) interface may be used as an interface for data transmission between the timing controller 20 and the source drive ICs of the data driver 102. The EPI interface may use the interface technologies which were proposed in Korean Patent Application No. 10-2008-0127458 (2008 Dec. 15), U.S. patent application Ser. No. 12/543,996 (2009 Aug. 19), Korean Patent Application No. 10-2008-0127456 (2008 Dec. 15), U.S. patent application Ser. No. 12/461,652 (2009 Aug. 19), Korean Patent Application No. 10-2008-0132466 (2008 Dec. 23), and U.S. patent application Ser. No. 12/537,341 (2009 Aug. 7) filed by the applicant, the entire contents of which are incorporated herein by reference.

The timing controller 20 receives timing signals synchronized with input image data from the host system 24. The timing signals include a vertical synchronization signal Vsync, a horizontal synchronization signal Hsync, a data enable signal DE, a dot clock DCLK, etc. The timing controller 20 controls the operation timings of the data driver 102 and gate driver 104 based on timing signals Vsync, Hsync, DE, and DCLK that are received along with pixel data for an input image. The timing controller 20 can transmit a polarity control signal POL for controlling the polarity of the pixel array to each of the source drive ICs of the data driver 102. The mini LVDS interface transmits the polarity control signal through a separate control line. The EPI interface is an interface technology that encodes polarity control information into a control data packet transmitted between a clock training pattern for CDR (Clock and Data Recovery) and an RGBW data packet, and that transmits the encoded polarity control information to each of the source drive ICs.

The timing controller 20 can convert RGB data for an input image to RGBW data by using a gain calculation algorithm. Any currently known or to be developed gain calculation algorithm can be used. For example, the white calculation algorithms proposed in Korean Patent Application No. 10-2005-0039728 (2005 Apr. 12), Korean Patent Application No. 10-2005-0052906 (2005 Jun. 20), Korean Patent Application No. 10-2005-0066429 (2007 Jul. 21), and Korean Patent Application No. 10-2006-0011292 (2006 Feb. 6) filed by the applicant, the entire contents of which are incorporated herein by reference. Moreover, the timing controller 20 may execute a preset subpixel rendering algorithm to distribute a data value among neighboring pixels.

The host system 24 can be any one of, but is not limited to, the following: a television system, a set-top box, a navigation system, a DVD player, a personal computer (PC), a home theater system, and a phone system.

Figure 2:
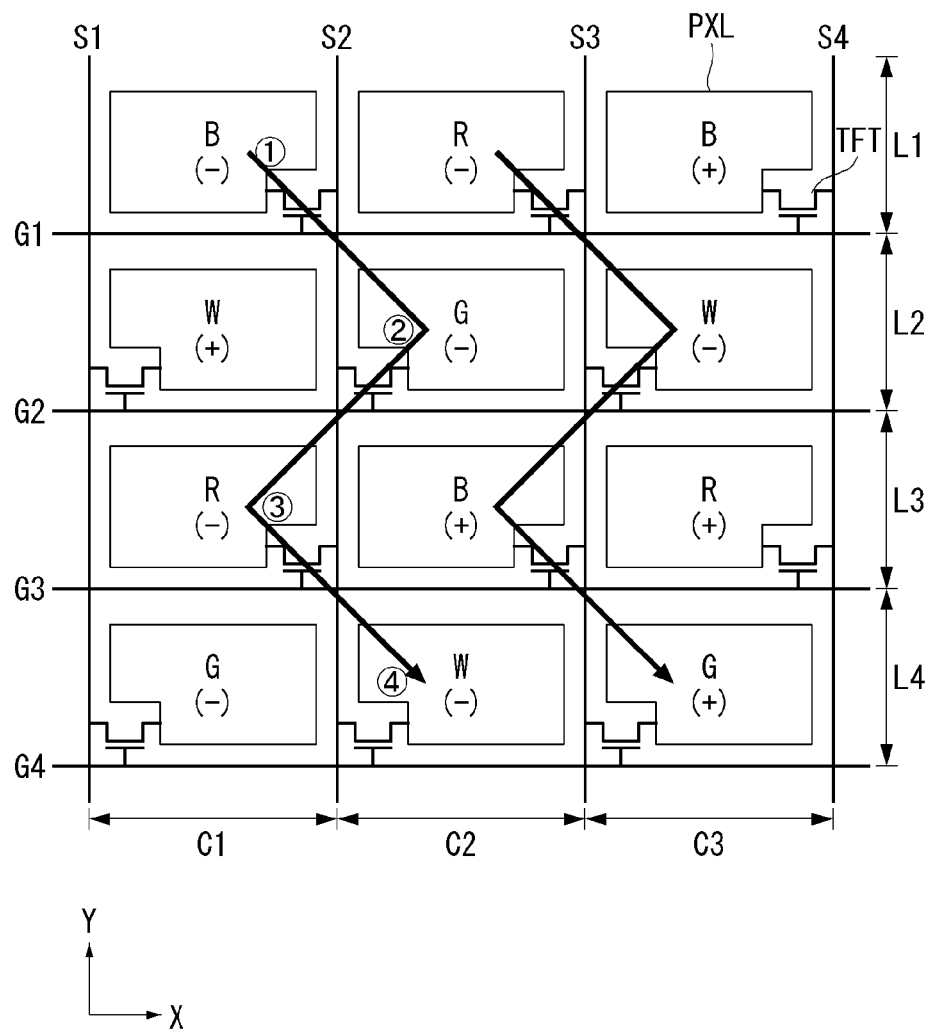
FIGS. 2 and 3 are views showing a pixel array structure and a data voltage charging sequence according to an aspect of the present disclosure.
Figure 3:
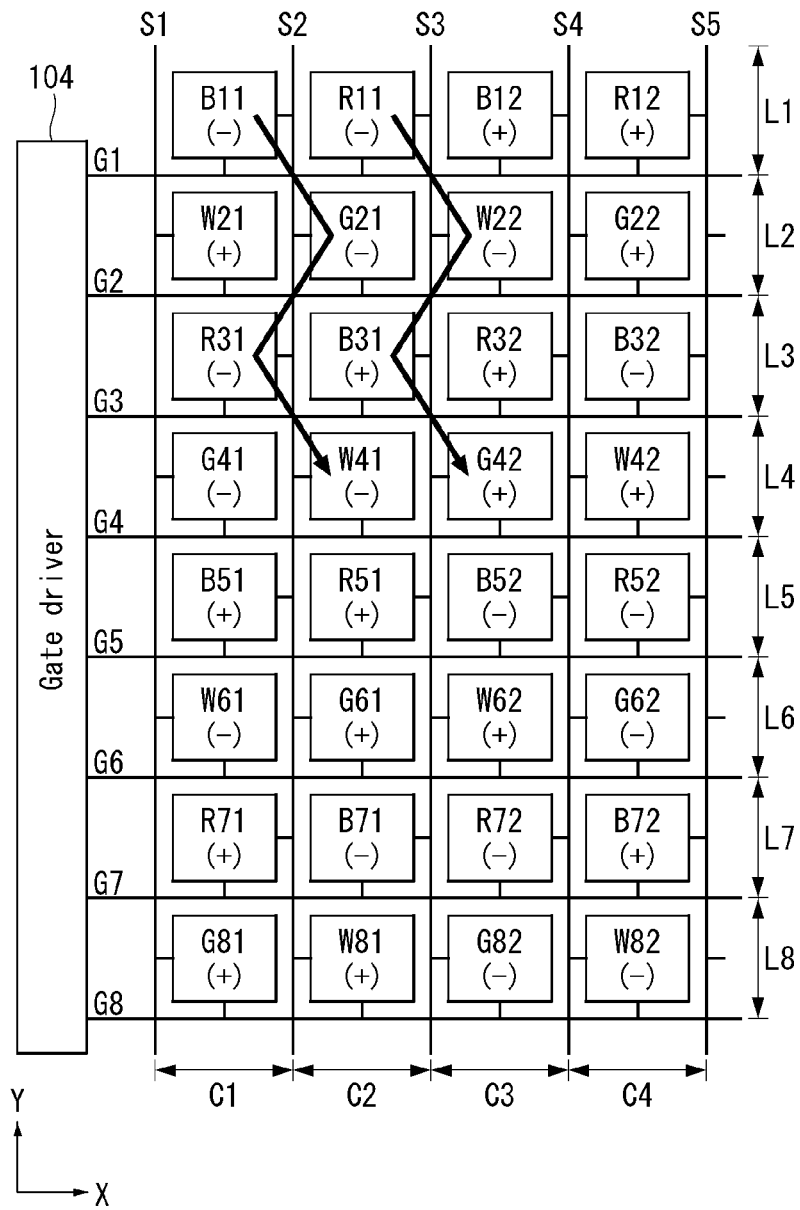

FIGS. 2 and 3 are views showing a pixel array structure and a data voltage charging sequence according to an aspect of the present disclosure. FIG. 4 is a waveform diagram showing output signals from source drive ICs and a gate driver for driving the pixel array of FIGS. 2 and 3, according to an aspect of the present disclosure. The pixel array on the display panel 100 has a repeating structure of 4*8 subpixels as in FIG. 3.

$\hat{1}$, $\hat{2}$, $\hat{3}$, and $\hat{4}$ in FIG. 2 represent a charging sequence of subpixels. In FIGS. 2 and 3, "L1~L8" represent row lines on the display panel 100. Subpixels of two colors are arranged on each of the row lines along a horizontal direction (x-axis direction). "C1~C4" represent column lines on the display panel 100. Subpixels of four colors are arranged on each of the column lines along a vertical direction (y-axis direction). Rxy, Gxy, Bxy, and Wxy in FIG. 3 represent an R subpixel at an xy position, a G subpixel at an xy position, a B subpixel at an xy position, and a W subpixel at an xy position.

Referring to FIGS. 2 and 3, B subpixels B11, B12, B51, and B52 and R subpixels R11, R12, R51, and R52 are alternately arranged on the (4i+1)th row lines L1 and L5 (i is an integer greater than or equal to zero). The B subpixels B11, B12, B51, and B52 are arranged at positions where the (4i+1)th row lines L1 and L5 and the odd-numbered column lines C1 and C3 intersect. The R subpixels R11, R12, R51, and R52 are arranged at positions where the (4i+1)th row lines L1 and L5 and the even-numbered column lines C2 and C4 intersect.

The subpixels of first and second colors B and R arranged on the (4i+1)th row lines L1 and L5 include TFTs arranged at the intersections of the data lines to the right and the (4i+1)th gate lines G1 and G5, respectively. Each TFT supplies a data voltage from the data line to the right of the subpixel to the pixel electrode. The TFT of the B11 subpixel is referred to as a first TFT, the TFT of the R11 subpixel as a second TFT, the TFT of the B12 subpixel as a third TFT, and the TFT of the R12 subpixel as a fourth TFT. The first TFT supplies a B data voltage from the second data line S2 to the pixel electrode PXL of the B11 subpixel, in response to a first gate pulse from the first gate line G1. The second TFT supplies an R data voltage from the third data line S3 to the pixel electrode PXL of the R11 subpixel, in response to the first gate pulse from the first gate line G1. The third TFT supplies a B data voltage from the fourth data line S4 to the pixel electrode PXL of the B12 subpixel, in response to the first gate pulse from the first gate line G1. The fourth TFT supplies an R data voltage from the fifth data line S5 to the pixel electrode PXL of the R12 subpixel, in response to the first gate pulse from the first gate line G1.

W subpixels W21, W22, W61, and W62 and G subpixels G21, G22, G61, and G62 are alternately arranged on the (4i+2)th row lines L2 and L6. The W subpixels W21, W22, W61, and W62 are arranged at positions where the (4i+2)th row lines L2 and L6 and the odd-numbered column lines C1 and C3 intersect. The G subpixels G21, G22, G61, and G62 are arranged at positions where the (4i+2)th row lines L2 and L6 and the even-numbered column lines C2 and C4 intersect.

The subpixels of third and fourth colors W and G arranged on the (4i+2)th row lines L2 and L6 include TFTs arranged at the intersections of the data lines to the left and the (4i+2)th gate lines G2 and G6, respectively. Each TFT supplies a data voltage from the data line to the left of the subpixel to the pixel electrode. The TFT of the W21 subpixel is referred to as a fifth TFT, the TFT of the G21 subpixel as a sixth TFT, the TFT of the W22 subpixel as a seventh TFT, and the TFT of the G22 subpixel as an eighth TFT. The fifth TFT supplies a W data voltage from the first data line S1 to the pixel electrode PXL of the W21 subpixel, in response to a second gate pulse from the second gate line G2. The sixth TFT supplies a G data voltage from the second data line S2 to the pixel electrode PXL of the G21 subpixel, in response to the second gate pulse from the second gate line G2. The seventh TFT supplies a W data voltage from the third data line S3 to the pixel electrode PXL of the W22 subpixel, in response to the second gate pulse from the second gate line G2. The eighth TFT supplies a G data voltage from the fourth data line S4 to the pixel electrode PXL of the G22 subpixel, in response to the second gate pulse from the second gate line G2.

R subpixels R31, R32, R71, and R72 and B subpixels B31, B32, B71, and B72 are alternately arranged on the (4i+3)th row lines L3 and L7. The R subpixels R31, R32, R71, and R72 are arranged at positions where the (4i+3)th row lines L3 and L7 and the odd-numbered column lines C1 and C3 intersect. The B subpixels B31, B32, B71, and B72 are arranged at positions where the (4i+3)th row lines L3 and L7 and the even-numbered column lines C2 and C4 intersect.

The subpixels of the first and second colors B and R arranged on the (4i+3)th row lines L3 and L7 includes TFTs arranged at the intersections of the data lines to the right and the (4i+3)th gate lines G3 and G7, respectively. Each TFT supplies a data voltage from the data line to the right of the subpixel to the pixel electrode. The TFT of the R31 subpixel is referred to as a ninth TFT, the TFT of the B31 subpixel as a tenth TFT, the TFT of the R32 subpixel as an eleventh TFT, and the TFT of the B32 subpixel as a twelfth TFT. The ninth TFT supplies an R data voltage from the second data line S2 to the pixel electrode PXL of the R31 subpixel, in response to a third gate pulse from the third gate line G3. The tenth TFT supplies a B data voltage from the third data line S3 to the pixel electrode PXL of the B31 subpixel, in response to the third gate pulse from the third gate line G3. The eleventh TFT supplies an R data voltage from the fourth data line S4 to the pixel electrode PXL of the R32 subpixel, in response to the third gate pulse from the third gate line G3. The twelfth TFT supplies a B data voltage from the fifth data line S5 to the pixel electrode PXL of the B32 subpixel, in response to the third gate pulse from the third gate line G3.

G subpixels G41, G42, G81, and G82 and W subpixels W41, W42, W81, and W82 are alternately arranged on the (4i+4)th row lines L4 and L8. The G subpixels G41, G42, G81, and G82 are arranged at positions where the (4i+4)th row lines L4 and L8 and the odd-numbered column lines C1 and C3 intersect. The W subpixels W41, W42, W81, and W82 are arranged at positions where the (4i+4)th row lines L4 and L8 and the even-numbered column lines C2 and C4 intersect.

The subpixels of the third and fourth colors W and G arranged on the (4i+4)th row lines L4 and L8 include TFTs arranged at the intersections of the data lines to the left and the (4i+4)th gate lines G4 and G8, respectively. Each TFT supplies a data voltage from the data line to the left of the subpixel to the pixel electrode. The TFT of the G41 subpixel is referred to as a thirteenth TFT, the TFT of the W41 subpixel as a fourteenth TFT, the TFT of the G42 subpixel as a fifteenth TFT, and the TFT of the W42 subpixel as a sixteenth TFT. The thirteenth TFT supplies a G data voltage from the first data line S1 to the pixel electrode PXL of the G41 subpixel, in response to a fourth gate pulse from the fourth gate line G4. The fourteenth TFT supplies a W data voltage from the second data line S2 to the pixel electrode PXL of the W41 subpixel, in response to the fourth gate pulse from the fourth gate line G4. The fifteenth TFT supplies a G data voltage from the third data line S3 to the pixel electrode PXL of the G42 subpixel, in response to the fourth gate pulse from the fourth gate line G4. The sixteenth TFT supplies a W data voltage from the fourth data line S4 to the pixel electrode PXL of the W42 subpixel, in response to the fourth gate pulse from the fourth gate line G4.

In order to reverse the polarity of data voltages once for every 4 dots, the source drive ICs output data voltages of the four colors with first polarity during 4 horizontal periods 4H, in order: B data, G data, R data, and W data, and then output data voltages of the four colors with second polarity in the above order during the next 4 horizontal periods 4H. The polarity of the data voltages supplied to the data lines S1 to Sm is reversed on the B data voltages. Once the data voltage polarity is reversed on the B data voltages, data voltages of the same polarity are supplied to the data lines, in order: B data voltage, G data voltage, R data voltage, and W data voltage. The polarity of the data voltage can be reversed every frame by the source drive ICs.

As shown in FIG. 4, the timing controller 20 controls in such a way that there is a difference of 2 horizontal periods between the polarity reversal timing of data voltages supplied to the odd-numbered data lines S1, S3, and S5 (S3 shown as a representative of S1, S3, and S5) and the polarity reversal timing of data voltages supplied to the even-numbered data lines S2 and S4 (S2 shown as a representative of S2 and S4), in order to keep the balance of polarity between subpixels of the same color on each row line and each column line.

Gate pulses output from the gate driver 104 are sequentially supplied to the gate lines G1 to G8. Link lines connecting output channels of the gate driver 104 and the gate lines G1 to G8 do not intersect. Thus, gate pulses are sequentially applied to the gate lines G1 to G8, starting from the first gate line G1.

In order to write data for an input image to the pixels of the pixel array shown in FIGS. 2 and 3, the polarity of data voltages is reversed on a cycle of every 4 horizontal periods by the source drive ICs, and gate pulses are sequentially applied to the gate lines G1 to Gn in order: G1, G2, . . . G8.

FIGS. 5A to 6G show how data voltage transitions occur when a test pattern of various colors is displayed on the pixel array according to an aspect of the present disclosure. It is assumed that the white-level voltage (or highest voltage) for data voltages before polarity reversal is 1 V. In this case, the data voltages begin their transition from 1 V. Here, a data voltage transition means that a large amount of electric current is generated when a data voltage output from the source drive ICs changes, causing the source drive IC to consume current and generate heat. When a polarity reversal occurs in a way that the white-level voltage changes its polarity from first polarity to second polarity, a data voltage transition occurs with a voltage swing of 2 V.

FIGS. 5A to 5G are views showing which subpixels are lit up and their polarity, when white, red, green, blue, yellow, cyan, and magenta patterns are displayed on the pixel array according to an aspect of the present disclosure. FIGS. 6A to 6G are views showing data voltages when the colors of FIGS. 5A to 5G are displayed on the pixel array, according to an aspect of the present disclosure. The arrows in FIGS. 6A to 6G indicate data voltage transitions.

Figure 5B:
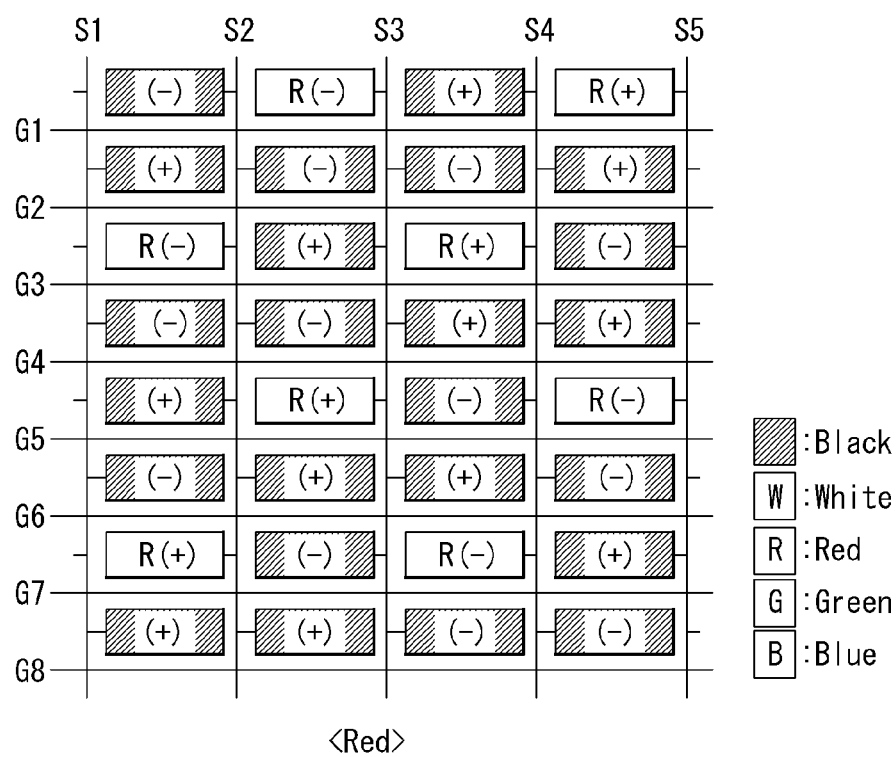
Figure 6A:
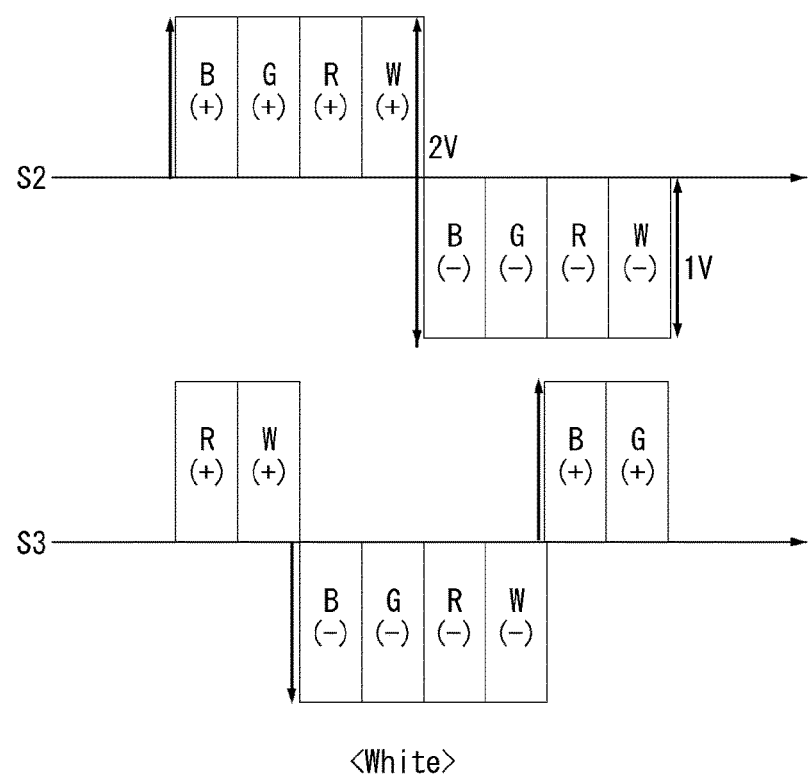

Referring to FIGS. 5A and 6A, when a white pattern is displayed on the pixels of the pixel array, the R subpixels, G subpixels, B subpixels, and W subpixels are all lit up at the white level. In the white pattern, the RGBW data voltages are the white-level voltage. For the white pattern, the data voltages supplied to the 8 lines L1 to L8 of subpixels shown in FIG. 3 change twice with a voltage swing of 2 V during 8 horizontal periods 8H. At these data voltages, the temperature of heat generated from the source drive ICs is 246° C., as seen from Table 1.

Figure 6B:
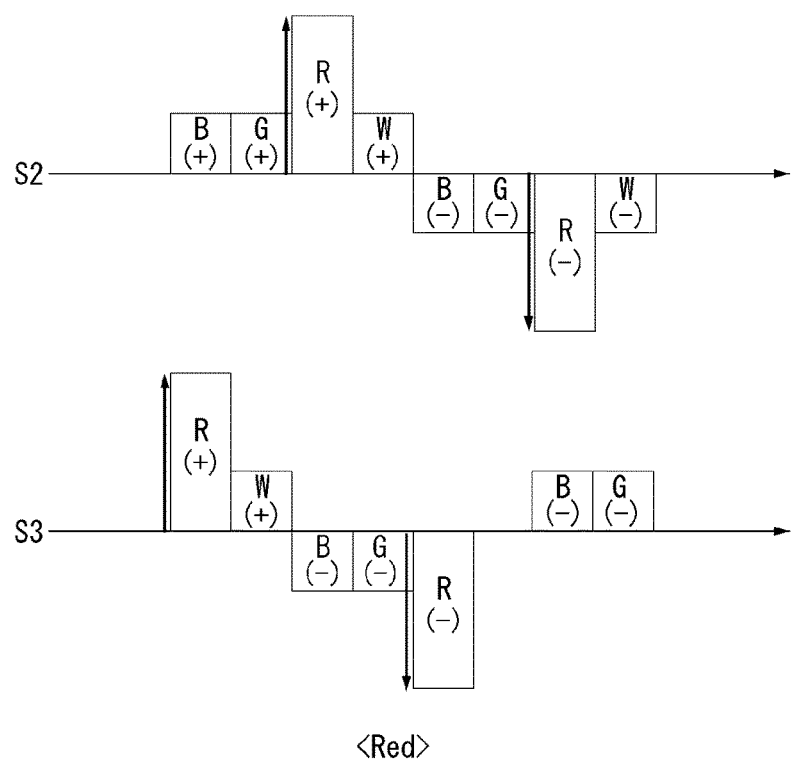

Referring to FIGS. 5B and 6B, when a red pattern is displayed on the pixels of the pixel array, only the R subpixels are lit up at the white level. In the red pattern, the R data voltage is the white-level voltage (or highest voltage), and the data voltages of the other colors are the black-level voltage (or lowest voltage). For the red pattern, the data voltages supplied to the 8 lines L1 to L8 of subpixels shown in FIG. 3 change twice with a voltage swing of 1 V during 8 horizontal periods 8H. At these data voltages, the temperature of heat generated from the source drive ICs is 201° C., as seen from Table 1.

Figure 5C:
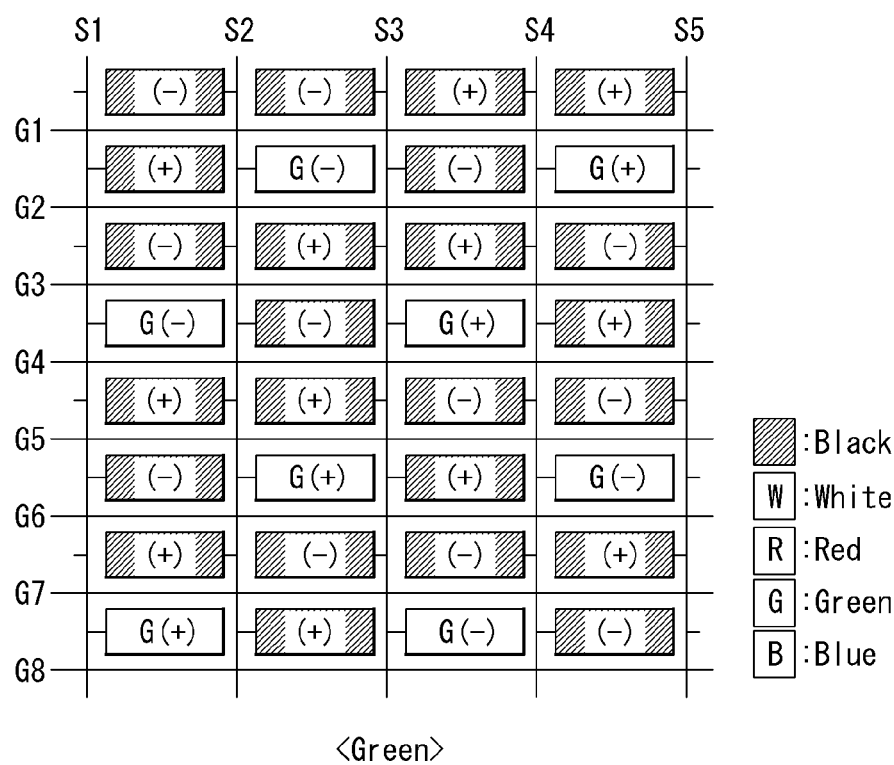
Figure 6C:
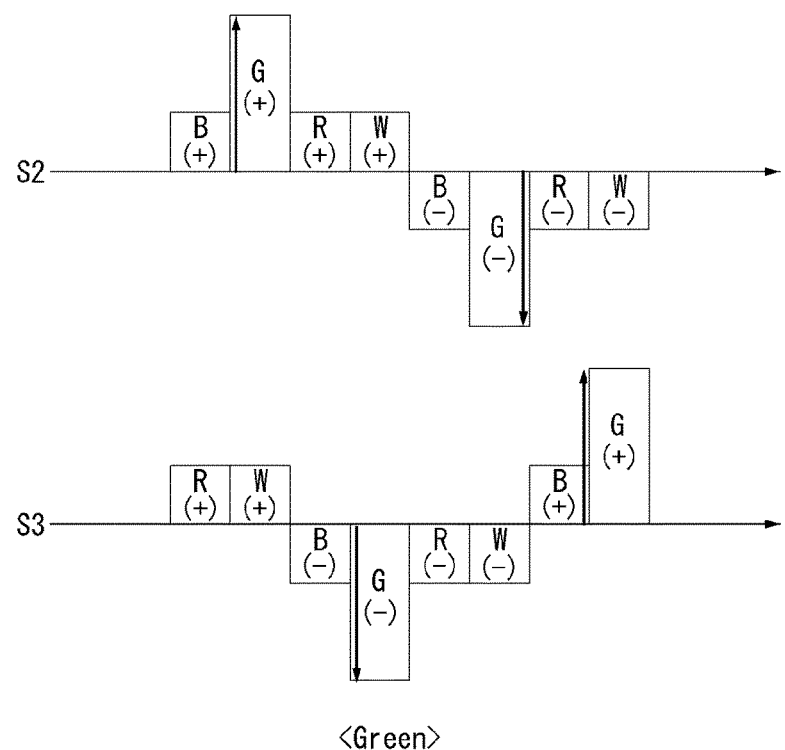

Referring to FIGS. 5C and 6C, when a green pattern is displayed on the pixels of the pixel array, only the G subpixels are lit up at the white level. In the green pattern, the G data voltage is the white-level voltage (or highest voltage), and the data voltages of the other colors are the black-level voltage (or lowest voltage). For the green pattern, the data voltages supplied to the 8 lines L1 to L8 of subpixels shown in FIG. 3 change twice with a voltage swing of 1 V during 8 horizontal periods 8H. At these data voltages, the temperature of heat generated from the source drive ICs is 201° C., as seen from Table 1.

Figure 5D:
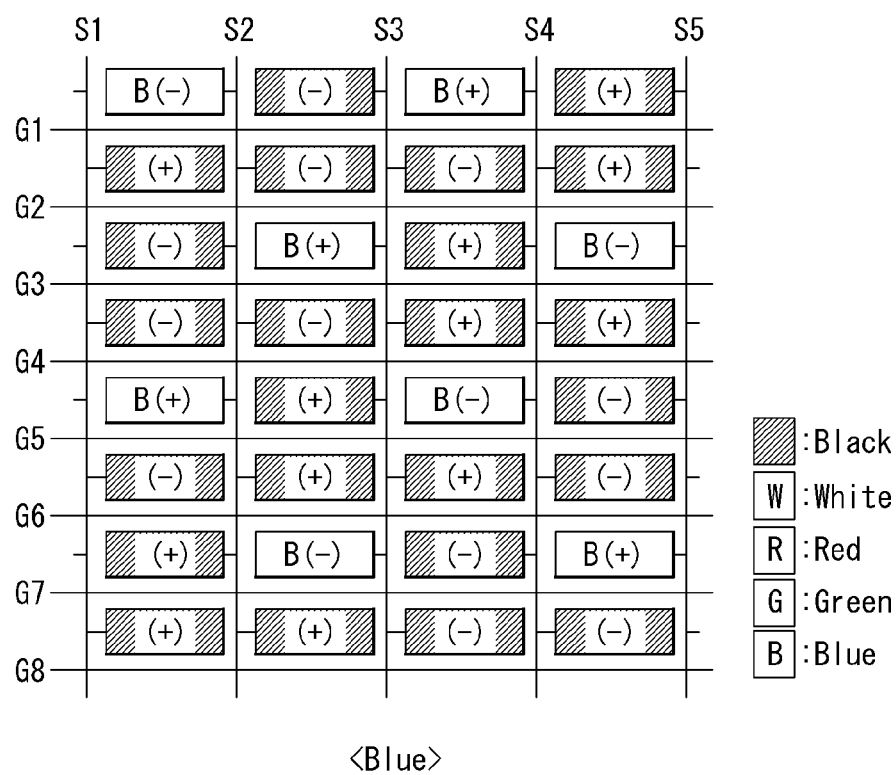
Figure 6D:
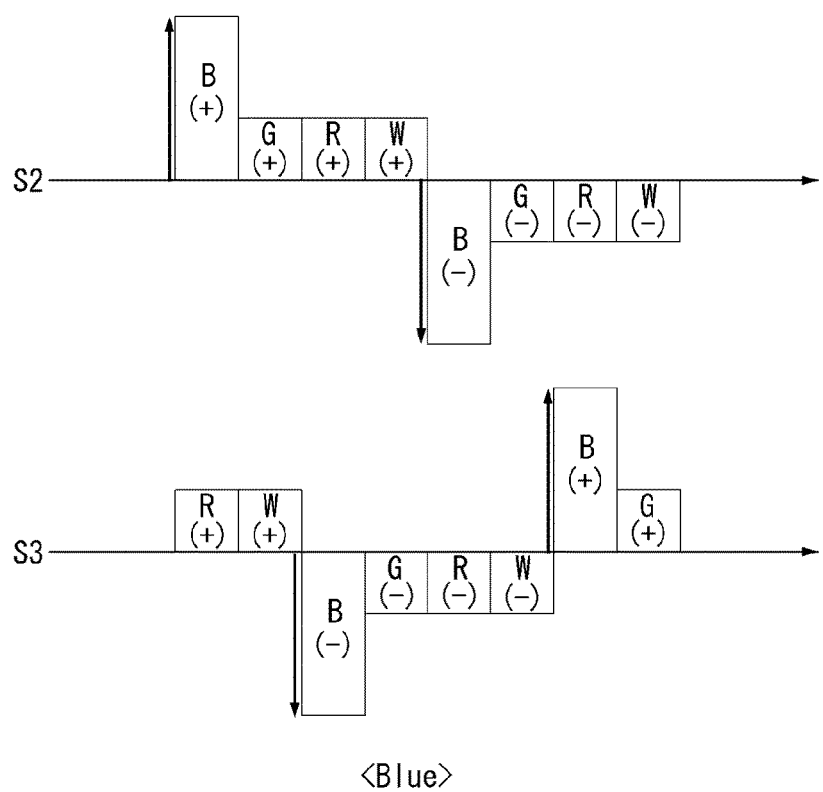

Referring to FIGS. 5D and 6D, when a blue pattern is displayed on the pixels of the pixel array, only the B subpixels are lit up at the white level. In the blue pattern, the B data voltage is the white-level voltage (or highest voltage), and the data voltages of the other colors are the black-level voltage (or lowest voltage). For the blue pattern, the data voltages supplied to the 8 lines L1 to L8 of subpixels shown in FIG. 3 change twice with a voltage swing of 1 V during 8 horizontal periods 8H. At these data voltages, the temperature of heat generated from the source drive ICs is 201° C., as seen from Table 1.

Figure 5E:
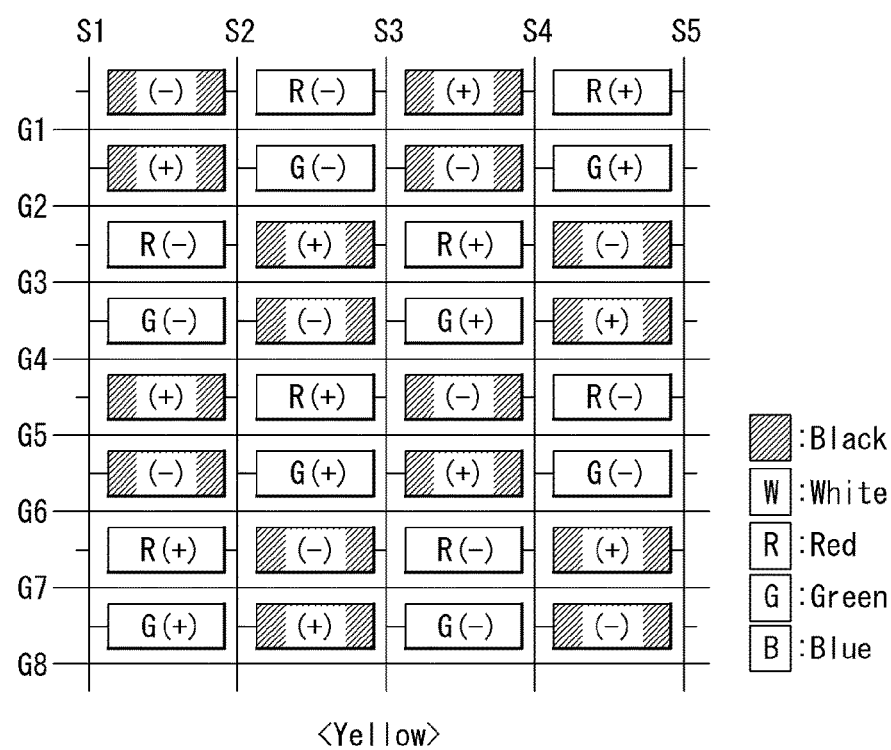

Referring to FIGS. 5E and 6E, when a yellow pattern is displayed on the pixels of the pixel array, the G subpixels and the R subpixels are lit up at the white level. In the yellow pattern, the G data voltage and the R data voltage are the white-level voltage (or highest voltage), and the data voltages of the other colors are the black-level voltage (or lowest voltage). For the yellow pattern, the data voltages supplied to the 8 lines L1 to L8 of subpixels shown in FIG. 3 change twice with a voltage swing of 1 V during 8 horizontal periods 8H. At these data voltages, the temperature of heat generated from the source drive ICs is 201° C., as seen from Table 1.

Figure 5F:
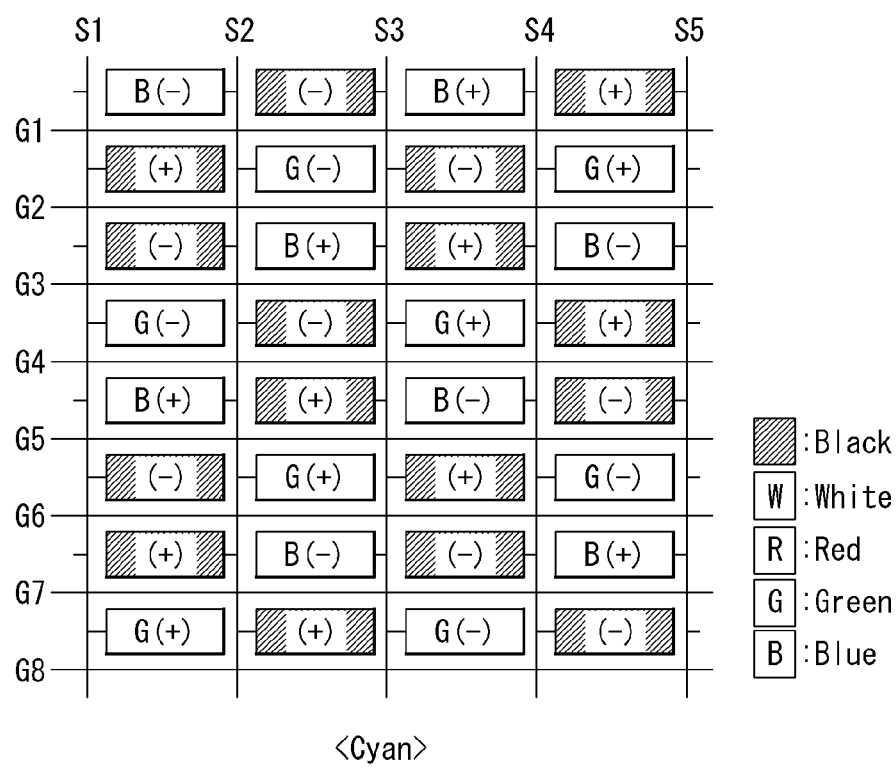

Referring to FIGS. 5F and 6F, when a cyan pattern is displayed on the pixels of the pixel array, the G subpixels and the B subpixels are lit up at the white level. In the cyan pattern, the G data voltage and the B data voltage are the white-level voltage, and the data voltages of the other colors are the black-level voltage. For the cyan pattern, the data voltages supplied to the 8 lines L1 to L8 of subpixels shown in FIG. 3 change twice with a voltage swing of 1 V during 8 horizontal periods 8H. At these data voltages, the temperature of heat generated from the source drive ICs is 201° C., as seen from Table 1.

Figure 5G:
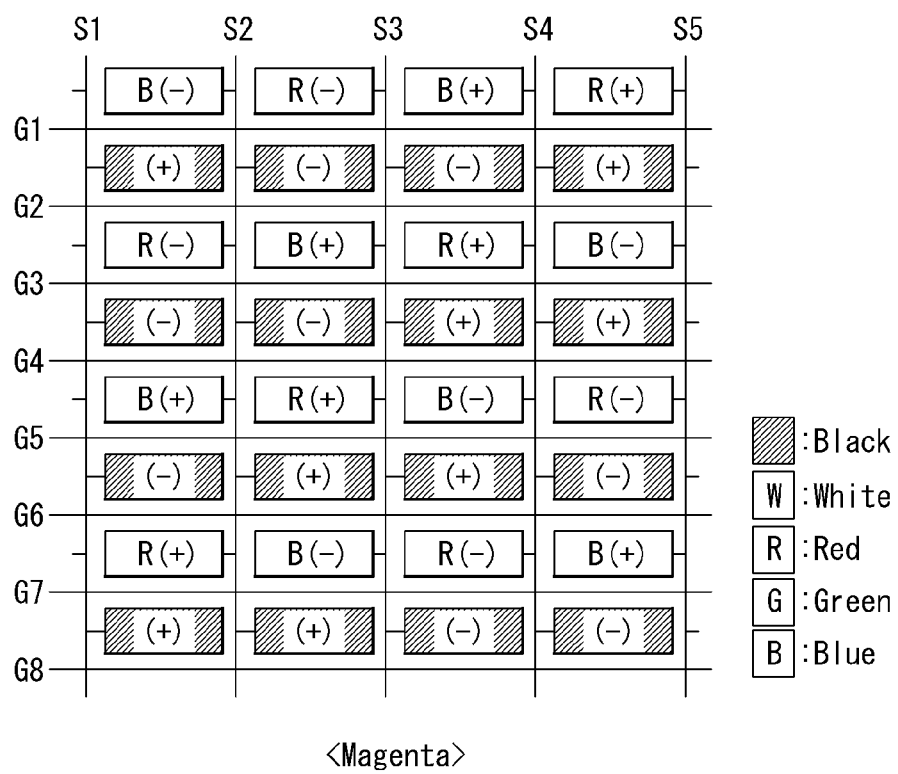
Figure 6G:
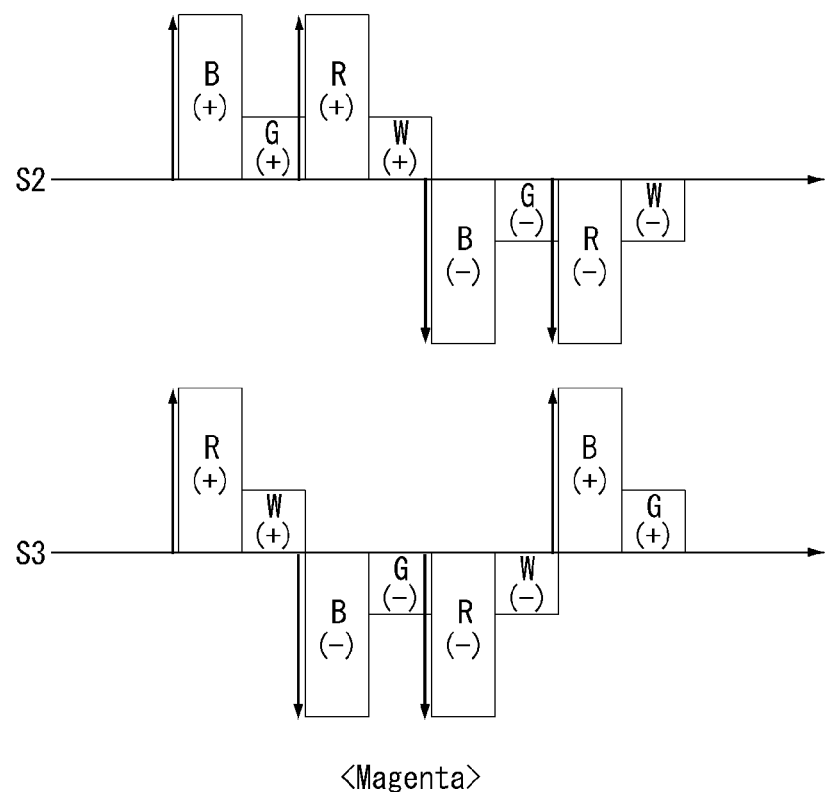

Referring to FIGS. 5G and 6G, when a magenta pattern is displayed on the pixels of the pixel array, the B subpixels and the R subpixels are lit up at the white level. In the magenta pattern, the B data voltage and the R data voltage are the white-level voltage (or highest voltage), and the data voltages of the other colors are the black-level voltage (or lowest voltage). For the magenta pattern, the data voltages supplied to the 8 lines L1 to L8 of subpixels shown in FIG. 3 change four times with a voltage swing of 1 V during 8 horizontal periods 8H. At these data voltages, the temperature of heat generated from the source drive ICs is 355° C., as seen from Table 1.

In the first example (FIGS. 2 to 4) of the present disclosure, the balance of polarity may be attained for each color without polarity banding phenomenon, and therefore input images may be reproduced with high picture quality. In the first example (FIGS. 2 to 4) of the present disclosure, the power consumption and heat generation of the source drive ICs may be kept at moderate levels for every color except for magenta.

Figure 7:
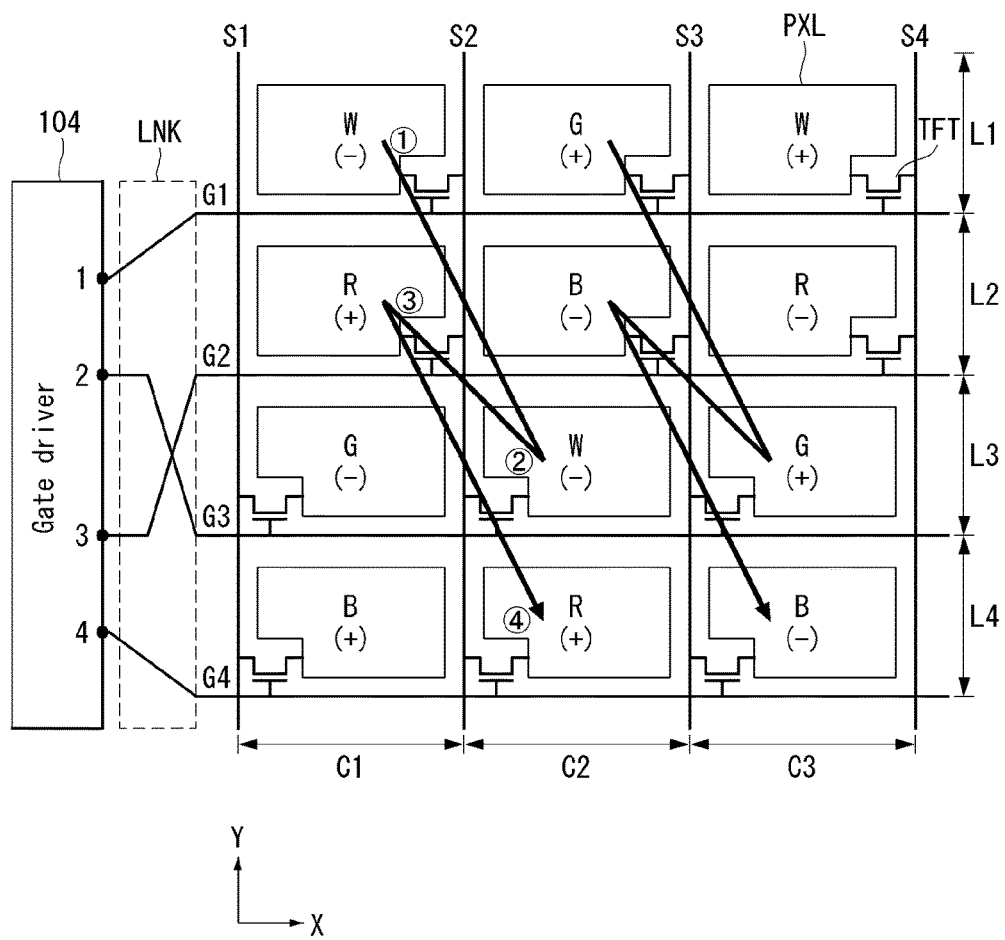
FIGS. 7 and 8 are views showing a pixel array structure and a data voltage charging sequence according to an aspect of the present disclosure.
Figure 8:
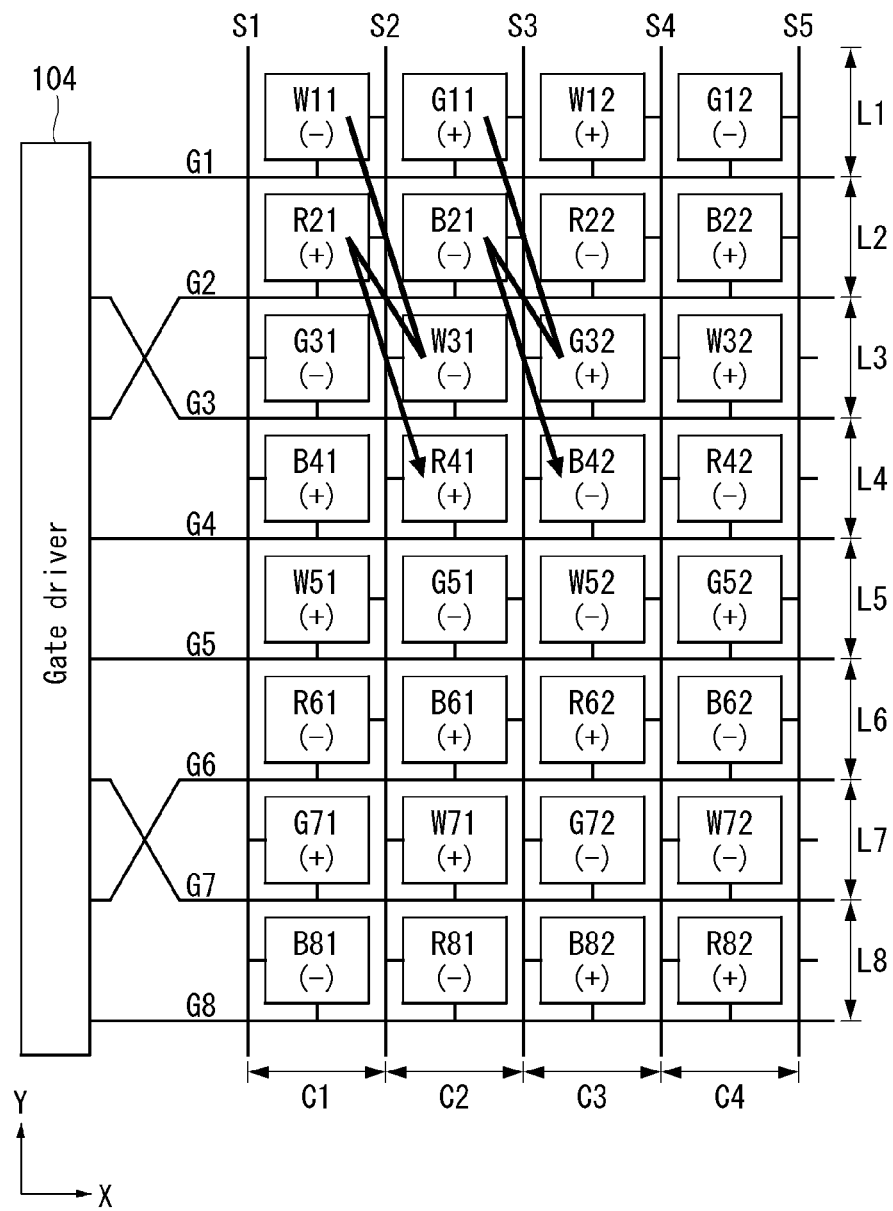

FIGS. 7 and 8 are views showing a pixel array structure and a data voltage charging sequence according to an aspect of the present disclosure. FIG. 9 is a waveform diagram showing output signals from source drive ICs and a gate driver for driving the pixel array of FIGS. 7 and 8. The pixel array on the display panel 100 has a repeating structure of 4*8 subpixels as in FIG. 8.

Referring to FIGS. 7 and 8, W subpixels W11, W12, W51, and W52 and G subpixels G11, G12, G51, and G52 are alternately arranged on the (4i+1)th row lines L1 and L5. The W subpixels W11, W12, W51, and W52 are arranged at positions where the (4i+1)th row lines L1 and L5 and the odd-numbered column lines C1 and C3 intersect. The G subpixels G11, G12, G51, and G52 are arranged at positions where the (4i+1)th row lines L1 and L5 and the even-numbered column lines C2 and C4 intersect.

The subpixels of first and second colors W and G arranged on the (4i+1)th row lines L1 and L5 include TFTs arranged at the intersections of the data lines to the right and the (4i+1)th gate lines G1 and G5, respectively. Each TFT supplies a data voltage from the data line to the right of the subpixel to the pixel electrode. The TFT of the W11 subpixel is referred to as a first TFT, the TFT of the G11 subpixel as a second TFT, the TFT of the W12 subpixel as a third TFT, and the TFT of the G12 subpixel as a fourth TFT. The first TFT supplies a W data voltage from the second data line S2 to the pixel electrode PXL of the W11 subpixel, in response to a first gate pulse from the first gate line G1. The second TFT supplies a G data voltage from the third data line S3 to the pixel electrode PXL of the G11 subpixel, in response to the first gate pulse from the first gate line G1. The third TFT supplies a W data voltage from the fourth data line S4 to the pixel electrode PXL of the W12 subpixel, in response to the first gate pulse from the first gate line G1. The fourth TFT supplies a G data voltage from the fifth data line S5 to the pixel electrode PXL of the G12 subpixel, in response to the first gate pulse from the first gate line G1.

R subpixels R21, R22, R61, and R62 and B subpixels B21, B22, B61, and B62 are alternately arranged on the (4i+2)th row lines L2 and L6. The R subpixels R21, R22, R61, and R62 are arranged at positions where the (4i+2)th row lines L2 and L6 and the odd-numbered column lines C1 and C3 intersect. The B subpixels B21, B22, B61, and B62 are arranged at positions where the (4i+2)th row lines L2 and L6 and the even-numbered column lines C2 and C4 intersect.

The subpixels of third and fourth colors R and B arranged on the (4i+2)th row lines L2 and L6 include TFTs arranged at the intersections of the data lines to the right and the (4i+2)th gate lines G2 and G6, respectively. Each TFT supplies a data voltage from the data line to the right of the subpixel to the pixel electrode. The TFT of the R21 subpixel is referred to as a fifth TFT, the TFT of the B21 subpixel as a sixth TFT, the TFT of the R22 subpixel as a seventh TFT, and the TFT of the B22 subpixel as an eighth TFT. The fifth TFT supplies an R data voltage from the second data line S2 to the pixel electrode PXL of the R21 subpixel, in response to a third gate pulse from the second gate line G2. The sixth TFT supplies a B data voltage from the third data line S3 to the pixel electrode PXL of the B21 subpixel, in response to the third gate pulse from the second gate line G2. The seventh TFT supplies an R data voltage from the fourth data line S4 to the pixel electrode PXL of the R22 subpixel, in response to the third gate pulse from the second gate line G2. The eighth TFT supplies a B data voltage from the fifth data line S5 to the pixel electrode PXL of the B22 subpixel, in response to the third gate pulse from the second gate line G2.

G subpixels G31, G32, G71, and G72 and W subpixels W31, W32, W71, and W72 are alternately arranged on the (4i+3)th row lines L3 and L7. The G subpixels G31, G32, G71, and G72 are arranged at positions where the (4i+3)th row lines L3 and L7 and the odd-numbered column lines C1 and C3 intersect. The W subpixels W31, W32, W71, and W72 are arranged at positions where the (4i+3)th row lines L3 and L7 and the even-numbered column lines C2 and C4 intersect.

The subpixels of the first and second colors W and G arranged on the (4i+3)th row lines L3 and L7 include TFTs arranged at the intersections of the data lines to the left and the (4i+3)th gate lines G3 and G7, respectively. Each TFT supplies a data voltage from the data line to the left of the subpixel to the pixel electrode. The TFT of the G31 subpixel is referred to as a ninth TFT, the TFT of the W31 subpixel as a tenth TFT, the TFT of the G32 subpixel as an eleventh TFT, and the TFT of the W32 subpixel as a twelfth TFT. The ninth TFT supplies a G data voltage from the first data line S1 to the pixel electrode PXL of the G31 subpixel, in response to a second gate pulse from the third gate line G3. The tenth TFT supplies a W data voltage from the second data line S2 to the pixel electrode PXL of the W31 subpixel, in response to the second gate pulse from the third gate line G3. The eleventh TFT supplies a G data voltage from the third data line S3 to the pixel electrode PXL of the G32 subpixel, in response to the second gate pulse from the third gate line G3. The twelfth TFT supplies a W data voltage from the fourth data line S4 to the pixel electrode PXL of the W32 subpixel, in response to the second gate pulse from the third gate line G3.

B subpixels B41, B42, B81, and B82 and R subpixels R41, R42, R81, and R82 are alternately arranged on the (4i+4)th row lines L4 and L8. The B subpixels B41, B42, B81, and B82 are arranged at positions where the (4i+4)th row lines L4 and L8 and the odd-numbered column lines C1 and C3 intersect. The R subpixels R41, R42, R81, and R82 are arranged at positions where the (4i+4)th row lines L4 and L8 and the even-numbered column lines C2 and C4 intersect.

The subpixels of the third and fourth colors R and B arranged on the (4i+2)th row lines L4 and L8 include TFTs arranged at the intersections of the data lines to the left and the (4i+4)th gate lines G4 and G8, respectively. Each TFT supplies a data voltage from the data line to the left of the subpixel to the pixel electrode. The TFT of the B41 subpixel is referred to as a thirteenth TFT, the TFT of the R41 subpixel as a fourteenth TFT, the TFT of the B42 subpixel as a fifteenth TFT, and the TFT of the R42 subpixel as a sixteenth TFT. The thirteenth TFT supplies a B data voltage from the first data line S1 to the pixel electrode PXL of the B41 subpixel, in response to a fourth gate pulse from the fourth gate line G4. The fourteenth TFT supplies an R data voltage from the second data line S2 to the pixel electrode PXL of the R41 subpixel, in response to the fourth gate pulse from the fourth gate line G4. The fifteenth TFT supplies a B data voltage from the third data line S3 to the pixel electrode PXL of the B42 subpixel, in response to the fourth gate pulse from the fourth gate line G4. The sixteenth TFT supplies an R data voltage from the fourth data line S4 to the pixel electrode PXL of the R42 subpixel, in response to the fourth gate pulse from the fourth gate line G4.

In order to reverse the polarity of data voltages once for every 4 dots, the source drive ICs output data voltages with first polarity during 4 horizontal periods 4H, and then output data voltages with second polarity during the next 4 horizontal periods 4H.

The data voltages supplied to the odd-numbered data lines S1, S3, and S5 are output from the source drive ICs during 4 horizontal periods 4H, in order: first data voltage of the fourth color B, second data voltage of the fourth color B, first data voltage of the second color G, and second data voltage of the second color G, and then their polarity is reversed. The first and second data voltages of the fourth color B are sequentially supplied to the B subpixels B21 and B42. The first and second data voltages of the second color G are sequentially supplied to the G subpixels G51 and G72. The polarity of the data voltages supplied to the odd-numbered data lines S1, S3, and S5 is reversed on the data voltages of the fourth color B.

The data voltages supplied to the even-numbered data lines S2 and S4 are output from the source drive ICs during 4 horizontal periods 4H, in order: first data voltage of the third color R, second data voltage of the third color R, first data voltage of the first color W, and second data voltage of the first color W, and then their polarity is reversed. The first and second data voltages of the third color R are sequentially supplied to the R subpixels R21 and R41. The first and second data voltages of the first color W are sequentially supplied to the W subpixels W51 and W71. The polarity of the data voltages supplied to the even-numbered data lines S2 and S4 is reversed on the data voltages of the third color R.

As shown in FIGS. 8 and 9, the source drive ICs simultaneously reverse the polarity of the data voltages supplied to the odd-numbered data lines S1, S3, and S5 and the polarity of the data voltages supplied to the even-numbered data lines S2 and S4, under the control of the timing controller 20.

Link lines LNK connecting (4i+2)th and (4i+3)th output channels 2 and 3 of the gate driver 104 and the (4i+2)th and (4i+3)th gate lines G2, G3, G6, and G7 intersect, with an insulating layer in between. Due to this, as shown in FIG. 9, although the gate driver 104 outputs a third gate pulse through the third output channel 3 after outputting a second gate pulse through the second output channel 2, the third gate pulse is applied to the second gate line G2 after the second gate pulse is applied to the third gate line G3. Accordingly, gate pulses are applied to the gate lines G1 to G8 in order: G1, G3, G2, G4, G5, G7, G6, and G8.

FIGS. 10A to 11G show how data voltage transitions occur when a test pattern of various colors is displayed on the pixel array according to an aspect of the present disclosure.

FIGS. 10A to 10G are views showing which subpixels are lit up and their polarity, when white, red, green, blue, yellow, cyan, and magenta patterns are displayed on the pixel array according to an aspect of the present disclosure. FIGS. 11A to 11G are views showing data voltages when the colors of FIGS. 10A to 10G are displayed on the pixel array according to an aspect of the present disclosure. The arrows in FIGS. 11A to 11G indicate data voltage transitions.

Figure 10A:
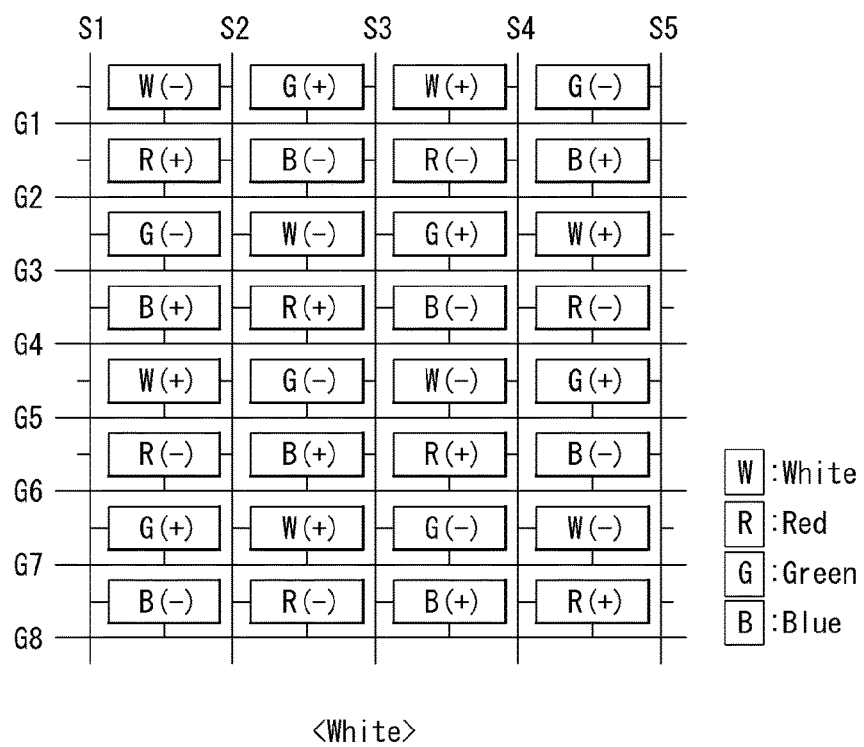

Referring to FIGS. 10A and 11A, when a white pattern is displayed on the pixels of the pixel array, the R subpixels, G subpixels, B subpixels, and W subpixels are all lit up at the white level. In the white pattern, the RGBW data voltages are the white-level voltage. For the white pattern to be displayed on the pixel array, the data voltages supplied to the 8 lines L1 to L8 of subpixels shown in FIG. 8 change twice with a voltage swing of 2 V during 8 horizontal periods 8H. At these data voltages, the temperature of heat generated from the source drive ICs is 246° C., as seen from Table 1.

Figure 10B:
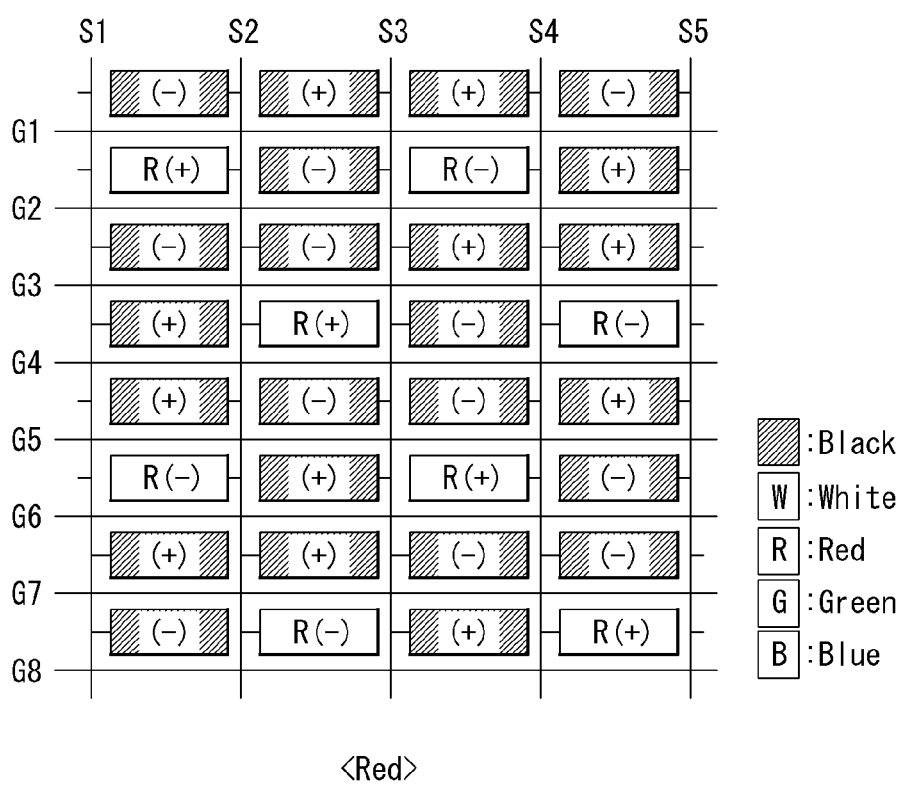

Referring to FIGS. 10B and 11B, when a red pattern is displayed on the pixels of the pixel array, only the R subpixels are lit up at the white level. In the red pattern, the R data voltage is the white-level voltage, and the data voltages of the other colors are the black-level voltage. For the red pattern, the data voltages supplied to the 8 lines L1 to L8 of subpixels shown in FIG. 8 change once with a voltage swing of 1 V during 8 horizontal periods 8H. Since the data voltages applied to the odd-numbered data lines S1, S3, and S5 undergo no transition to the white-level voltage, the average number of transitions in data voltage applied to the data lines S1 to S5 during the 8 horizontal periods is 1. At these data voltages, the temperature of heat generated from the source drive ICs is 150° C., as seen from Table 1.

Figure 10C:
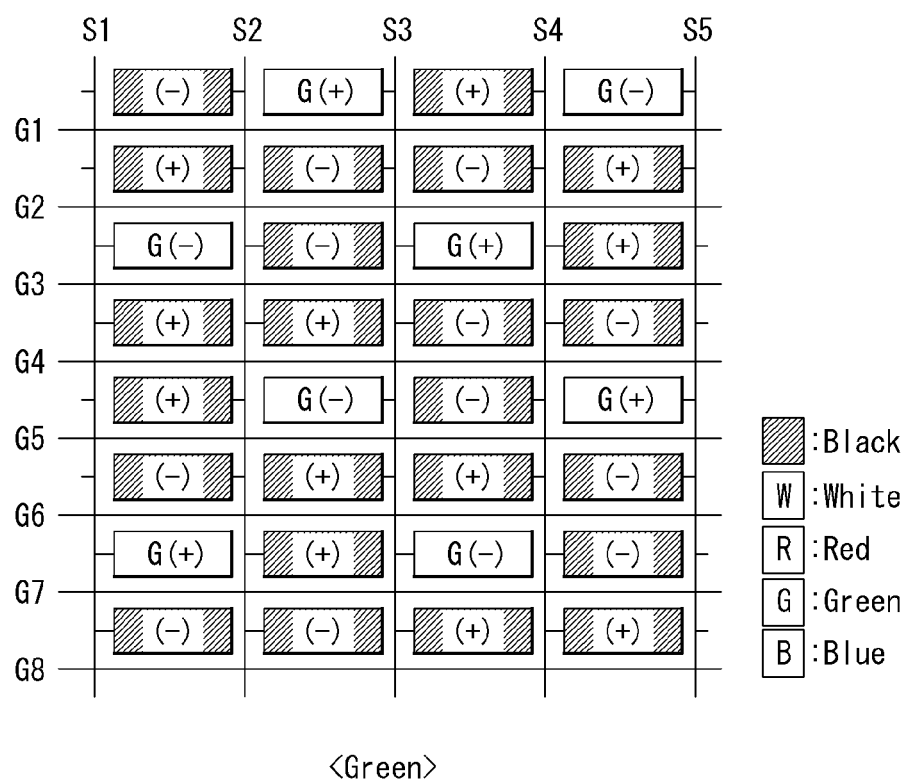
Figure 11C:
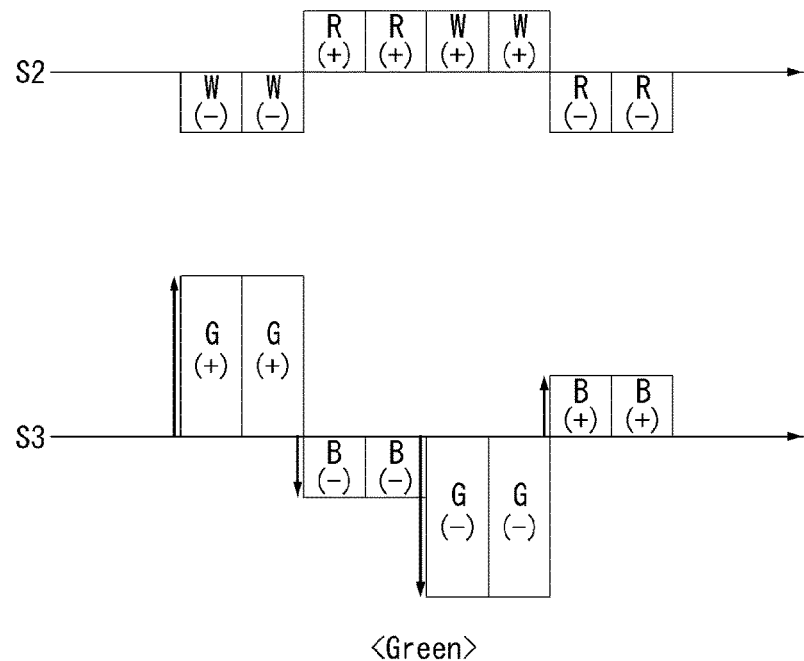

Referring to FIGS. 10C and 11C, when a green pattern is displayed on the pixels of the pixel array, only the G subpixels are lit up at the white level. In the green pattern, the G data voltage is the white-level voltage, and the data voltages of the other colors are the black-level voltage. For the green pattern, the data voltages supplied to the 8 lines L1 to L8 of subpixels shown in FIG. 8 change twice with a voltage swing of 1 V during 8 horizontal periods 8H. Since the data voltages applied to the even-numbered data lines S2 and S4 undergo no transition to the white-level voltage while the data voltages applied to the odd-numbered data lines S1, S3, and S5 undergo four transitions, the average number of transitions in data voltage applied to the data lines S1 to S5 during the 8 horizontal periods is 2. At these data voltages, the temperature of heat generated from the source drive ICs is 201° C., as seen from Table 1.

Figure 10D:
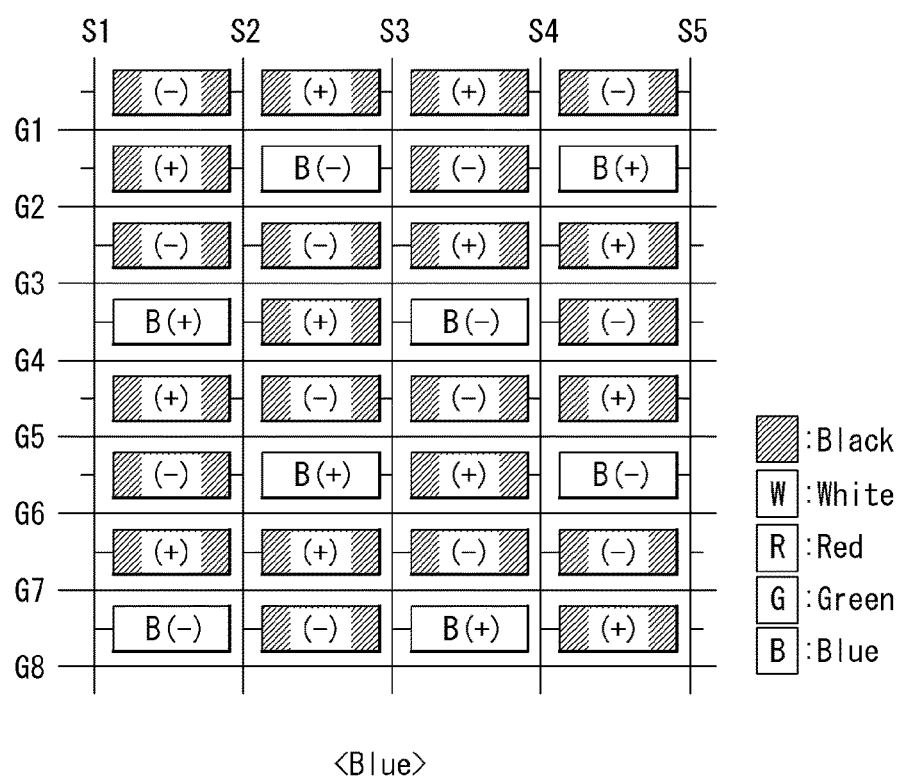
Figure 11D:
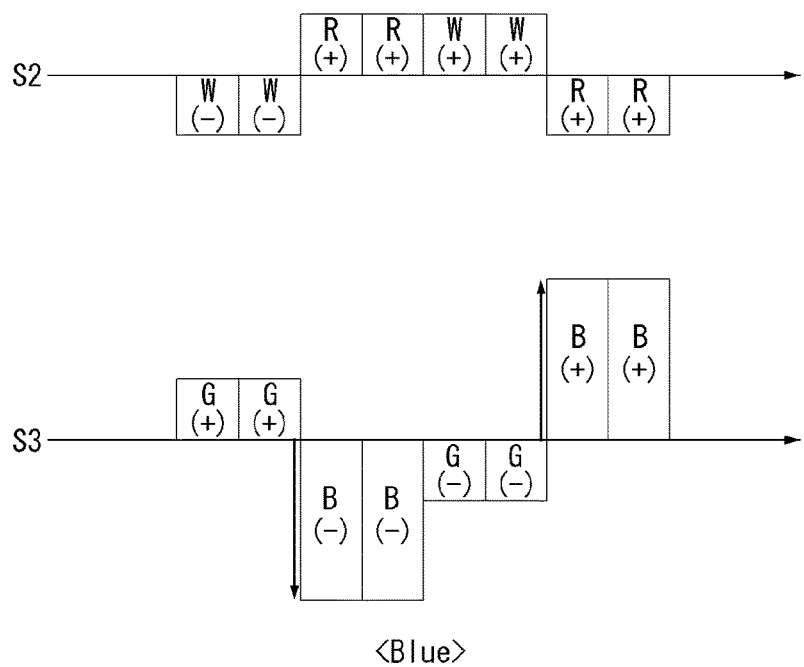

Referring to FIGS. 10D and 11D, when a blue pattern is displayed on the pixels of the pixel array, only the B subpixels are lit up at the white level. In the blue pattern, the B data voltage is the white-level voltage (or highest voltage), and the data voltages of the other colors are the black-level voltage (or lowest voltage). For the blue pattern, the data voltages supplied to the 8 lines L1 to L8 of subpixels shown in FIG. 8 change once with a voltage swing of 1 V during 8 horizontal periods 8H. Since the data voltages applied to the even-numbered data lines S2 and S4 undergo no transition to the white-level voltage, the average number of transitions in data voltage applied to the data lines S1 to S5 during the 8 horizontal periods is 1. At these data voltages, the temperature of heat generated from the source drive ICs is 142° C., as seen from Table 1.

Figure 11E:
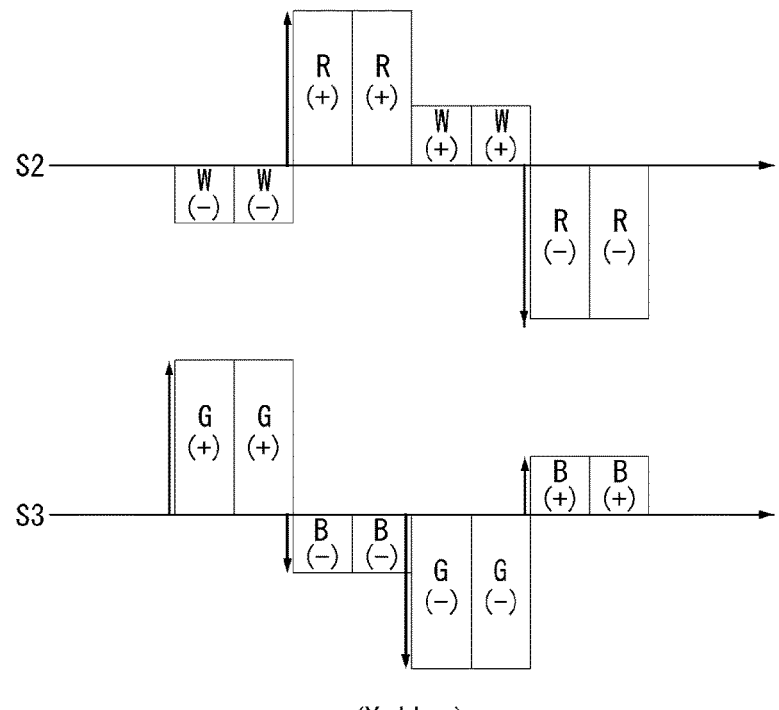

Referring to FIGS. 10E and 11E, when a yellow pattern is displayed on the pixels of the pixel array, the G subpixels and the R subpixels are lit up at the white level. In the yellow pattern, the G data voltage and the R data voltage are the white-level voltage, and the data voltages of the other colors are the black-level voltage. For the yellow pattern, the data voltages supplied to the 8 lines L1 to L8 of subpixels shown in FIG. 8 change three times with a voltage swing of 1 V during 8 horizontal periods 8H. Since the data voltages applied to the odd-numbered data lines S1, S3, and S5 undergo four transitions while the data voltages applied to the even-numbered data lines S2 and S4 undergo two transitions, the average number of transitions in data voltage applied to the data lines S1 to S5 during the 8 horizontal periods is 3. At these data voltages, the temperature of heat generated from the source drive ICs is 222° C., as seen from Table 1.

Figure 10F:
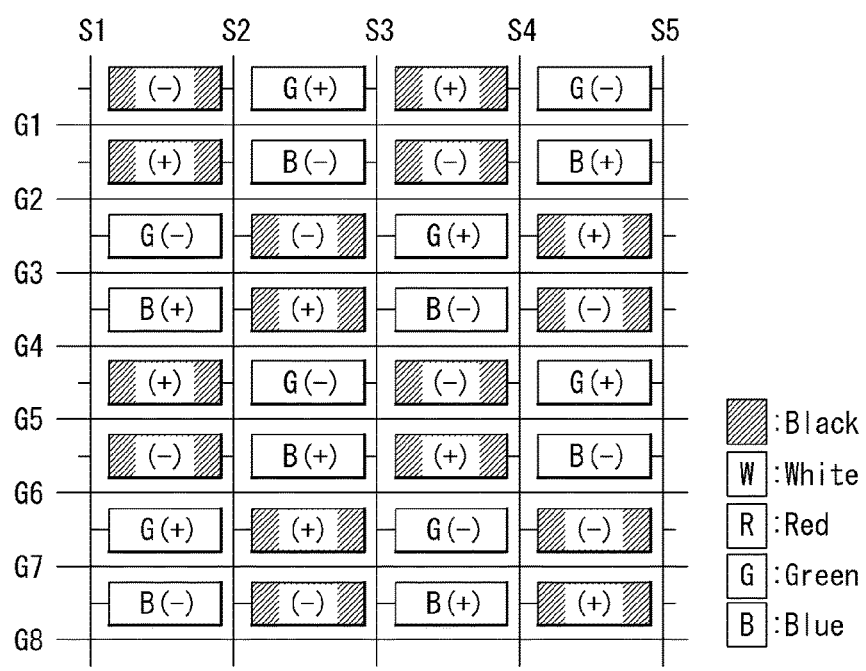
Figure 11F:
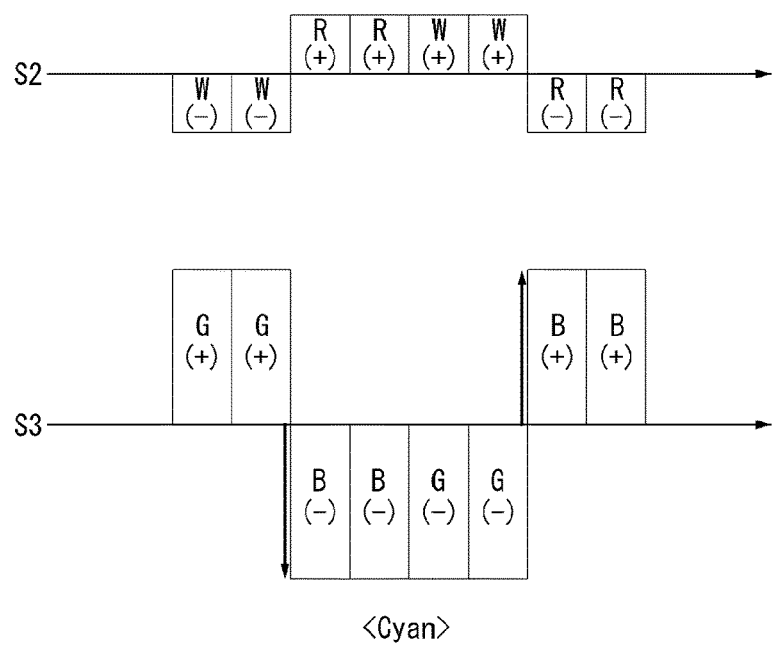

Referring to FIGS. 10F and 11F, when a cyan pattern is displayed on the pixels of the pixel array, the G subpixels and the B subpixels are lit up at the white level. In the cyan pattern, the G data voltage and the B data voltage are the white-level voltage, and the data voltages of the other colors are the black-level voltage. For the cyan pattern, the data voltages supplied to the 8 lines L1 to L8 of subpixels shown in FIG. 8 change once with a voltage swing of 1 V during 8 horizontal periods 8H. Since the data voltages applied to the even-numbered data lines S2 and S4 undergo no transition to the white-level voltage, the average number of transitions in data voltage applied to the data lines S1 to S5 during the 8 horizontal periods is 1. At these data voltages, the temperature of heat generated from the source drive ICs is 150° C., as seen from Table 1.

Figure 10G:
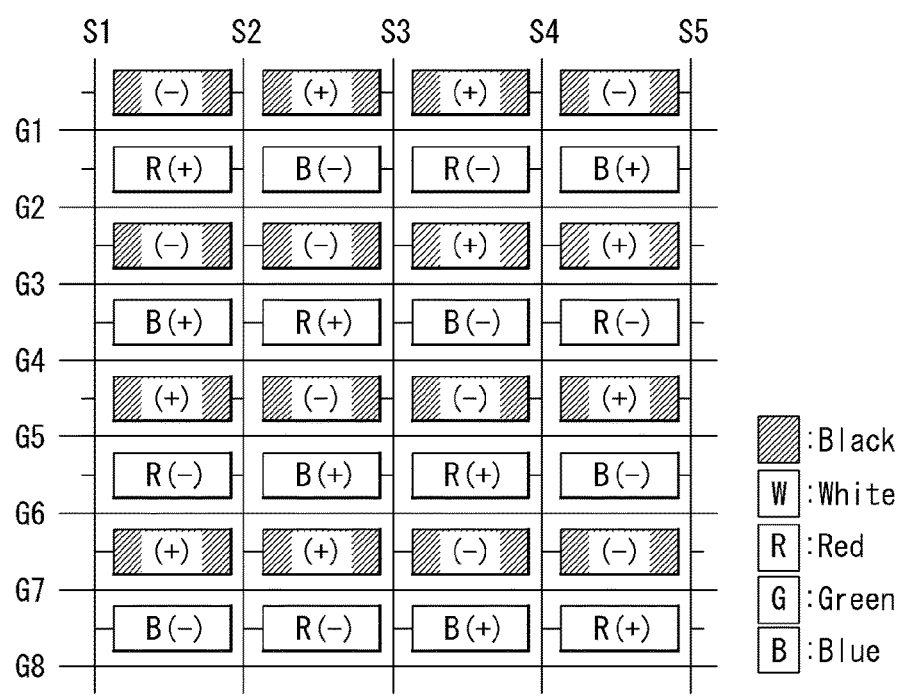
Figure 11G:
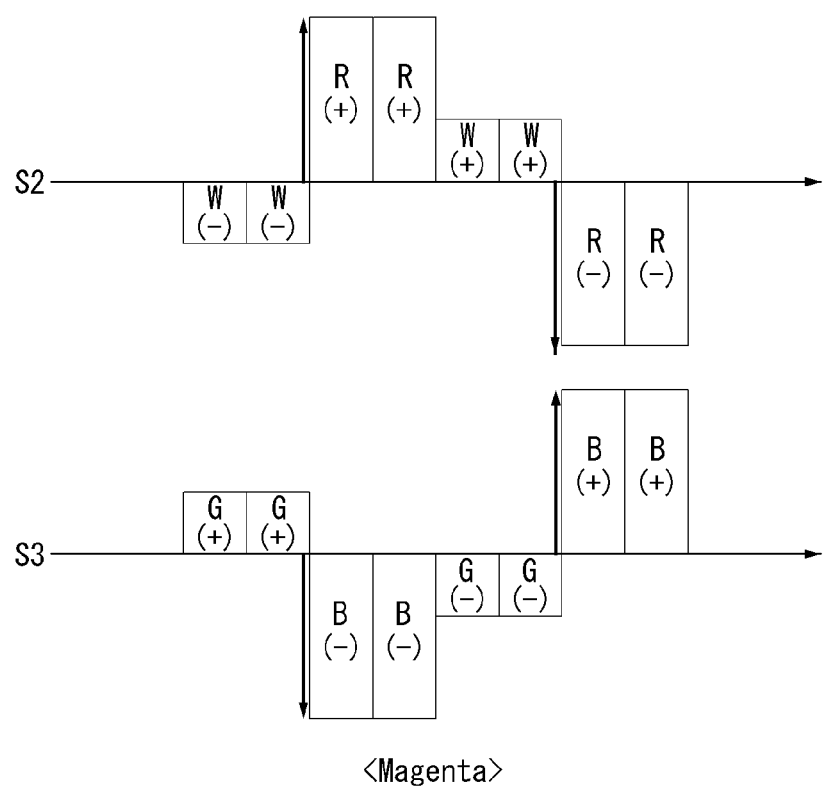

Referring to FIGS. 10G and 11G, when a magenta pattern is displayed on the pixels of the pixel array, the B subpixels and the R subpixels are lit up at the white level. In the magenta pattern, the B data voltage and the R data voltage are the white-level voltage, and the data voltages of the other colors are the black-level voltage. For the magenta pattern, the data voltages supplied to the 8 lines L1 to L8 of subpixels shown in FIG. 8 change twice with a voltage swing of 1 V during 8 horizontal periods 8H. At these data voltages, the temperature of heat generated from the source drive ICs is 201° C., as seen from Table 1.

In the examples (FIGS. 7 to 9) of the present disclosure, the balance of polarity may be attained for each color without polarity banding phenomenon, and therefore input images may be reproduced with high picture quality. However, the data voltages supplied to the data lines are applied simultaneously and hence the amount of charge in the pixels varies with each row line, which may create horizontal lines visible along the row line direction. In the examples (FIGS. 7 to 9) of the present disclosure, the power consumption and heat generation of the source drive ICs may be reduced for every color.

Figure 12:
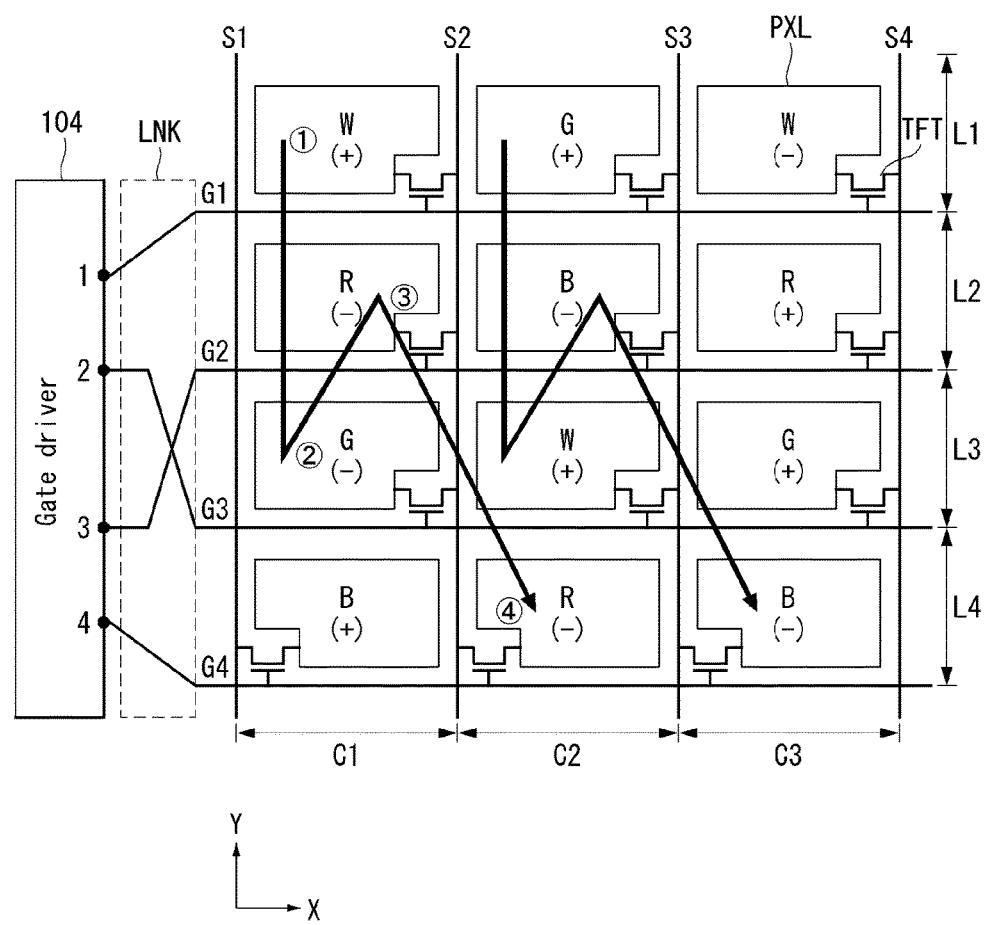
FIGS. 12 and 13 are views showing a pixel array structure and a data voltage charging sequence according to an aspect of the present disclosure.
Figure 13:
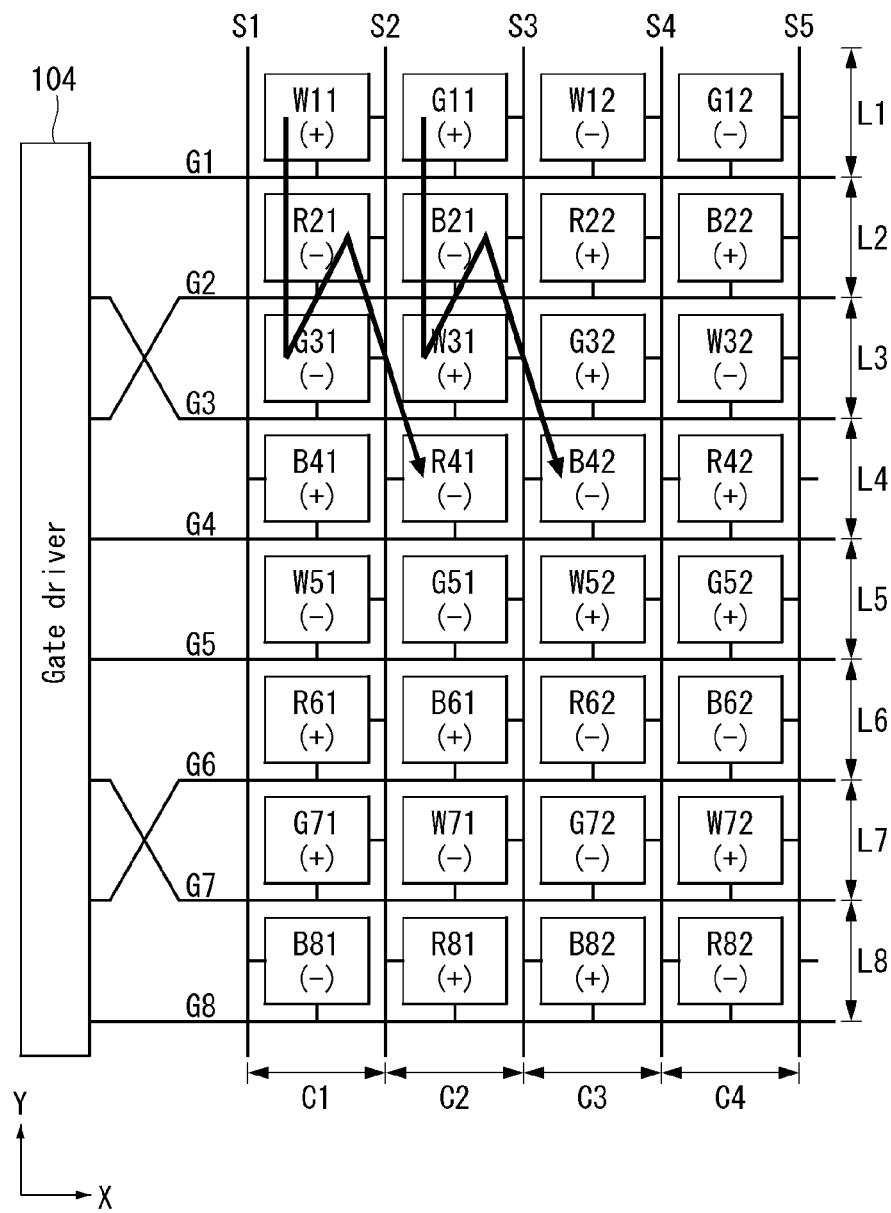
Figure 14:
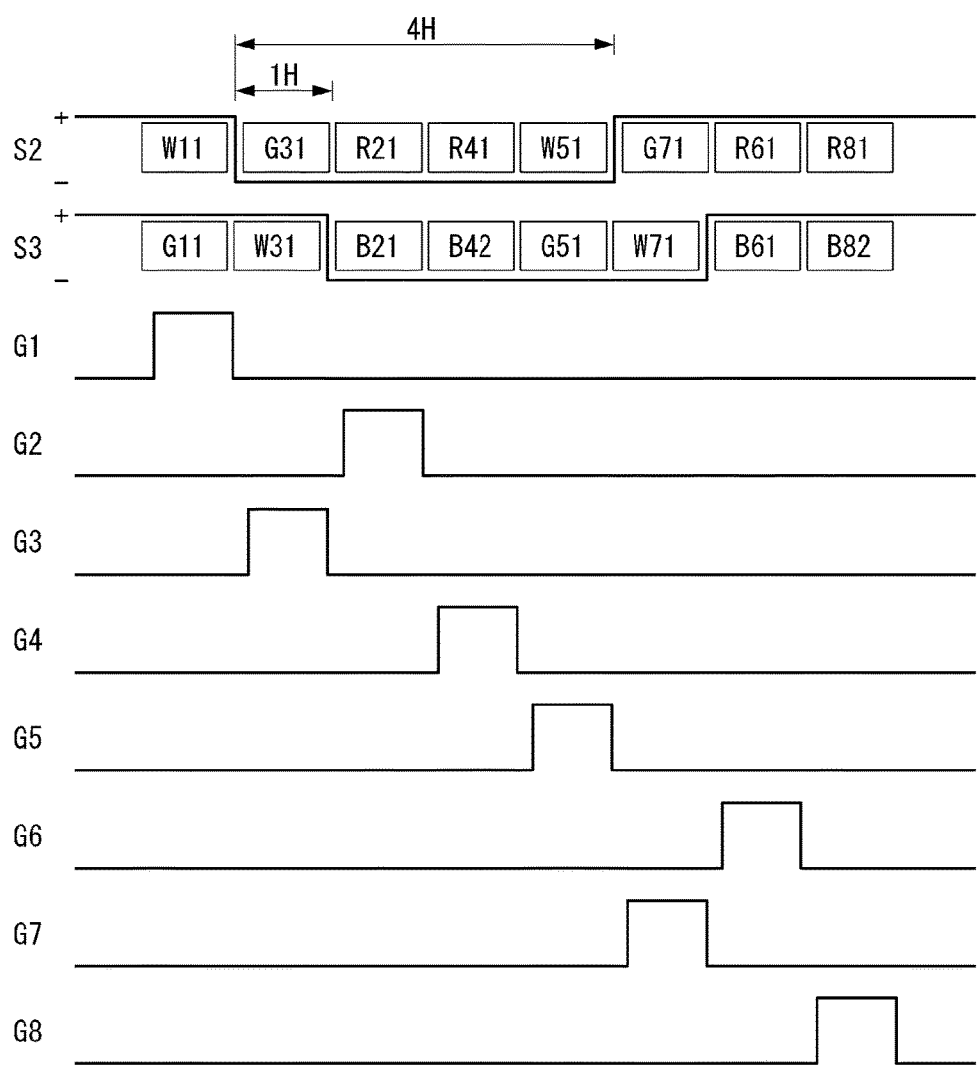
FIG. 14 is a waveform diagram showing output signals from source drive ICs and a gate driver for driving the pixel array of FIGS. 12 and 13 according to an aspect of the present disclosure.

FIGS. 12 and 13 are views showing a pixel array structure and a data voltage charging sequence according to an aspect of the present disclosure. FIG. 14 is a waveform diagram showing output signals from source drive ICs and a gate driver for driving the pixel array of FIGS. 12 and 13 according to an aspect of the present disclosure. The pixel array on the display panel 100 has a repeating structure of 4*8 subpixels as in FIG. 13.

Referring to FIGS. 12 and 13, W subpixels W11, W12, W51, and W52 and G subpixels G11, G12, G51, and G52 are alternately arranged on the (4i+1)th row lines L1 and L5. The W subpixels W11, W12, W51, and W52 are arranged at positions where the (4i+1)th row lines L1 and L5 and the odd-numbered column lines C1 and C3 intersect. The G subpixels G11, G12, G51, and G52 are arranged at positions where the (4i+1)th row lines L1 and L5 and the even-numbered column lines C2 and C4 intersect.

The subpixels of first and second colors W and G arranged on the (4i+1)th row lines L1 and L5 include TFTs arranged at the intersections of the data lines to the right and the (4i+1)th gate lines G1 and G5, respectively. Each TFT supplies a data voltage from the data line to the right of the subpixel to the pixel electrode. The TFT of the W11 subpixel is referred to as a first TFT, the TFT of the G11 subpixel as a second TFT, the TFT of the W12 subpixel as a third TFT, and the TFT of the G12 subpixel as a fourth TFT. The first TFT supplies a W data voltage from the second data line S2 to the pixel electrode PXL of the W11 subpixel, in response to a first gate pulse from the first gate line G1. The second TFT supplies a G data voltage from the third data line S3 to the pixel electrode PXL of the G11 subpixel, in response to the first gate pulse from the first gate line G1. The third TFT supplies a W data voltage from the fourth data line S4 to the pixel electrode PXL of the W12 subpixel, in response to the first gate pulse from the first gate line G1. The fourth TFT supplies a G data voltage from the fifth data line S5 to the pixel electrode PXL of the G12 subpixel, in response to the first gate pulse from the first gate line G1.

R subpixels R21, R22, R61, and R62 and B subpixels B21, B22, B61, and B62 are alternately arranged on the (4i+2)th row lines L2 and L6. The R subpixels R21, R22, R61, and R62 are arranged at positions where the (4i+2)th row lines L2 and L6 and the odd-numbered column lines C1 and C3 intersect. The B subpixels B21, B22, B61, and B62 are arranged at positions where the (4i+2)th row lines L2 and L6 and the even-numbered column lines C2 and C4 intersect.

The subpixels of third and fourth colors R and B arranged on the (4i+2)th row lines L2 and L6 include TFTs arranged at the intersections of the data lines to the right and the (4i+2)th gate lines G2 and G6, respectively. Each TFT supplies a data voltage from the data line to the right of the subpixel to the pixel electrode. The TFT of the R21 subpixel is referred to as a fifth TFT, the TFT of the B21 subpixel as a sixth TFT, the TFT of the R22 subpixel as a seventh TFT, and the TFT of the B22 subpixel as an eighth TFT.

The fifth TFT supplies an R data voltage from the second data line S2 to the pixel electrode PXL of the R21 subpixel, in response to a third gate pulse from the second gate line G2. The sixth TFT supplies a B data voltage from the third data line S3 to the pixel electrode PXL of the B21 subpixel, in response to the third gate pulse from the second gate line G2. The seventh TFT supplies an R data voltage from the fourth data line S4 to the pixel electrode PXL of the R22 subpixel, in response to the third gate pulse from the second gate line G2. The eighth TFT supplies a B data voltage from the fifth data line S5 to the pixel electrode PXL of the B22 subpixel, in response to the third gate pulse from the second gate line G2.

G subpixels G31, G32, G71, and G72 and W subpixels W31, W32, W71, and W72 are alternately arranged on the (4i+3)th row lines L3 and L7. The G subpixels G31, G32, G71, and G72 are arranged at positions where the (4i+3)th row lines L3 and L7 and the odd-numbered column lines C1 and C3 intersect. The W subpixels W31, W32, W71, and W72 are arranged at positions where the (4i+3)th row lines L3 and L7 and the even-numbered column lines C2 and C4 intersect.

The subpixels of the first and second colors W and G arranged on the (4i+3)th row lines L3 and L7 include TFTs arranged at the intersections of the data lines to the right and the (4i+3)th gate lines G3 and G7, respectively. Each TFT supplies a data voltage from the data line to the right of the subpixel to the pixel electrode. The TFT of the G31 subpixel is referred to as a ninth TFT, the TFT of the W31 subpixel as a tenth TFT, the TFT of the G32 subpixel as an eleventh TFT, and the TFT of the W32 subpixel as a twelfth TFT. The ninth TFT supplies a G data voltage from the second data line S2 to the pixel electrode PXL of the G31 subpixel, in response to a second gate pulse from the third gate line G3. The tenth TFT supplies a W data voltage from the third data line S3 to the pixel electrode PXL of the W31 subpixel, in response to the second gate pulse from the third gate line G3. The eleventh TFT supplies a G data voltage from the fourth data line S4 to the pixel electrode PXL of the G32 subpixel, in response to the second gate pulse from the third gate line G3. The twelfth TFT supplies a W data voltage from the fifth data line S5 to the pixel electrode PXL of the W32 subpixel, in response to the second gate pulse from the third gate line G3.

B subpixels B41, B42, B81, and B82 and R subpixels R41, R42, R81, and R82 are alternately arranged on the (4i+4)th row lines L4 and L8. The B subpixels B41, B42, B81, and B82 are arranged at positions where the (4i+4)th row lines L4 and L8 and the odd-numbered column lines C1 and C3 intersect. The R subpixels R41, R42, R81, and R82 are arranged at positions where the (4i+4)th row lines L4 and L8 and the even-numbered column lines C2 and C4 intersect.

The subpixels of the third and fourth colors R and B arranged on the (4i+4)th row lines L4 and L8 include TFTs arranged at the intersections of the data lines to the left and the (4i+4)th gate lines G4 and G8, respectively. Each TFT supplies a data voltage from the data line to the left of the subpixel to the pixel electrode. The TFT of the B41 subpixel is referred to as a thirteenth TFT, the TFT of the R41 subpixel as a fourteenth TFT, the TFT of the B42 subpixel as a fifteenth TFT, and the TFT of the R42 subpixel as a sixteenth TFT. The thirteenth TFT supplies a B data voltage from the first data line S1 to the pixel electrode PXL of the B41 subpixel, in response to a fourth gate pulse from the fourth gate line G4. The fourteenth TFT supplies an R data voltage from the second data line S2 to the pixel electrode PXL of the R41 subpixel, in response to the fourth gate pulse from the fourth gate line G4. The fifteenth TFT supplies a B data voltage from the third data line S3 to the pixel electrode PXL of the B42 subpixel, in response to the fourth gate pulse from the fourth gate line G4. The sixteenth TFT supplies an R data voltage from the fourth data line S4 to the pixel electrode PXL of the R42 subpixel, in response to the fourth gate pulse from the fourth gate line G4.

In order to reverse the polarity of data voltages once for every 4 dots, the source drive ICs output data voltages with first polarity during 4 horizontal periods 4H, and then output data voltages with second polarity during the next 4 horizontal periods 4H.

The data voltages supplied to the odd-numbered data lines S1, S3, and S5 are output from the source drive ICs during 4 horizontal periods 4H, in order: data voltage of the second color G, data voltage of the first color W, data voltage of the fourth color B, and data voltage of the fourth color B, and then their polarity is reversed. The polarity of the data voltages supplied to the odd-numbered data lines S1, S3, and S5 is reversed on the data voltages of the fourth color B.

The data voltages supplied to the even-numbered data lines S2 and S4 are output from the source drive ICs during 4 horizontal periods 4H, in order: data voltage of the first color W, data voltage of the second color G, data voltage of the third color R, and data voltage of the third color R, and then their polarity is reversed. The polarity of the data voltages supplied to the even-numbered data lines S2 and S4 is reversed on the data voltages of the second color G. Among the data voltages supplied to the data lines S1 to Sm, the fourth data voltage after polarity change—that is, the data voltage immediately before polarity reversal—is a data voltage of the first color W.

As shown in FIG. 14, the timing controller 20 controls in such a way that there is a difference of 1 horizontal period 1H between the polarity reversal timing of data voltages supplied to the odd-numbered data lines S1, S3, and S5 (S3 shown as a representative of S1, S3 and S5) and the polarity reversal timing of data voltages supplied to the even-numbered data lines S2 and S4 (S2 shown as a representative of S2 and S4).

Link lines LNK connecting (4i+2)th and (4i+3)th output channels 2 and 3 of the gate driver 104 and the (4i+2)th and (4i+3)th gate lines G2, G3, G6, and G7 intersect, with an insulating layer in between. Due to this, as shown in FIG. 14, although the gate driver 104 outputs a third gate pulse through the third output channel 3 after outputting a second gate pulse through the second output channel 2, the third gate pulse is applied to the second gate line G2 after the second gate pulse is applied to the third gate line G3. Accordingly, gate pulses are applied to the gate lines G1 to G8 in order: G1, G3, G2, G4, G5, G7, G6, and G8.

FIGS. 15A to 16G show how data voltage transitions occur when a test pattern of various colors is displayed on the pixel array according to an aspect of the present disclosure.

FIGS. 15A to 15G are views showing which subpixels are lit up and their polarity, when white, red, green, blue, yellow, cyan, and magenta patterns are displayed on the pixel array according to an aspect of the present disclosure. FIGS. 16A to 16G are views showing data voltages when the colors of FIGS. 15A to 15G are displayed on the pixel array according to an aspect of the present disclosure. The arrows in FIGS. 16A to 16G indicate data voltage transitions.

Figure 15E:
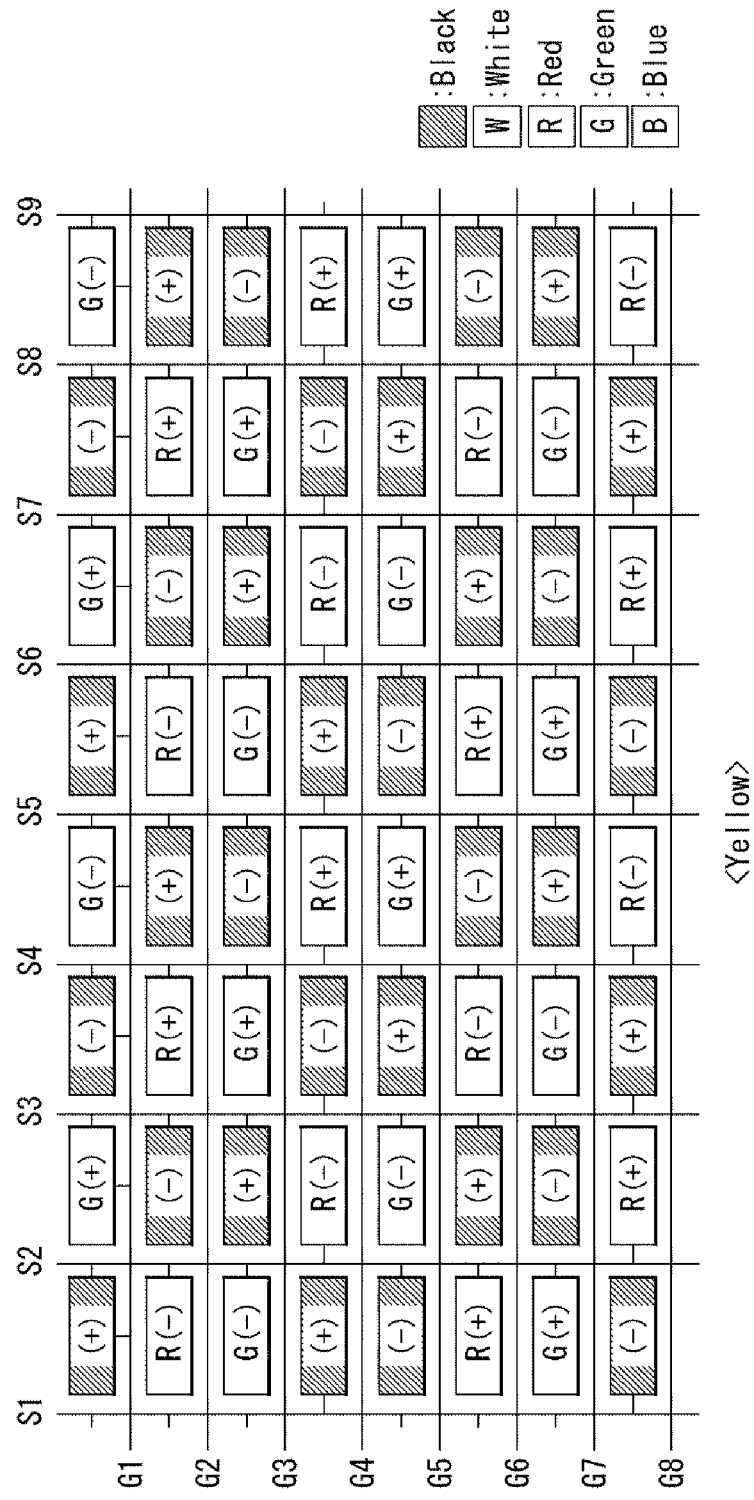
Figure 16A:
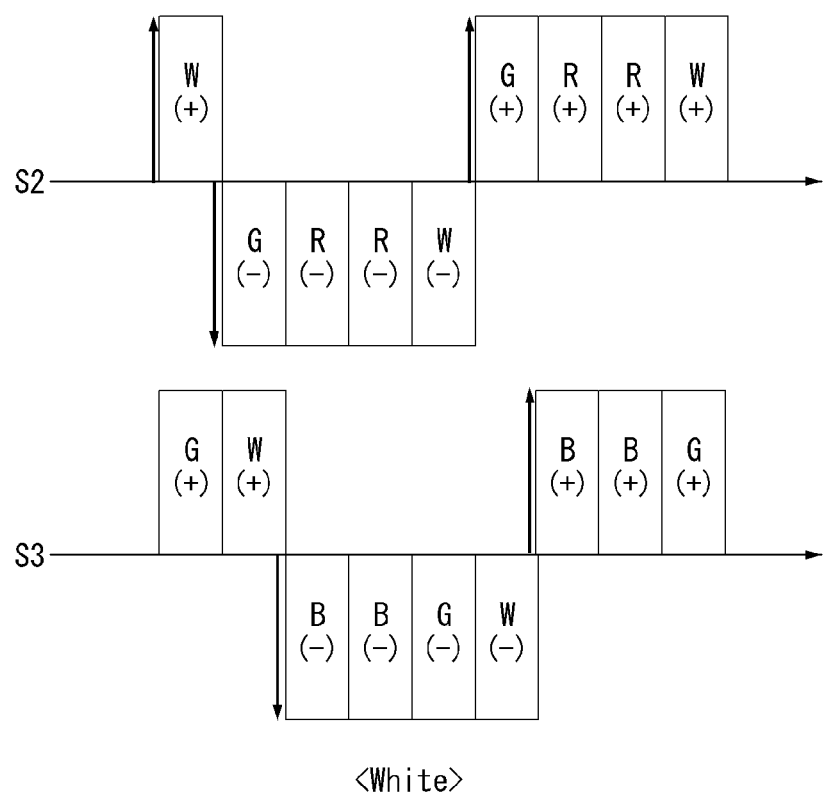

Referring to FIGS. 15A and 16A, when a white pattern is displayed on the pixels of the pixel array, the R subpixels, G subpixels, B subpixels, and W subpixels are all lit up at the white level. In the white pattern, the RGBW data voltages are the white-level voltage. For the white pattern to be displayed on the pixel array, the data voltages supplied to the 8 lines L1 to L8 of subpixels shown in FIG. 13 change twice with a voltage swing of 2 V during 8 horizontal periods 8H. At these data voltages, the temperature of heat generated from the source drive ICs is 246° C., as seen from Table 1.

Referring to FIGS. 15B and 16B, when a red pattern is displayed on the pixels of the pixel array, only the R subpixels are lit up at the white level. In the red pattern, the R data voltage is the white-level voltage, and the data voltages of the other colors are the black-level voltage. For the red pattern, the data voltages supplied to the 8 lines L1 to L8 of subpixels shown in FIG. 13 change once with a voltage swing of 1 V during 8 horizontal periods 8H. Since the data voltages applied to the odd-numbered data lines S1, S3, and S5 undergo no transition to the white-level voltage, the average number of transitions in data voltage applied to the data lines S1 to S5 during the 8 horizontal periods is 1. At these data voltages, the temperature of heat generated from the source drive ICs is 150° C., as seen from Table 1.

Figure 16C:
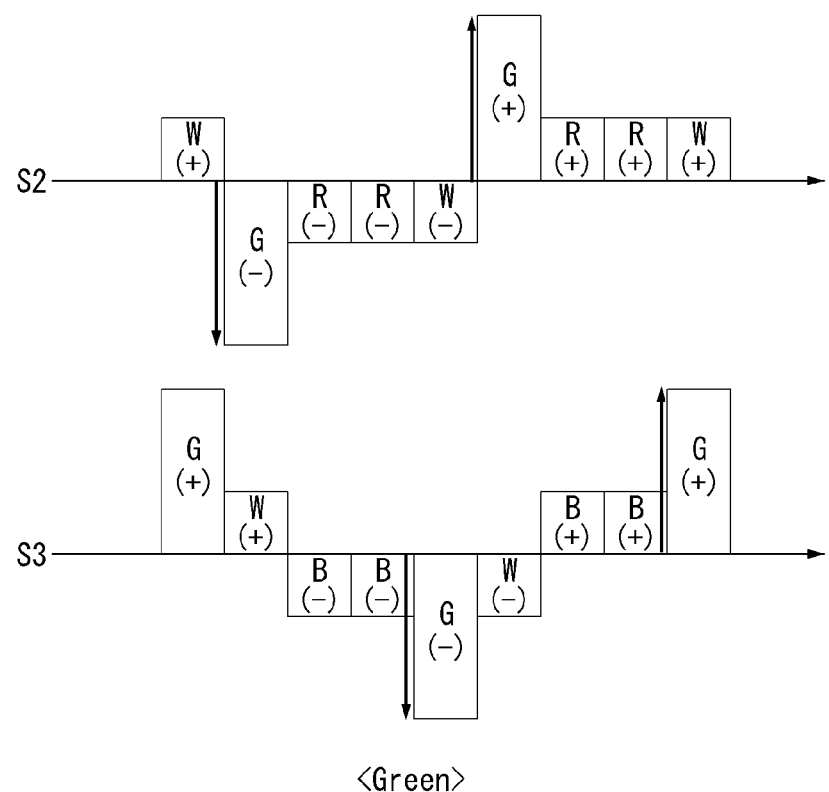

Referring to FIGS. 15C and 16C, when a green pattern is displayed on the pixels of the pixel array, only the G subpixels are lit up at the white level. In the green pattern, the G data voltage is the white-level voltage, and the data voltages of the other colors are the black-level voltage. For the green pattern, the data voltages supplied to the 8 lines L1 to L8 of subpixels shown in FIG. 13 change twice with a voltage swing of 1 V during 8 horizontal periods 8H. At these data voltages, the temperature of heat generated from the source drive ICs is 201° C., as seen from Table 1.

Figure 16D:
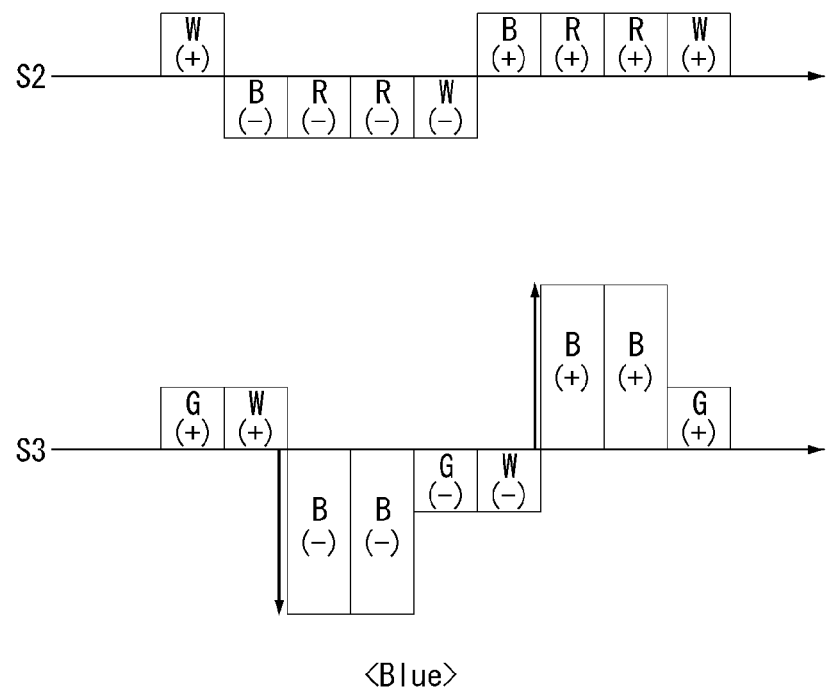

Referring to FIGS. 15D and 16D, when a blue pattern is displayed on the pixels of the pixel array, only the B subpixels are lit up at the white level. In the blue pattern, the B data voltage is the white-level voltage, and the data voltages of the other colors are the black-level voltage. For the blue pattern, the data voltages supplied to the 8 lines L1 to L8 of subpixels shown in FIG. 13 change once with a voltage swing of 1 V during 8 horizontal periods 8H. Since the data voltages applied to the even-numbered data lines S2 and S4 undergo no transition to the white-level voltage, the average number of transitions in data voltage applied to the data lines S1 to S5 during the 8 horizontal periods is 1. At these data voltages, the temperature of heat generated from the source drive ICs is 142° C., as seen from Table 1.

Referring to FIGS. 15E and 16E, when a yellow pattern is displayed on the pixels of the pixel array, the G subpixels and the R subpixels are lit up at the white level. In the yellow pattern, the G data voltage and the R data voltage are the white-level voltage, and the data voltages of the other colors are the black-level voltage. For the yellow pattern, the data voltages supplied to the 8 lines L1 to L8 of subpixels shown in FIG. 13 change twice with a voltage swing of 1 V during 8 horizontal periods 8H. At these data voltages, the temperature of heat generated from the source drive ICs is 203° C., as seen from Table 1.

Figure 16F:
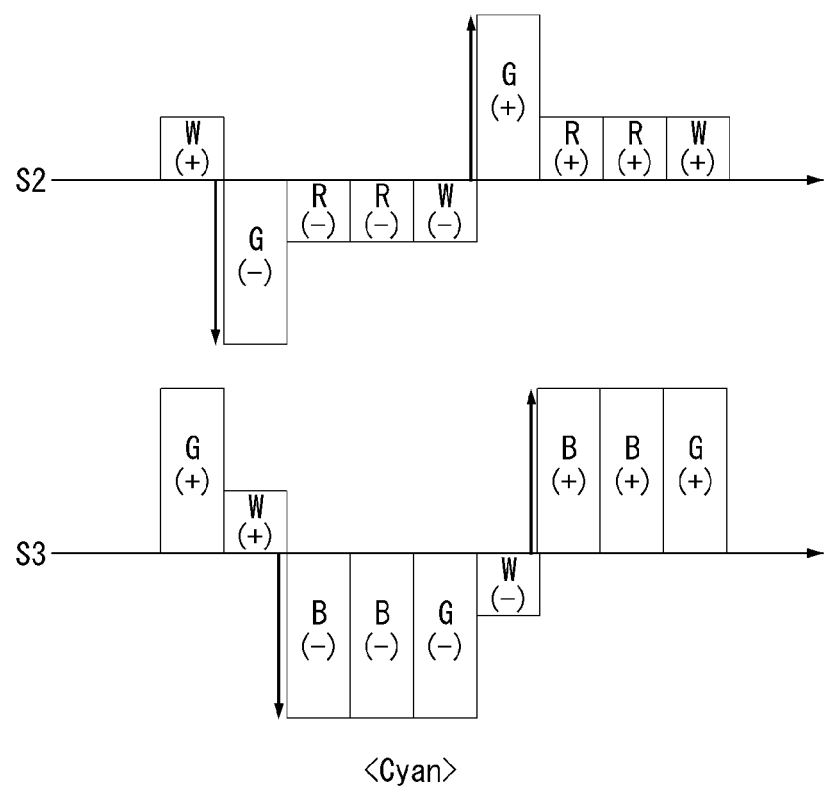

Referring to FIGS. 15F and 16F, when a cyan pattern is displayed on the pixels of the pixel array, the G subpixels and the B subpixels are lit up at the white level. In the cyan pattern, the G data voltage and the B data voltage are the white-level voltage, and the data voltages of the other colors are the black-level voltage. For the cyan pattern, the data voltages supplied to the 8 lines L1 to L8 of subpixels shown in FIG. 13 change twice with a voltage swing of 1 V during 8 horizontal periods 8H. At these data voltages, the temperature of heat generated from the source drive ICs is 194° C., as seen from Table 1.

Figure 15G:
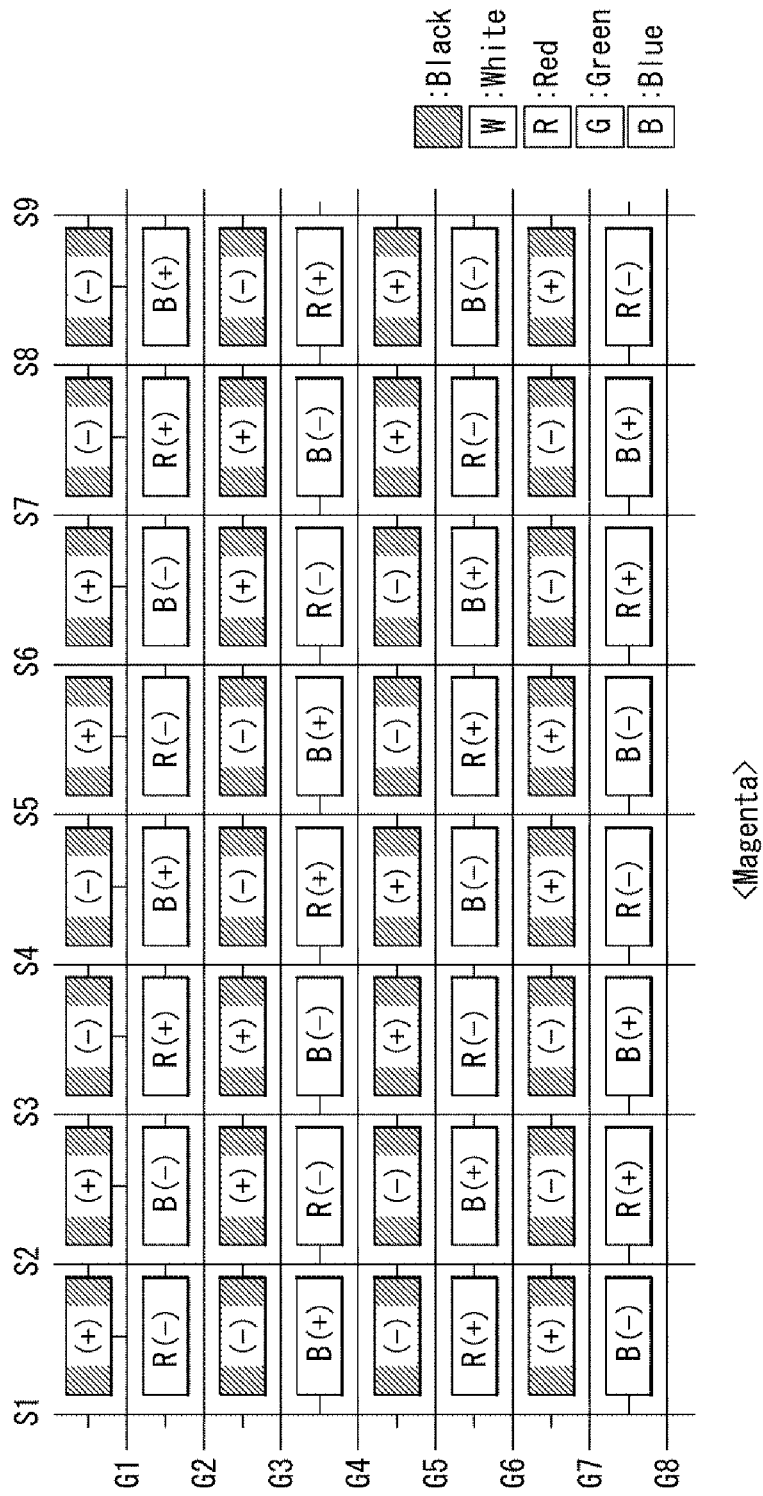
Figure 16G:
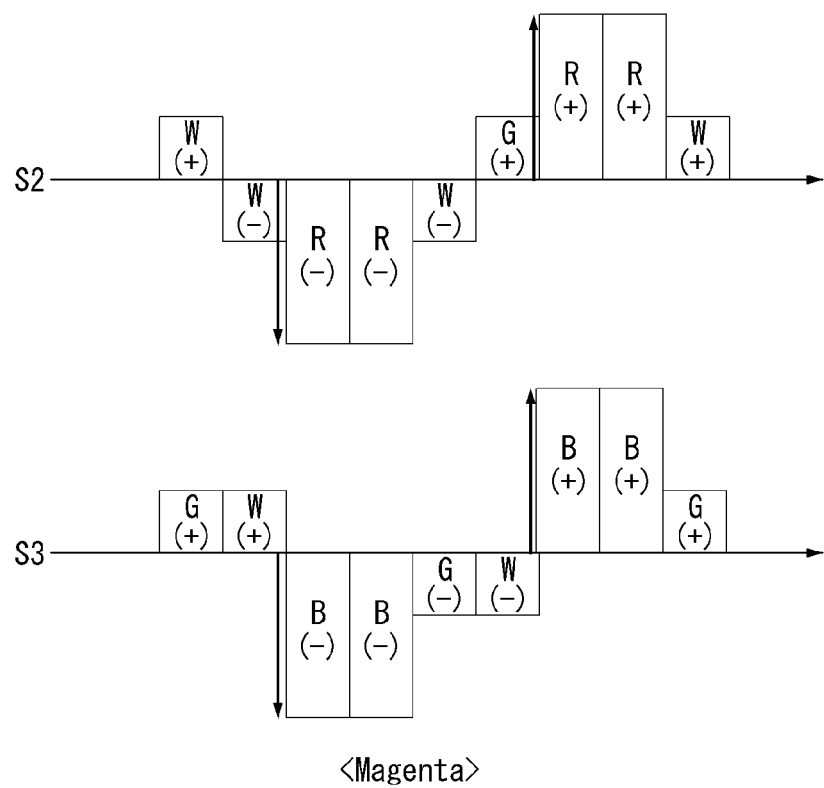

Referring to FIGS. 15G and 16G, when a magenta pattern is displayed on the pixels of the pixel array, the B subpixels and the R subpixels are lit up at the white level. In the magenta pattern, the B data voltage and the R data voltage are the white-level voltage, and the data voltages of the other colors are the black-level voltage. For the magenta pattern, the data voltages supplied to the 8 lines L1 to L8 of subpixels shown in FIG. 13 change twice with a voltage swing of 1 V during 8 horizontal periods 8H. At these data voltages, the temperature of heat generated from the source drive ICs is 202° C., as seen from Table 1.

As can be seen from above, in the examples (FIGS. 12 to 14) of the present disclosure, the balance of polarity may be attained for each color without polarity banding phenomenon, and therefore input images may be reproduced with high picture quality. In the examples (FIGS. 12 to 14) of the present disclosure, the power consumption and heat generation of the source drive ICs may be reduced for every color.

Figure 17:
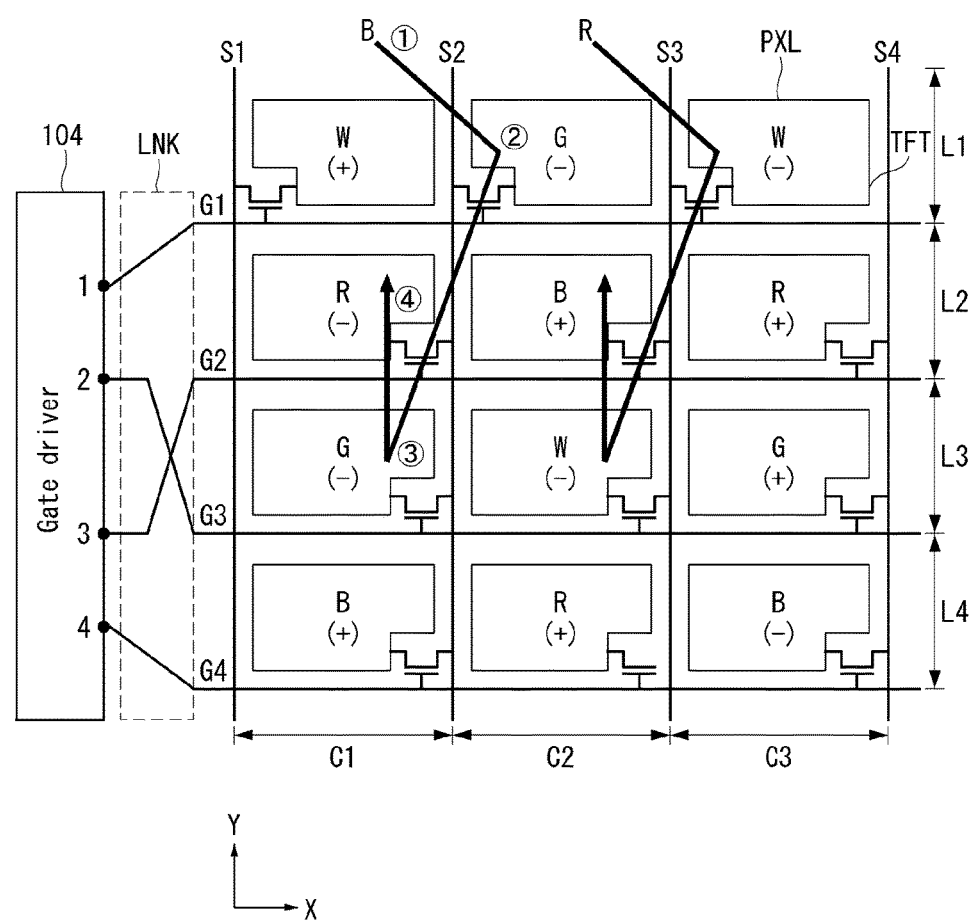
FIGS. 17 and 18 are views showing a pixel array structure and a data voltage charging sequence according to an aspect of the present disclosure.
Figure 18:
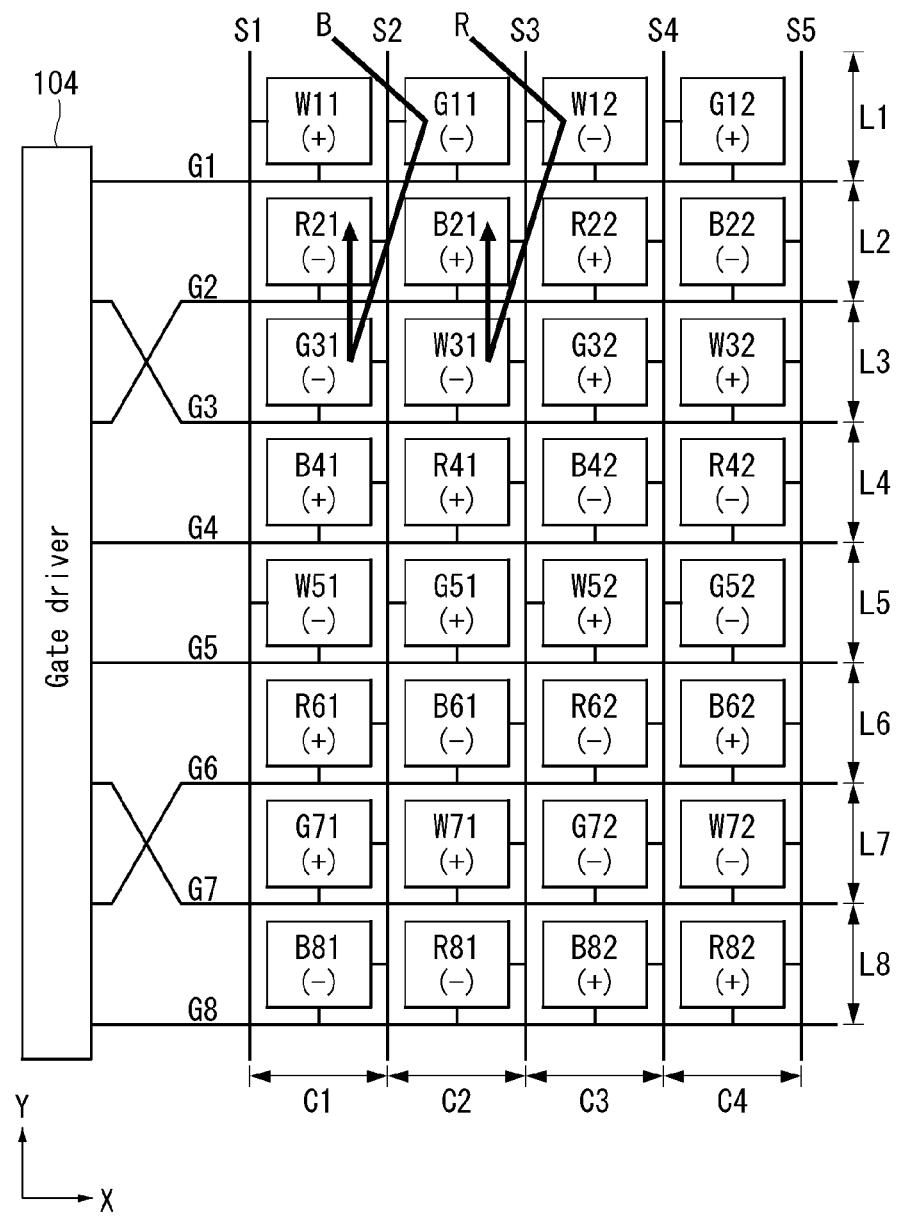
Figure 19:
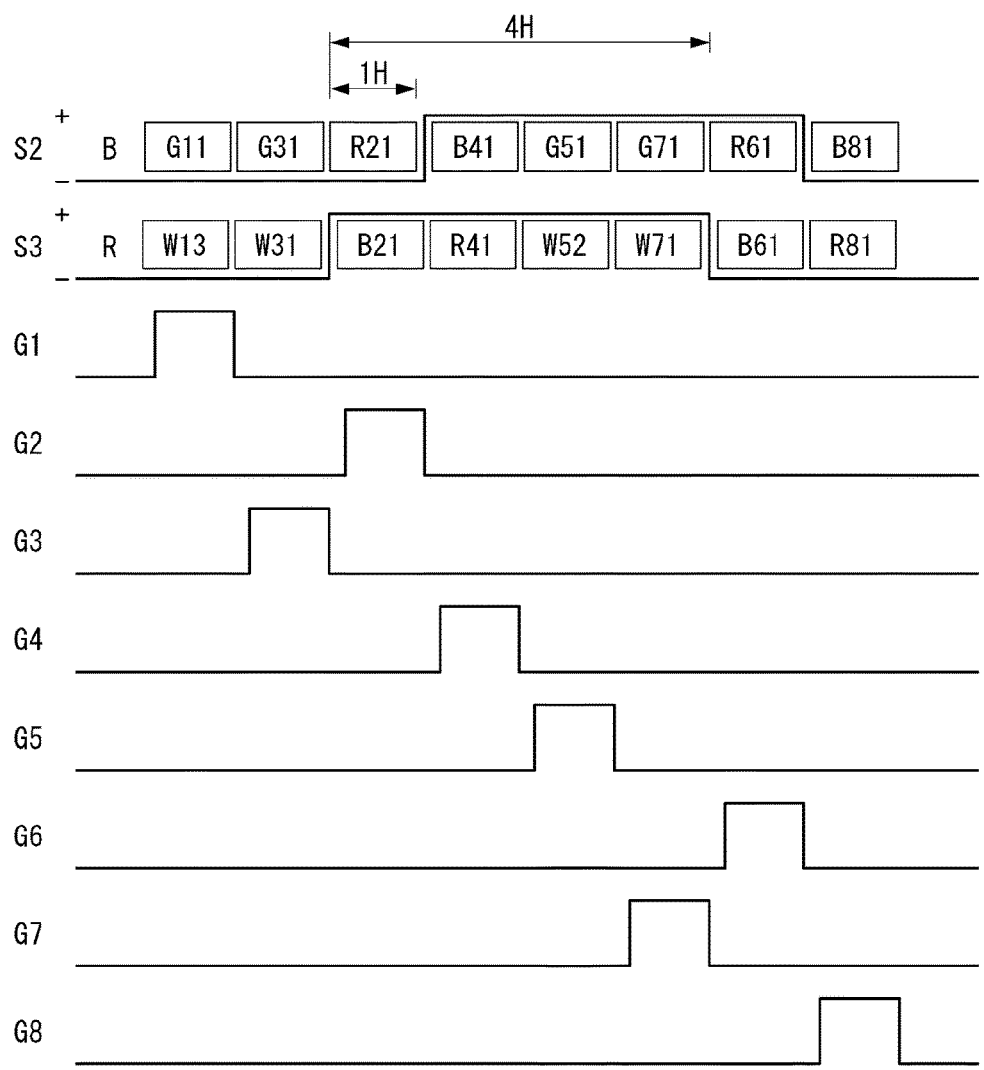
FIG. 19 is a waveform diagram showing output signals from source drive ICs and a gate driver for driving the pixel array of FIGS. 17 and 18 according to an aspect of the present disclosure.

FIGS. 17 and 18 are views showing a pixel array structure and a data voltage charging sequence according to a an aspect of the present disclosure. FIG. 19 is a waveform diagram showing output signals from source drive ICs and a gate driver for driving the pixel array of FIGS. 17 and 18 according to an aspect of the present disclosure. The pixel array on the display panel 100 has a repeating structure of 4*8 subpixels as in FIG. 18. In FIGS. 17 and 18, the B and R above the first row line L1 indicate dummy subpixels that are charged with dummy data voltages prior to charging the first row line L1.

Referring to FIGS. 17 and 18, W subpixels W11, W12, W51, and W52 and G subpixels G11, G12, G51, and G52 are alternately arranged on the (4i+1)th row lines L1 and L5. The W subpixels W11, W12, W51, and W52 are arranged at positions where the (4i+1)th row lines L1 and L5 and the odd-numbered column lines C1 and C3 intersect. The G subpixels G11, G12, G51, and G52 are arranged at positions where the (4i+1)th row lines L1 and L5 and the even-numbered column lines C2 and C4 intersect.

The subpixels of first and second colors W and G arranged on the (4i+1)th row lines L1 and L5 include TFTs arranged at the intersections of the data lines to the left and the (4i+1)th gate lines G1 and G5, respectively. Each TFT supplies a data voltage from the data line to the left of the subpixel to the pixel electrode. The TFT of the W11 subpixel is referred to as a first TFT, the TFT of the G11 subpixel as a second TFT, the TFT of the W12 subpixel as a third TFT, and the TFT of the G12 subpixel as a fourth TFT. The first TFT supplies a W data voltage from the first data line S1 to the pixel electrode PXL of the W11 subpixel, in response to a first gate pulse from the first gate line G1. The second TFT supplies a G data voltage from the second data line S2 to the pixel electrode PXL of the G11 subpixel, in response to the first gate pulse from the first gate line G1. The third TFT supplies a W data voltage from the third data line S3 to the pixel electrode PXL of the W12 subpixel, in response to the first gate pulse from the first gate line G1. The fourth TFT supplies a G data voltage from the fourth data line S4 to the pixel electrode PXL of the G12 subpixel, in response to the first gate pulse from the first gate line G1.

R subpixels R21, R22, R61, and R62 and B subpixels B21, B22, B61, and B62 are alternately arranged on the (4i+2)th row lines L2 and L6. The R subpixels R21, R22, R61, and R62 are arranged at positions where the (4i+2)th row lines L2 and L6 and the odd-numbered column lines C1 and C3 intersect. The B subpixels B21, B22, B61, and B62 are arranged at positions where the (4i+2)th row lines L2 and L6 and the even-numbered column lines C2 and C4 intersect.

The subpixels of third and fourth colors R and B arranged on the (4i+2)th row lines L2 and L6 include TFTs arranged at the intersections of the data lines to the right and the (4i+2)th gate lines G2 and G6, respectively. Each TFT supplies a data voltage from the data line to the right of the subpixel to the pixel electrode. The TFT of the R21 subpixel is referred to as a fifth TFT, the TFT of the B21 subpixel as a sixth TFT, the TFT of the R22 subpixel as a seventh TFT, and the TFT of the B22 subpixel as an eighth TFT. The fifth TFT supplies an R data voltage from the second data line S2 to the pixel electrode PXL of the R21 subpixel, in response to a third gate pulse from the second gate line G2. The sixth TFT supplies a B data voltage from the third data line S3 to the pixel electrode PXL of the B21 subpixel, in response to the third gate pulse from the second gate line G2. The seventh TFT supplies an R data voltage from the fourth data line S4 to the pixel electrode PXL of the R22 subpixel, in response to the third gate pulse from the second gate line G2. The eighth TFT supplies a B data voltage from the fifth data line S5 to the pixel electrode PXL of the B22 subpixel, in response to the third gate pulse from the second gate line G2.

G subpixels G31, G32, G71, and G72 and W subpixels W31, W32, W71, and W72 are alternately arranged on the (4i+3)th row lines L3 and L7. The G subpixels G31, G32, G71, and G72 are arranged at positions where the (4i+3)th row lines L3 and L7 and the odd-numbered column lines C1 and C3 intersect. The W subpixels W31, W32, W71, and W72 are arranged at positions where the (4i+3)th row lines L3 and L7 and the even-numbered column lines C2 and C4 intersect.

The subpixels of the first and second colors W and G arranged on the (4i+3)th row lines L3 and L7 include TFTs arranged at the intersections of the data lines to the right and the (4i+3)th gate lines G3 and G7, respectively. Each TFT supplies a data voltage from the data line to the right of the subpixel to the pixel electrode. The TFT of the G31 subpixel is referred to as a ninth TFT, the TFT of the W31 subpixel as a tenth TFT, the TFT of the G32 subpixel as an eleventh TFT, and the TFT of the W32 subpixel as a twelfth TFT. The ninth TFT supplies a G data voltage from the second data line S2 to the pixel electrode PXL of the G31 subpixel, in response to a second gate pulse from the third gate line G3. The tenth TFT supplies a W data voltage from the third data line S3 to the pixel electrode PXL of the W31 subpixel, in response to the second gate pulse from the third gate line G3. The eleventh TFT supplies a G data voltage from the fourth data line S4 to the pixel electrode PXL of the G32 subpixel, in response to the second gate pulse from the third gate line G3. The twelfth TFT supplies a W data voltage from the fifth data line S5 to the pixel electrode PXL of the W32 subpixel, in response to the second gate pulse from the third gate line G3.

B subpixels B41, B42, B81, and B82 and R subpixels R41, R42, R81, and R82 are alternately arranged on the (4i+4)th row lines L4 and L8. The B subpixels B41, B42, B81, and B82 are arranged at positions where the (4i+4)th row lines L4 and L8 and the odd-numbered column lines C1 and C3 intersect. The R subpixels R41, R42, R81, and R82 are arranged at positions where the (4i+4)th row lines L4 and L8 and the even-numbered column lines C2 and C4 intersect.

The subpixels of the third and fourth colors R and B arranged on the (4i+4)th row lines L4 and L8 include TFTs arranged at the intersections of the data lines to the right and the (4i+4)th gate lines G4 and G8, respectively. Each TFT supplies a data voltage from the data line to the right of the subpixel to the pixel electrode. The TFT of the B41 subpixel is referred to as a thirteenth TFT, the TFT of the R41 subpixel as a fourteenth TFT, the TFT of the B42 subpixel as a fifteenth TFT, and the TFT of the R42 subpixel as a sixteenth TFT. The thirteenth TFT supplies a B data voltage from the second data line S2 to the pixel electrode PXL of the B41 subpixel, in response to a fourth gate pulse from the fourth gate line G4. The fourteenth TFT supplies an R data voltage from the third data line S3 to the pixel electrode PXL of the R41 subpixel, in response to the fourth gate pulse from the fourth gate line G4. The fifteenth TFT supplies a B data voltage from the fourth data line S4 to the pixel electrode PXL of the B42 subpixel, in response to the fourth gate pulse from the fourth gate line G4. The sixteenth TFT supplies an R data voltage from the fifth data line S5 to the pixel electrode PXL of the R42 subpixel, in response to the fourth gate pulse from the fourth gate line G4.

In order to reverse the polarity of data voltages once for every 4 dots, the source drive ICs output data voltages with first polarity during 4 horizontal periods 4H, and then output data voltages with second polarity during the next 4 horizontal periods 4H.

The data voltages supplied to the odd-numbered data lines S1, S3, and S5 are output from the source drive ICs during 4 horizontal periods 4H, in order: data voltage of the third color R, data voltage of the first color W, data voltage of the first color W, and data voltage of the fourth color B, and then their polarity is reversed. The polarity of the data voltages supplied to the odd-numbered data lines S1, S3, and S5 is reversed on the data voltages of the fourth color B.

The data voltages supplied to the even-numbered data lines S2 and S4 are output from the source drive ICs during 4 horizontal periods 4H, in order: data voltage of the fourth color B, data voltage of the second color G, data voltage of the second color G, and data voltage of the third color R, and then their polarity is reversed. The polarity of the data voltages supplied to the even-numbered data lines S2 and S4 is reversed on the data voltages of the fourth color B.

As shown in FIG. 19, the timing controller 20 controls in such a way that there is a difference of 1 horizontal period 1H between the polarity reversal timing of data voltages supplied to the odd-numbered data lines S1, S3, and S5 (S3 shown as a representative of S1, S3 and S5) and the polarity reversal timing of data voltages supplied to the even-numbered data lines S2 and S4 (S2 shown as a representative of S2 and S4).

Link lines LNK connecting (4i+2)th and (4i+3)th output channels 2 and 3 of the gate driver 104 and the (4i+2)th and (4i+3)th gate lines G2, G3, G6, and G7 intersect, with an insulating layer in between. Due to this, as shown in FIG. 19, although the gate driver 104 outputs a third gate pulse through the third output channel 3 after outputting a second gate pulse through the second output channel 2, the third gate pulse is applied to the second gate line G2 after the second gate pulse is applied to the third gate line G3. Accordingly, gate pulses are applied to the gate lines G1 to G8 in order: G1, G3, G2, G4, G5, G7, G6, and G8.

FIGS. 20A to 21G show how data voltage transitions occur when a test pattern of various colors is displayed on the pixel array according to an aspect of the present disclosure.

FIGS. 20A to 20G are views showing which subpixels are lit up and their polarity, when white, red, green, blue, yellow, cyan, and magenta patterns are displayed on the pixel array, according to an aspect of the present disclosure. FIGS. 21A to 21G are views showing data voltages when the colors of FIGS. 20A to 20G are displayed on the pixel array. The arrows in FIGS. 21A to 21G indicate data voltage transitions.

Figure 20B:
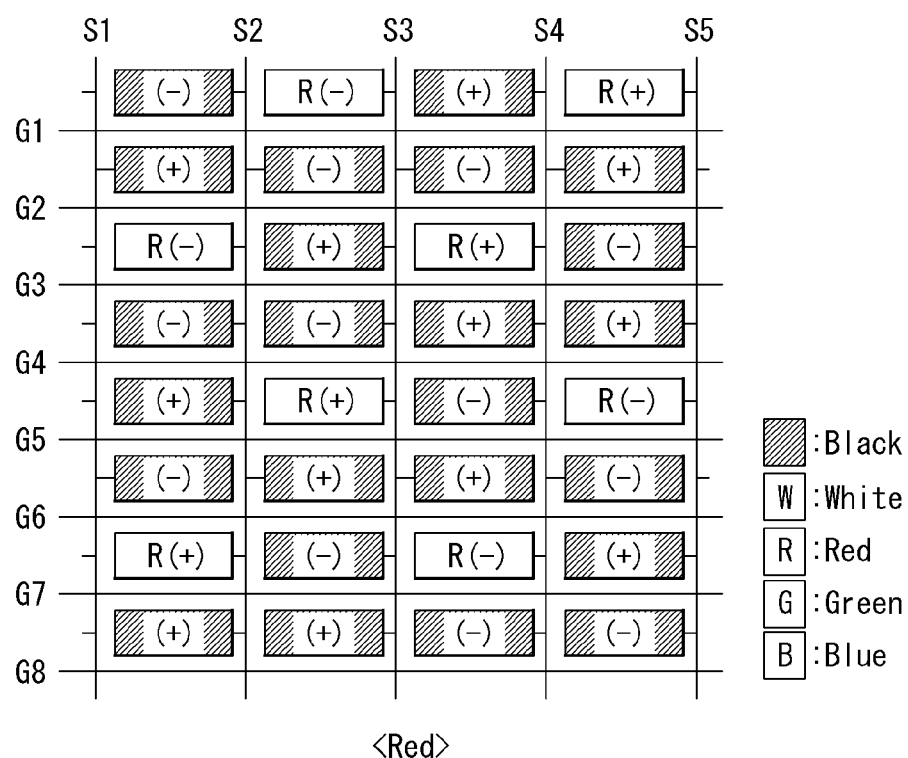
Figure 21A:
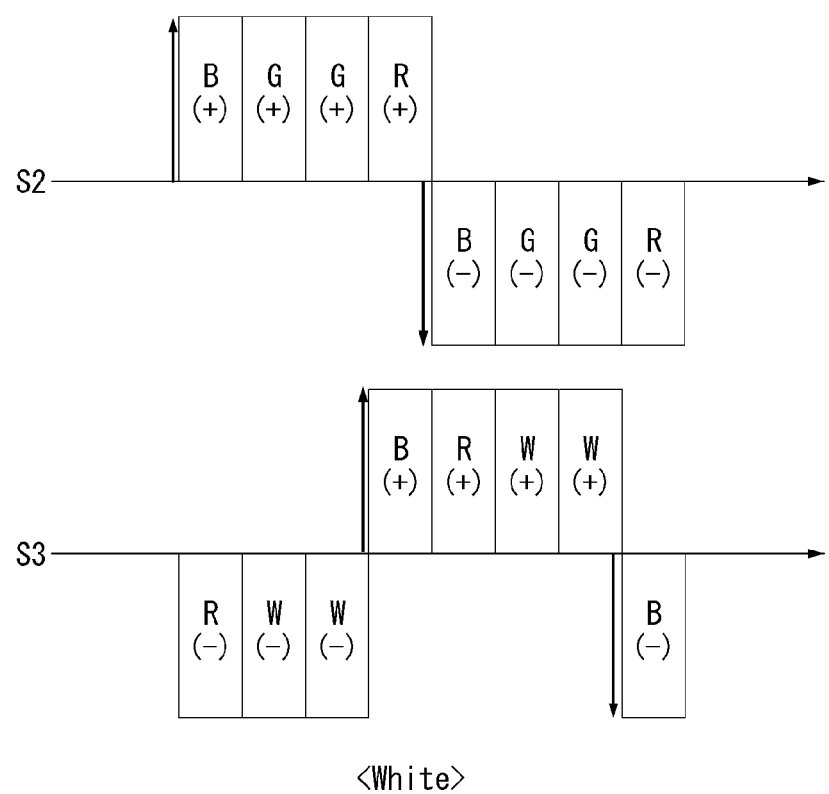

Referring to FIGS. 20A and 21A, when a white pattern is displayed on the pixels of the pixel array, the R subpixels, G subpixels, B subpixels, and W subpixels are all lit up at the white level. In the white pattern, the RGBW data voltages are the white-level voltage. For the white pattern to be displayed on the pixel array, the data voltages supplied to the 8 lines L1 to L8 of subpixels shown in FIG. 18 change twice with a voltage swing of 2 V during 8 horizontal periods 8H. At these data voltages, the temperature of heat generated from the source drive ICs is 246° C., as seen from Table 1.

Figure 21B:
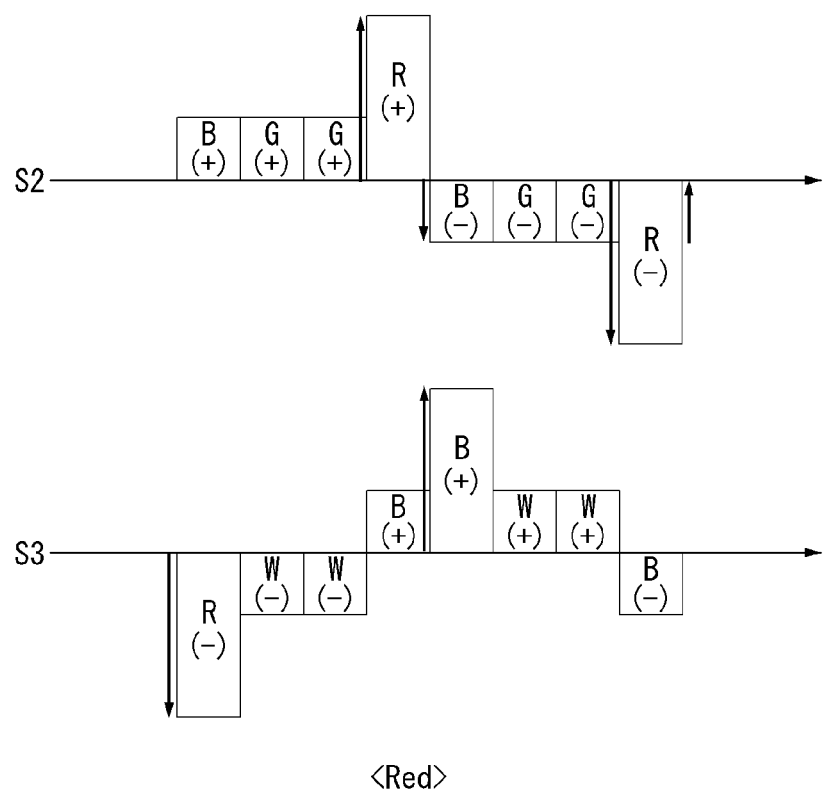

Referring to FIGS. 20B and 21B, when a red pattern is displayed on the pixels of the pixel array, only the R subpixels are lit up at the white level. In the red pattern, the R data voltage is the white-level voltage, and the data voltages of the other colors are the black-level voltage. For the red pattern, the data voltages supplied to the 8 lines L1 to L8 of subpixels shown in FIG. 18 change three times with a voltage swing of 1 V during 8 horizontal periods 8H. At these data voltages, the temperature of heat generated from the source drive ICs is 222° C., as seen from Table 1.

Figure 20C:
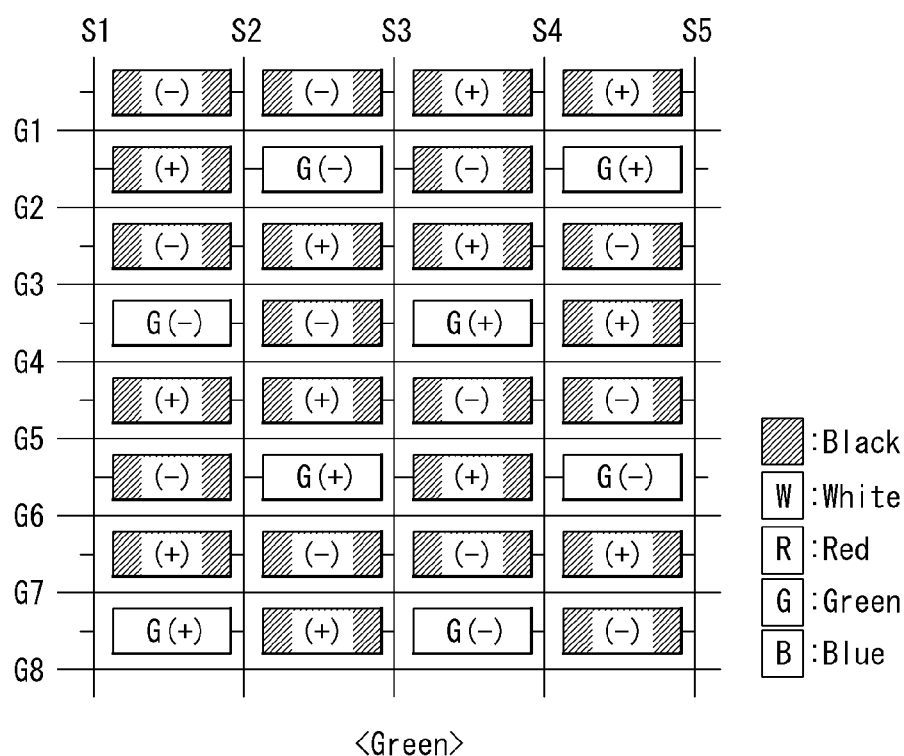

Referring to FIGS. 20C and 21C, when a green pattern is displayed on the pixels of the pixel array, only the G subpixels are lit up at the white level. In the green pattern, the G data voltage is the white-level voltage, and the data voltages of the other colors are the black-level voltage. For the green pattern, the data voltages supplied to the 8 lines L1 to L8 of subpixels shown in FIG. 18 change once with a voltage swing of 1 V during 8 horizontal periods 8H. At these data voltages, the temperature of heat generated from the source drive ICs is 150° C., as seen from Table 1.

Figure 20D:
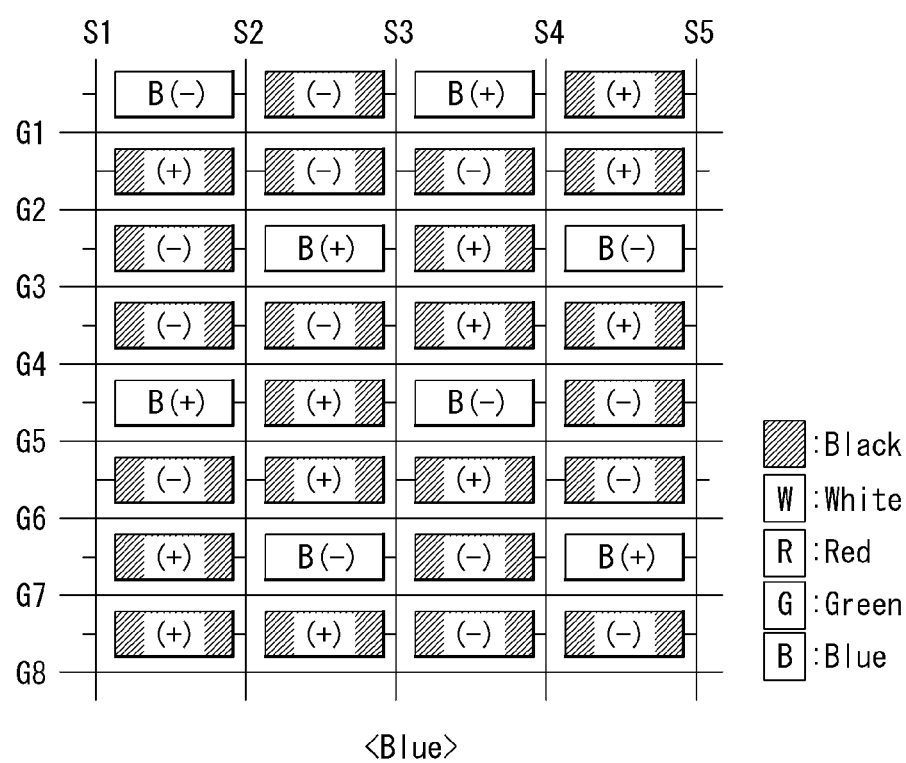
Figure 21D:
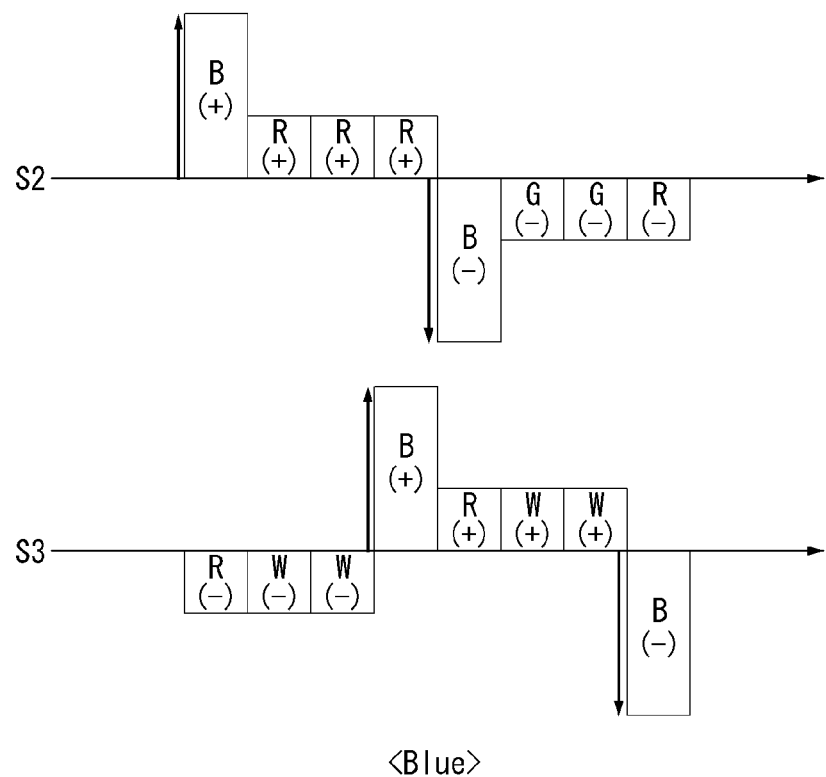

Referring to FIGS. 20D and 21D, when a blue pattern is displayed on the pixels of the pixel array, only the B subpixels are lit up at the white level. In the blue pattern, the B data voltage is the white-level voltage, and the data voltages of the other colors are the black-level voltage. For the blue pattern, the data voltages supplied to the 8 lines L1 to L8 of subpixels shown in FIG. 18 change twice with a voltage swing of 1 V during 8 horizontal periods 8H. At these data voltages, the temperature of heat generated from the source drive ICs is 201° C., as seen from Table 1.

Figure 20E:
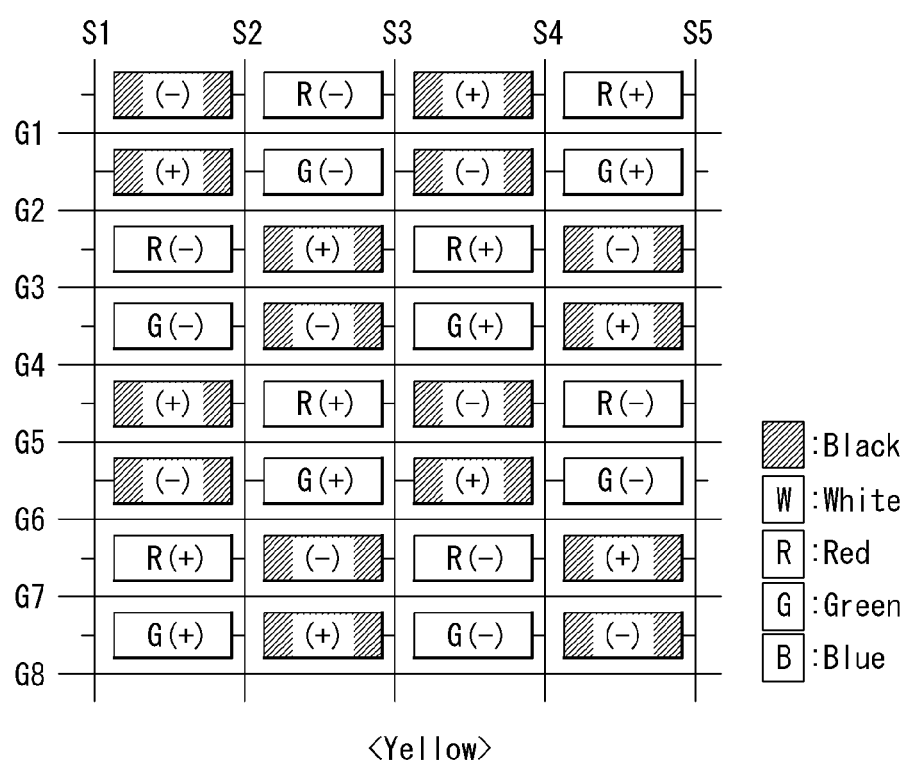

Referring to FIGS. 20E and 21E, when a yellow pattern is displayed on the pixels of the pixel array, the G subpixels and the R subpixels are lit up at the white level. In the yellow pattern, the G data voltage and the R data voltage are the white-level voltage (or highest voltage), and the data voltages of the other colors are the black-level voltage (or lowest voltage). For the yellow pattern, the data voltages supplied to the 8 lines L1 to L8 of subpixels shown in FIG. 18 change three times with a voltage swing of 1 V during 8 horizontal periods 8H. At these data voltages, the temperature of heat generated from the source drive ICs is 222° C., as seen from Table 1.

Figure 20F:
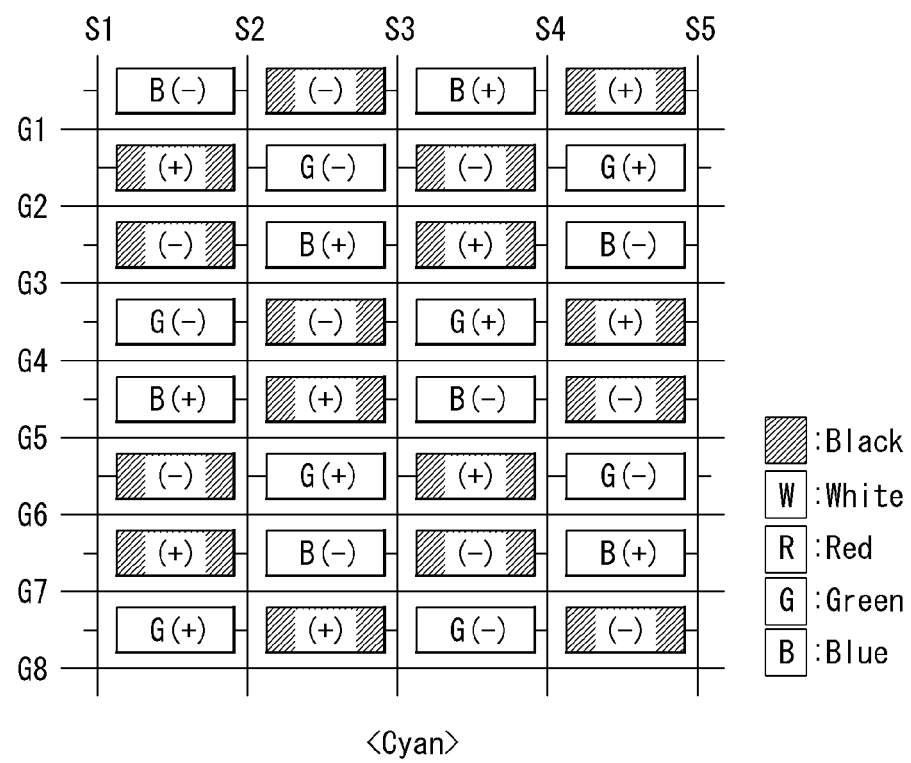
Figure 21F:
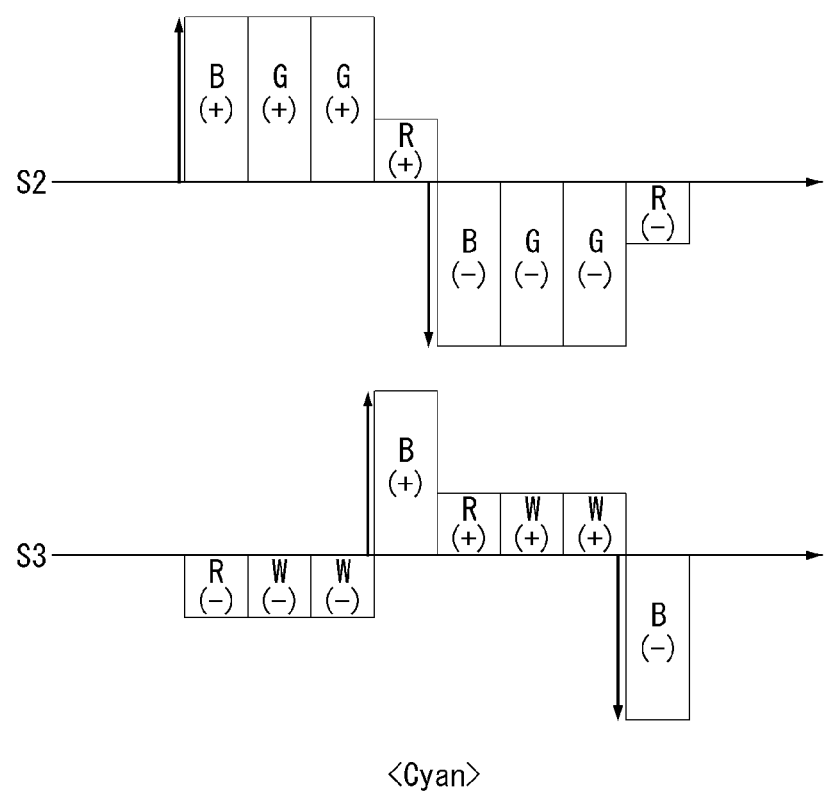

Referring to FIGS. 20F and 21F, when a cyan pattern is displayed on the pixels of the pixel array, the G subpixels and the B subpixels are lit up at the white level. In the cyan pattern, the G data voltage and the B data voltage are the white-level voltage, and the data voltages of the other colors are the black-level voltage. For the cyan pattern, the data voltages supplied to the 8 lines L1 to L8 of subpixels shown in FIG. 18 change twice with a voltage swing of 1 V during 8 horizontal periods 8H. At these data voltages, the temperature of heat generated from the source drive ICs is 201° C., as seen from Table 1.

Figure 20G:
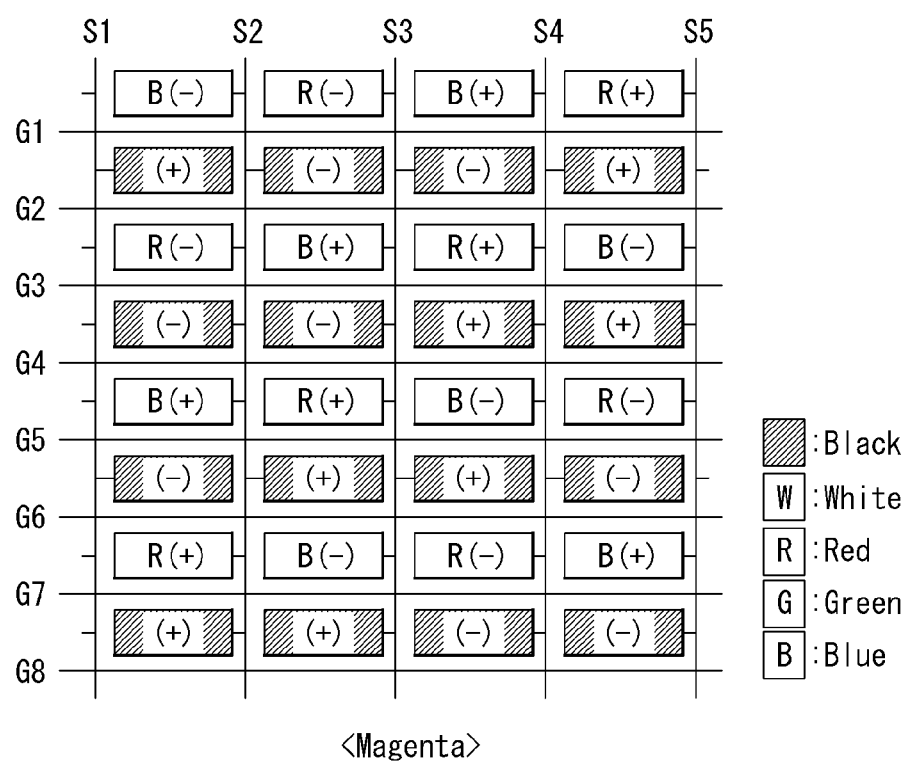
Figure 21G:
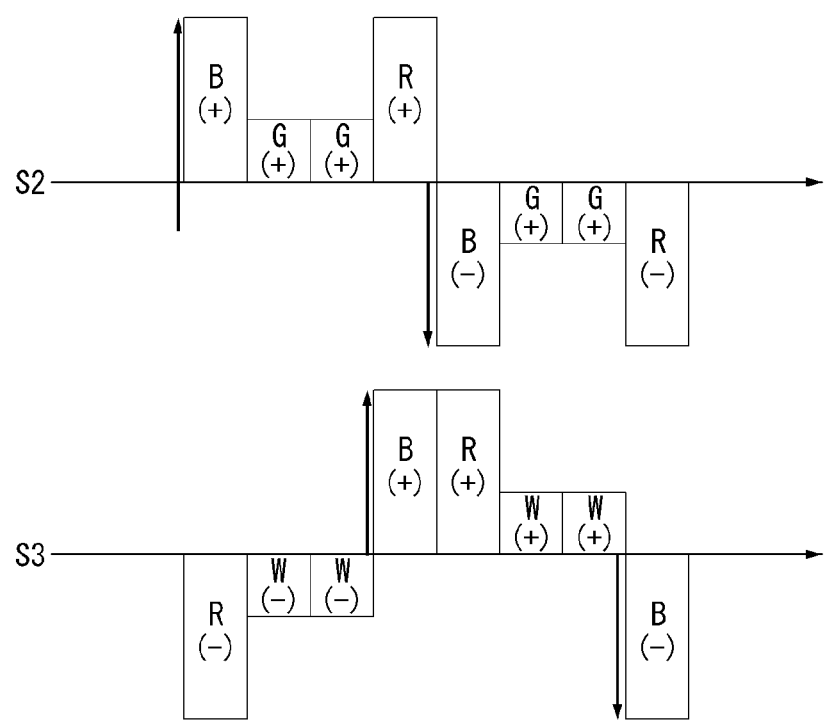

Referring to FIGS. 20G and 21G, when a magenta pattern is displayed on the pixels of the pixel array, the B subpixels and the R subpixels are lit up at the white level. In the magenta pattern, the B data voltage and the R data voltage are the white-level voltage, and the data voltages of the other colors are the black-level voltage. For the magenta pattern, the data voltages supplied to the 8 lines L1 to L8 of subpixels shown in FIG. 18 change three times with a voltage swing of 1 V during 8 horizontal periods 8H. At these data voltages, the temperature of heat generated from the source drive ICs is 255° C., as seen from Table 1.

As can be seen from above, in the examples (FIGS. 17 to 19) of the present disclosure, the balance of polarity may be attained for each color without polarity banding phenomenon, and therefore input images may be reproduced with high picture quality. In the examples (FIGS. 17 to 19) of the present disclosure, the power consumption and heat generation of the source drive ICs may be reduced for every color.

The following Table 1 shows the number of transitions in data voltage supplied to 8 lines during 8 horizontal periods, the data voltage swing, and the resulting temperature of heat generated from the source drive ICs in examples of the present disclosure described above, when colors of white, red, green, blue, yellow, cyan, and magenta are displayed.

TABLE 1

| Color Pattern | First Example (FIGS. 2~4) | | Second Example (FIGS. 7-9) | | Third Example (FIGS. 12~14) | | Fourth Example (FIGS. 17~19) | |
|---|---|---|---|---|---|---|---|---|
| | Number of Transitions within 8 lines | Expected Temperature of Heat Generation (° C.) | Number of Transitions within 8 lines | Expected Temperature of Heat Generation (° C.) | Number of Transitions within 8 lines | Expected Temperature of Heat Generation (° C.) | Number of Transitions within 8 lines | Expected Temperature of Heat Generation (° C.) |
| White | 2(2V)/8H | 246 | 2(2V)/8H | 246 | 2(2V)/8H | 246 | 2(2V)/8H | 246 |
| Red | 2/8H | 201 | 1/8H | 150 | 1/8H | 150 | 3/8H | 222 |
| Green | 2/8H | 201 | 2/8H | 201 | 2/8H | 201 | 1/8H | 150 |
| Blue | 2/8H | 201 | 1/8H | 142 | 1/8H | 142 | 2/8H | 201 |
| Yellow | 2/8H | 201 | 3/8H | 222 | 2/8H | 203 | 3/8H | 222 |
| Cyan | 2/8H | 201 | 1/8H | 150 | 2/8H | 194 | 2/8H | 201 |
| Magenta | 4/8H | 355 | 2/8H | 201 | 2/8H | 202 | 3/8H | 255 |

As described previously, in the present disclosure, the balance of polarity can be attained for each color without polarity banding phenomenon by optimizing an arrangement of colors on a display panel including subpixels of four colors, and therefore input images can be reproduced with high picture quality. Moreover, the power consumption and heat generation of the source drive ICs can be improved.

Although examples have been described with reference to a number of illustrative embodiments thereof, it should be understood that numerous other modifications and embodiments can be devised by those skilled in the art that will fall within the scope of the principles of this disclosure. More particularly, various variations and modifications are possible the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
a plurality of data lines;
a plurality of gate lines intersecting the plurality of data lines;
a plurality of subpixels including first-color subpixels, second-color subpixels, third-color subpixels, and fourth-color subpixels;
a data driver configured to reverse a polarity of data voltages for charging subpixels on a cycle and supply the data voltages to the plurality of data lines; and
a gate driver configured to supply gate pulses to the plurality of gate lines in synchronization with the data voltages,
wherein, in a pixel array formed of the plurality of subpixels, the first-color subpixels are arranged at positions where (4i+1)th row lines and odd-numbered column lines intersect with a negative polarity, the second-color subpixels are arranged at positions where the (4i+1)th row lines and even-numbered column lines intersect with a negative polarity, the third-color subpixels are arranged at positions where (4i+2)th row lines and the odd-numbered column lines intersect with a positive polarity, the fourth-color subpixels are arranged at positions where the (4i+2)th row lines and the even-numbered column lines intersect with a negative polarity, the second-color subpixels are arranged at positions where (4i+3)th row lines and the odd-numbered column lines intersect with a negative polarity, the first-color subpixels are arranged at positions where the (4i+3)th row lines and the even-numbered column lines intersect with a negative polarity, the fourth-color subpixels are arranged at positions where (4i+4)th row lines and the odd-numbered column lines intersect with a negative polarity, and the third-color subpixels are arranged at positions where the (4i+4)th row lines and the even-numbered column lines intersect with a positive polarity, wherein i is an integer greater than or equal to zero.

2. The liquid crystal display device of claim 1, wherein the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels,
the third-color and the fourth-color subpixels arranged on the (4i+2)th low lines comprise TFTs configured to supply data voltages from corresponding ones of the plurality of data lines to the left of the third-color and the fourth-color subpixels to pixel electrodes of the third-color and the fourth-color subpixels,
the first-color and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and the fourth-color subpixels arranged on the (4i+4)th low lines comprise TFTs configured to supply data voltages from the corresponding ones of the plurality of data lines to the left of the third-color and the fourth-color subpixels to the pixel electrodes of the third-color and the fourth color subpixels.

3. The liquid crystal display device of claim 2, wherein the data driver is configured to supply the plurality of data lines with the data voltages whose polarity is reversed on the cycle of every 4 horizontal periods, the gate driver is configured to sequentially supply the gate pulses to the plurality of gate lines in order from a first gate line to a fourth gate line of the plurality of gate lines, the polarity of the data voltages supplied to the plurality of data lines is reversed on data voltages of the first-color subpixels, and there is a difference of 2 horizontal periods between the reversal of the polarity of the data voltages supplied to odd-numbered ones of the plurality of data lines and the reversal of the polarity of the data voltages supplied to even-numbered ones of the plurality of data lines.

4. The liquid crystal display device of claim 3, wherein first color of the first-color subpixels is blue, second color of the second-color subpixels is red, third color of the third-color subpixels is white, and fourth color of the fourth-color subpixels is green.

5. The liquid crystal display device of claim 1, wherein the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth-color subpixels, the first-color and the second-color subpixels arranged on the (4i+3)th low lines comprise TFTs configured to supply data voltages from corresponding ones of the plurality of data lines to the left of the first-color and the second-color subpixels to the pixel electrodes of the first-color and the second-color subpixels, and the third-color and the fourth-color subpixels arranged on the (4i+4)th low lines comprise TFTs configured to supply data voltages from corresponding ones of the plurality of data lines to the left of the third-color and the fourth-color subpixels to the pixel electrodes of the third-color and the fourth color subpixels.

6. The liquid crystal display device of claim 5, wherein the data driver is configured to supply the plurality of data lines with data voltages whose polarity is reversed on the cycle of every 4 horizontal periods, and simultaneously reverse the polarity of the data voltages supplied to odd-numbered ones of the plurality of data lines and the polarity of the data voltages supplied to even-numbered ones of the plurality of data lines, the polarity of the data voltages supplied to the odd-numbered ones of the plurality of data lines is reversed on data voltages of the fourth-color subpixels, and the polarity of the data voltages supplied to the even-numbered ones of the plurality of data lines is reversed on data voltages of the third-color subpixels, the gate driver is configured to output the gate pulses in order from a first gate pulse to a fourth gate pulse, and among link lines connecting output channels of the gate driver and the plurality of gate lines, ones of the link lines connecting the output channels of the second and the third gate pulses and a second and a third gate lines of the plurality of gate lines intersect so that the third gate pulse is applied to the second gate line after the second gate pulse is applied to the third gate line.

7. The liquid crystal display device of claim 1, wherein the first-color and the second-color subpixels arranged on the (4i+1)th low lines comprise TFTs (thin-film transistors) configured to supply data voltages from corresponding ones of the plurality of data lines to the right of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth color subpixels, the first-color and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and the fourth-color subpixels arranged on the (4i+4)th low lines comprise TFTs configured to supply data voltages from corresponding ones of the plurality of data lines to the left of the third-color and the fourth-color subpixels to the pixel electrodes of the third-color and the fourth-color subpixels.

8. The liquid crystal display device of claim 7, wherein the data driver is configured to supply the plurality of data lines with data voltages whose polarity is reversed on the cycle of every 4 horizontal periods, the polarity of the data voltages that is supplied to odd-numbered ones of the plurality of data lines is reversed on data voltages of the fourth-color subpixels, and the polarity of the data voltages supplied to even-numbered ones of the plurality of data lines is reversed on data voltages of the second-color subpixels, fourth data voltage after reversal of the polarity of a data voltage supplied to each data line is a data voltage of the fourth-color subpixels, there is a difference of 1 horizontal period between the reversal of the polarity of the data voltages supplied to the odd-numbered ones of the plurality of data lines and the reversal of the polarity of data voltages supplied to the even-numbered ones of the plurality of data lines, the gate driver is configured to output the gate pulses in order from a first gate pulse to a fourth gate pulse, and among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

9. The liquid crystal display device of claim 1, wherein the first-color and the second-color subpixels arranged on the (4i+1)th low lines comprise TFTs (thin-film transistors)

configured supply data voltages from corresponding ones of the plurality of data lines to the left of the first-color and the second-color subpixels to pixel electrodes of the first-color and the second-color subpixels, the third-color and the fourth-color subpixels arranged on the (4i+2)th low lines comprise TFTs configured to supply data voltages from corresponding ones of the plurality of data lines to the right of the third-color and the fourth-color subpixels to pixel electrodes of the third-color and the fourth-color subpixels, the first-color and the second-color subpixels arranged on the (4i+3)th low lines comprise TFTs configured to supply data voltages from corresponding ones of the plurality of data lines to the right of the first-color and the second-color subpixels to the pixel electrodes of the first-color and the second-color subpixels, and the third-color and fourth-color subpixels arranged on the (4i+4)th low lines comprise TFTs configured to supply data voltages from corresponding ones of the plurality of data lines to the right of the third-color and the fourth subpixels to the pixel electrodes of the third-color and the fourth-color subpixels.

10. The liquid crystal display device of claim 9, wherein the data driver is configured to supply the plurality of data lines with data voltages whose polarity is reversed on the cycle of every 4 horizontal periods,
the polarity of the data voltages supplied to the plurality of data lines is reversed on data voltages of the fourth-color subpixels, there is a difference of 1 horizontal period between the reversal in polarity of data voltages supplied to odd-numbered ones of the plurality data lines and the reversal in polarity of data voltages supplied to even-numbered ones of the plurality of data lines, the gate driver is configured to output the gate pulses in order from a first gate pulse to a fourth gate pulse, among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

11. The liquid crystal display device of claim 5, wherein first color of first-color subpixels is white, second color of the second-color subpixels is green, third color of the third-color subpixels is red, and fourth color of the fourth-color subpixels is blue.

12. A liquid crystal display device comprising:
a display panel formed of a plurality subpixels;
a data driver configured to supply of data voltages to the plurality of subpixels and reverse a polarity of the data voltages according to a cycle; and
wherein the plurality of subpixels are arranged such that:
first-color subpixels are arranged at positions where (4i+1)th row lines and odd-numbered column lines intersect with a negative polarity and at positions where the (4i+3)th row lines and the even-numbered column lines intersect with a negative polarity,
second-color subpixels are arranged at positions where the (4i+1)th row lines and even-numbered column lines intersect with a negative polarity and at positions where (4i+3)th row lines and the odd-numbered column lines intersect with a negative polarity, third-color subpixels are arranged at positions where (4i+2)th row lines and the odd-numbered column lines intersect with a positive polarity and at positions where the (4i+4)th row lines and the even-numbered column lines intersect with a positive polarity,
fourth-color subpixels are arranged at positions where the (4i+2)th row lines and the even-numbered column lines intersect with a negative polarity and fourth-color subpixels are arranged at positions where (4i+4)th row lines and the odd-numbered column lines intersect with a negative polarity, and
i is an integer greater than or equal to zero.

13. The liquid crystal display according to claim 12, further comprising:
a plurality of data lines;
a plurality of gate lines intersecting the plurality of data lines; and
a gate driver configured to supply gate pulses to the plurality of gate lines in synchronization with the data voltages.

14. The liquid crystal display device of claim 13, wherein the data driver is configured to supply the plurality of data lines with the data voltages whose polarity is reversed on the cycle of every 4 horizontal periods,
the gate driver is configured to sequentially supply the gate pulses to the plurality of gate lines in order from a first gate line to a fourth gate line of the plurality of gate lines,
the polarity of the data voltages supplied to the plurality of data lines is reversed on data voltages of the first-color subpixels, and
the reversal of the polarity of the data voltages supplied to odd-numbered ones of the plurality of data lines and the reversal of the polarity of the data voltages supplied to even-numbered ones of the plurality of data lines differ by 2 horizontal periods.

15. The liquid crystal display device of claim 14, wherein the first-color subpixels display the blue color, the second-color subpixels display the red color, the third-color subpixels display the white color, and the fourth-color subpixels display the green color.

16. The liquid crystal display device of claim 13, wherein the data driver is configured to,
supply the plurality of data lines with data voltages whose polarity is reversed on the cycle of every 4 horizontal periods, and
simultaneously reverse the polarity of the data voltages supplied to odd-numbered ones of the plurality of data lines and the polarity of the data voltages supplied to even-numbered ones of the plurality of data lines,
the polarity of the data voltages supplied to the odd-numbered ones of the plurality of data lines is reversed on data voltages of the fourth-color subpixels,
the polarity of the data voltages supplied to the even-numbered ones of the plurality of data lines is reversed on data voltages of the third-color subpixels,
the gate driver is configured to output the gate pulses in order from a first gate pulse to a fourth gate pulse, and
among link lines connecting output channels of the gate driver and the plurality of gate lines, ones of the link lines connecting the output channels of the second and the third gate pulses and a second and a third gate lines of the plurality of gate lines intersect so that the third gate pulse is applied to the second gate line after the second gate pulse is applied to the third gate line.

17. The liquid crystal display device of claim 13, wherein
the data driver is configured to supply the plurality of data lines with data voltages whose polarity is reversed on the cycle of every 4 horizontal periods,
the polarity of the data voltages that is supplied to odd-numbered ones of the plurality of data lines is reversed on data voltages of the fourth-color subpixels,
the polarity of the data voltages supplied to even-numbered ones of the plurality of data lines is reversed on data voltages of the second-color subpixels,
fourth data voltage after reversal of the polarity of a data voltage supplied to each data line is a data voltage of the fourth-color subpixels,
the reversal of the polarity of the data voltages supplied to the odd-numbered ones of the plurality of data lines and the reversal of the polarity of data voltages supplied to the even-numbered ones of the plurality of data lines differ by 1 horizontal period,
the gate driver is configured to output the gate pulses in order from a first gate pulse to a fourth gate pulse, and
among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

18. The liquid crystal display device of claim 13, wherein
the data driver is configured to supply the plurality of data lines with data voltages whose polarity is reversed on the cycle of every 4 horizontal periods,
the polarity of the data voltages supplied to the plurality of data lines is reversed on data voltages of the fourth-color subpixels,
the reversal in polarity of data voltages supplied to odd-numbered ones of the plurality data lines and the reversal in polarity of data voltages supplied to even-numbered ones of the plurality of data lines differ by 1 horizontal period,
the gate driver is configured to output the gate pulses in order from a first gate pulse to a fourth gate pulse,
among link lines connecting output channels of the gate driver and the plurality of gate lines, ones of the link lines connecting the output channels of the second and third gate pulses and second and third gate lines of the plurality of gate lines intersect so that the third gate pulse is applied to the second gate line after the second gate pulse is applied to the third gate line.

19. The liquid crystal display device of claim 18, wherein the first-color subpixels displays the white color, the second-color subpixels displays the green color, the third-color subpixels displays the red color, and the fourth-color subpixels displays the blue color.

20. The liquid crystal display device of claim 12, wherein two or more of the plurality of subpixels form one of a plurality of pixels of the display panel such that each of the plurality of pixels is formed of two of the plurality of subpixels having two different colors, three of the plurality of subpixels having three different colors, or four of the plurality of subpixels having four different colors.

21. A liquid crystal display device comprising:
a plurality of data lines;
a plurality of gate lines intersecting the plurality of data lines;
a pixel array including a plurality of subpixels formed of first-color subpixels, second-color subpixels, third-color subpixels, and fourth-color subpixels, the plurality of subpixels having one of a first arrangement and a second arrangement, the first arrangement being an arrangement in which in each row of the pixel array two of the first-color to fourth-color subpixels are interleaved, the second arrangement being a different arrangement than the first arrangement in which in each row of the pixel array two of the first-color to fourth-color subpixels are interleaved,
wherein the first-color subpixels are arranged at positions where (4i+1)th row lines and odd-numbered column lines intersect with a negative polarity, the second-color subpixels are arranged at positions where the (4i+1)th row lines and even-numbered column lines intersect with a negative polarity, the third-color subpixels are arranged at positions where (4i+2)th row lines and the odd-numbered column lines intersect with a positive polarity, the fourth-color subpixels are arranged at positions where the (4i+2)th row lines and the even-numbered column lines intersect with a negative polarity, the second-color subpixels are arranged at positions where (4i+3)th row lines and the odd-numbered column lines intersect with a negative polarity, the first-color subpixels are arranged at positions where the (4i+3)th row lines and the even-numbered column lines intersect with a negative polarity, the fourth-color subpixels are arranged at positions where (4i+4)th row lines and the odd-numbered column lines intersect with a negative polarity, and the third-color subpixels are arranged at positions where the (4i+4)th row lines and the even-numbered column lines intersect with a positive polarity, wherein i is an integer greater than or equal to zero;
a data driver configured to,
drive the pixel array according to a first driving method when the pixel array has the first arrangement, and
drive the pixel array according to at least one second driving method that is
different from the first driving method when the pixel array has the second arrangement; and
a gate driver configured to supply gate pulses to the plurality of gate lines in synchronization with data voltages supplied by the data driver.

22. The liquid crystal display device of claim 21, wherein the data driver is configured to drive the pixel array according to the first driving method by periodically:
supplying a data voltage having one of a first polarity or a second polarity to one of a plurality of groups of four subpixels of the pixel array connected to an odd-numbered column of the plurality of data lines, each subpixel in each of the plurality of groups of four subpixels corresponding to a different one of the first-color to fourth-color subpixels,
after supplying the data voltage to one of the groups of four subpixels, reversing the polarity of the data voltage between the first polarity and the second polarity, and
repeating the supplying after the reversing of the polarity of the data voltage, wherein
the supplying and the reversing steps are performed periodically with respect to groups of four subpixels of the pixel array connected to an even-numbered column of the plurality of data lines, and
there is a difference of 2 horizontal periods between the reversal of the polarity of the data voltages for pixels connected to the odd-numbered column of the plurality of data lines and pixels connected to the even-numbered column of the plurality of data lines.

23. The liquid crystal display device of claim 21, wherein the data driver is configured to drive the pixel array according to the at least one second driving method by periodically:
supplying a data voltage having one of a first polarity or a second polarity to one of a first plurality of groups of four subpixels of the pixel array connected to an odd-numbered column of the plurality of data lines, first and second subpixels in each of the first plurality of groups of four subpixels corresponding to the first-color subpixels, third and fourth subpixels in each of the first plurality of groups of four subpixels corresponding to the second-color subpixels,
after supplying the data voltage to one of the first plurality of groups of four subpixels, reversing the polarity of the data voltage between the first polarity and the second polarity,
repeating the supplying with respect to a next one of the first plurality of groups of four subpixels, after the reversing of the polarity of the data voltage,
supplying the data voltage to one of a second plurality of groups of four subpixels of the pixel array connected to an even-numbered column of the plurality of data lines, first and second subpixels in each of the second plurality of groups of four subpixels corresponding to the third-color subpixels, third and fourth subpixels in each of the second plurality of groups of four subpixels corresponding to the fourth-color subpixels, polarity of the data voltage supplied to each of the second plurality of groups of four subpixels being opposite of the polarity of the data voltage being supplied to each of the first plurality of groups of four subpixels,
after supplying the data voltage to one of the second plurality of groups of four subpixels, reversing the polarity of the data voltage between the first polarity and the second polarity, and
repeating the supplying with respect to a next one of the second plurality of groups of four subpixels, after the reversing of the polarity of the data voltage, wherein
the reversals of the polarity of the data voltages for pixels connected to the odd-numbered column of the plurality of data lines and pixels connected to the even-numbered column of the plurality of data lines are performed simultaneously.

24. The liquid crystal display device of claim 21, wherein the data driver is configured to drive the pixel array according to the at least one second driving method by periodically:
supplying a data voltage having one of a first polarity or a second polarity to one of a first plurality of groups of four subpixels of the pixel array connected to an odd-numbered column of the plurality of data lines, first and second subpixels in each of the first plurality of groups of four subpixels corresponding to the first-color subpixels, third subpixel in each of the first plurality of groups of four subpixels corresponding to the second-color subpixels, fourth subpixel in each of the first plurality of groups of four subpixels corresponding to the third-color subpixels,
after supplying the data voltage to one of the first plurality of groups of four subpixels, reversing the polarity of the data voltage between the first polarity and the second polarity,
repeating the supplying with respect to a next one of the first plurality of groups of four subpixels, after the reversing of the polarity of the data voltage,
supplying the data voltage to one of a second plurality of groups of four subpixels of the pixel array connected to an even-numbered column of the plurality of data lines, first subpixel in each of the second plurality of groups of four subpixels corresponding to the second-color subpixels, second and third subpixels in each of the second plurality of groups of four subpixels corresponding to the fourth-color subpixels, fourth subpixel in each of the first plurality of groups of four subpixels corresponding to the third-color subpixels,
after supplying the data voltage to one of the second plurality of groups of four subpixels, reversing the polarity of the data voltage between the first polarity and the second polarity, and
repeating the supplying with respect to a next one of the second plurality of groups of four subpixels, after the reversing of the polarity of the data voltage, wherein
there is a difference of 1 horizontal periods between the reversal of the polarity of the data voltages for pixels connected to the odd-numbered column of the plurality of data lines and pixels connected to the even-numbered column of the plurality of data lines.

25. The liquid crystal display device of claim 21, wherein the data driver is configured to drive the pixel array according to the at least one second driving method by periodically:
supplying a data voltage having one of a first polarity or a second polarity to one of a first plurality of groups of four subpixels of the pixel array connected to an odd-numbered column of the plurality of data lines, first subpixel in each of the first plurality of groups of four subpixels corresponding to the first-color subpixels, second subpixel in each of the first plurality of groups of four subpixels corresponding to the second-color subpixels, third and fourth subpixels in each of the first plurality of groups of four subpixels corresponding to the third-color subpixels, after supplying the data voltage to one of the first plurality of groups of four subpixels, reversing the polarity of the data voltage between the first polarity and the second polarity,
repeating the supplying with respect to a next one of the first plurality of groups of four subpixels, after the reversing of the polarity of the data voltage,
supplying the data voltage to one of a second plurality of groups of four subpixels of the pixel array connected to an even-numbered column of the plurality of data lines, first subpixel in each of the second plurality of groups of four subpixels corresponding to the first-color subpixels, second and third subpixels in each of the second plurality of groups of four subpixels corresponding to the fourth-color subpixels, fourth subpixel in each of the first plurality of groups of four subpixels corresponding to the second-color subpixels,
after supplying the data voltage to one of the second plurality of groups of four subpixels, reversing the polarity of the data voltage between the first polarity and the second polarity, and
repeating the supplying with respect to a next one of the second plurality of groups of four subpixels, after the reversing of the polarity of the data voltage, wherein
there is a difference of 1 horizontal periods between the reversal of the polarity of the data voltages for pixels connected to the odd-numbered column of the plurality of data lines and pixels connected to the even-numbered column of the plurality of data lines.

* * * * *